US011672353B2

(12) United States Patent
Polevoy et al.

(10) Patent No.: US 11,672,353 B2
(45) Date of Patent: Jun. 13, 2023

(54) HOTEL BED FRAME

(71) Applicant: FINGER LAKES INTELLECTUAL PROPERTY, LLC, Teaneck, NJ (US)

(72) Inventors: Richard S. Polevoy, Teaneck, NJ (US); Paul E. Carlson, Skaneateles, NY (US); Robert L. Naas, Skaneateles, NY (US); Kurt R. Werner, Auburn, NY (US); Michael W. Konieczny, Skaneateles, NY (US); David T. Middleton, Jr., Skaneateles, NY (US)

( * ) Notice: Subject to any disclaimer, the term of this patent is extended or adjusted under 35 U.S.C. 154(b) by 284 days.

(21) Appl. No.: 15/737,598

(22) PCT Filed: Aug. 24, 2016

(86) PCT No.: PCT/US2016/038111
§ 371 (c)(1),
(2) Date: Dec. 18, 2017

(87) PCT Pub. No.: WO2017/019199
PCT Pub. Date: Feb. 2, 2017

(65) Prior Publication Data
US 2019/0000236 A1    Jan. 3, 2019

Related U.S. Application Data

(60) Provisional application No. 62/280,223, filed on Jan. 19, 2016, provisional application No. 62/188,220, filed on Jul. 2, 2015.

(51) Int. Cl.
*A47C 19/00*     (2006.01)
*A47C 19/02*     (2006.01)
(Continued)

(52) U.S. Cl.
CPC ............ *A47C 19/005* (2013.01); *A47C 19/02* (2013.01); *A47C 19/021* (2013.01);
(Continued)

(58) Field of Classification Search
CPC ... A47C 19/005; A47C 19/021; A47C 19/024; A47C 19/02; A47C 19/027; F16B 12/60; F16B 12/58
See application file for complete search history.

(56) References Cited

U.S. PATENT DOCUMENTS 45,417 A * 12/1864 Spencer .................. F16B 12/58
5/300
6,557,191 B2* 5/2003 Bellows ............... A47C 19/005
5/200.1

(Continued)

*Primary Examiner* — David R Hare
*Assistant Examiner* — Adam C Ortiz
(74) *Attorney, Agent, or Firm* — Hoffmann & Baron, LLP

(57) ABSTRACT

A bed frame system for use particularly in hotels that includes side rails and cross rails that include extruded plastic panels that extend downwardly to the floor to block the space underneath the bed frame. The cross rails are connected to the side rails by corner members with a system that allows the entire bed frame to be assembled without the use of tools. In one embodiment, the bed frame is a platform style bed frame that is constructed of an upper bed frame section and a lower bed frame section that are interlocked together to raise the height of the bed frame and eliminate the foundation. The bed frame may have a deck made up of a plurality of individual slats that are supported by the side rails to support the mattress.

15 Claims, 55 Drawing Sheets

(51) Int. Cl.
*E04C 3/28* (2006.01)
*F16B 12/58* (2006.01)
*F16B 12/60* (2006.01)
*E04C 3/04* (2006.01)

(52) U.S. Cl.
CPC .............. *A47C 19/027* (2013.01); *E04C 3/28* (2013.01); *F16B 12/58* (2013.01); *F16B 12/60* (2013.01); *E04C 2003/046* (2013.01)

(56) References Cited

U.S. PATENT DOCUMENTS

| | | | |
|---|---|---|---|
| 6,941,596 B2 * | 9/2005 | Schuman | A47C 19/024 5/200.1 |
| 2015/0359345 A1 * | 12/2015 | Schulte | A47C 19/005 5/280 |

* cited by examiner

HOTEL BED FRAME

CROSS REFERENCE TO RELATED APPLICATIONS

The present application is a National Stage Application claiming the priority of PCT Application No. PCT/US2016/038111 filed Aug. 24, 2016, which in turn, claims priority from U.S. Provisional Application Ser. Nos. 62/188,220 filed Jul. 2, 2015, and 62/280,223, filed Jan. 19, 2016. Applicants claim the benefits of 35 U.S.C. § 120 as to the PCT Application and priority under 35 U.S.C. § 119 as to the said U.S. Provisional application, and the entire disclosures of both applications are incorporated herein by reference in their entireties.

FIELD OF THE INVENTION

The present invention relates to a bed frame for supporting a mattress or mattress set and, more particularly, to a bed frame specially designed for commercial sleeping facilities, such as hotels.

BACKGROUND OF THE INVENTION

There are special needs for a bed used in commercial sleeping facilities, such as a hotel. The term "hotel" will be used herein as a generic description of a commercial sleeping facility including hotels, motels, hostels, etc. The nature of running a hotel is that people will pay to have a place to sleep overnight away from their homes. Because of this, the bed is a very important item for hotel owners and the right bed frame is critical. A bed frame that is not strong enough to hold up to a wide variety of sleepers will not perform well in a hotel. It is, therefore, beneficial for a hotel bed to be extremely durable and stable.

It is also unique to the hotel bed that the people will forget and leave items under a bed. It would thus be beneficial for a hotel bed to have panels to block anything from going under the bed. This would include dust or dirt and so a hotel bed with these panels would make cleaning under the bed unnecessary.

Current hotel beds with panels often have sharp edges and corners that can cause injury or damage. These bed bases are often constructed of rolled steel or wooden particle board. They can be often dangerous to handle during assembly. It would be beneficial to have a bed frame that doesn't have exposed sharp edges and is constructed of material other than rolled steel or wooden particle board.

Current hotel beds have brackets and fasteners that are used to hold the parts together. This makes the assembly complicated, difficult, and time consuming. It also leads to incorrect or incomplete assembly. Hotels have many rooms and therefore many beds. If an assembler incorrectly assembles a bed, he could easily incorrectly assemble hundreds of beds. Further, if a bed can be assembled quickly and easily, it can lead to a big savings of time and money for the hotel operator. Fasteners and hardware are subject to loosening over time and, at best, tend to cause annoying squeaks and rattles. At worst, the product collapses. It would be beneficial to have a frame that assembles quickly without the need for tools or loose hardware, and easily so that no errors in assembly are made.

Many hotel bed frames need to stabilize the bed with the use of metal tabs to hook the bottom edges of the foundation. If not installed properly, these can extend past the bottom edge of the foundation and stick out. These metal tabs also can become loose over time with the same result. Because these tabs are at shin level and are often camouflaged by the bed covers or dust ruffles, they can be extremely dangerous. It would be a benefit to have a hotel bed without the need for metal retaining tabs.

A hotel bed that is not visually appealing is usually covered up by a dust ruffle. A dust ruffle is a fabric covering that extends from the foundation to the floor to cover the bed frame. These dust ruffles are a pathway for bedbugs to get from the floor to the bedding. Bedbugs are a special concern in hotels where they can be easily spread from guest to guest or carried to a guest's home. It would be beneficial if the hotel bed was visually appealing and did not require a cover, such as a dust ruffle.

Bedding sets have typically included a mattress and a foundation but in some cases there is a desire to eliminate the foundation and use just a mattress on a frame. In such case, it is beneficial for the hotel bed frame to be taller than a normal bed frame to make up for the height of the foundation that is not used so that the bed top surface is not unusually low. It would thus be advantageous if a bed frame was stable and sturdy, had panels to block access under the bed and no loose fasteners or sharp edges including retaining tabs. An attractive bed frame with no dust ruffle is a benefit. Finally, it would be advantageous to have a bed frame that in some case would be taller so it could be used with a mattress alone. The present invention addresses all of the above needs. The following is a brief description of the embodiments of the invention.

SUMMARY OF THE INVENTION

Accordingly, the present invention overcomes the deficiencies of the prior art with respect to a bed frame intended for hotel use and where the bed frame assembly is adapted to support a mattress and, in turn, is supported on a floor. The bed frame assembly comprises two side rails and at least one end cross rail. In one embodiment, there are two end cross rails and a center cross rail.

Each of the side rails extend to the floor by means of extruded plastic panels to prevent objects from inadvertently going under the bed frame and becoming lost or requiring continuous searches underneath the bed frame to retrieve such objects. In addition, the panels eliminate the need for a housekeeper to clean underneath the bed frame, thereby saving on maintenance costs and turnaround time for the room. One or more end cross rails include extruded plastic panels that extend to the floor. While the embodiments disclosed herein illustrate the use of plastic panels for the ends of sides of the bed frames, it is also within the scope of the present invention to use metal panels, possibly perforated, to achieve the same results.

Corner members are located at each corner of the bed frame assembly and the side rails. End cross members are attached to the corner members in assembling the bed frame using an affixation system that does not require tools to carry out that connection during the assembly of the bed frame.

The affixation system includes receivers formed in the corner members and the side rails. End cross rails have ends with wedges formed thereon that simply drop into the receivers to fully and solidly assembly the bed frame.

In another embodiment, again there is a bed frame assembly adapted to be supported by a floor, however, in this embodiment, the bed frame assembly is comprised of an upper bed frame section and a lower bed frame section. The upper bed frame section is adapted to support a mattress while the lower bed frame section is adapted to support the upper bed frame section. As such, the lower bed frame section supports the upper bed frame section and extends to the floor, again to prevent objects from inadvertently going under the bed frame and becoming lost or difficult to retrieve as well as eliminating the need to clean underneath the bed frame.

Both the upper and lower bed frame sections have side rails and end cross rails as well as corner members to carry out the connections between the side rails and the end cross rails. There is an interlocking system that interlocks the upper bed frame section atop of the lower bed frame section to prevent sliding between the upper and lower bed frame sections.

In a still further embodiment, the extruded panel that extends to the floor to prevent objects from going under the bed frame is separated from the side rail so that it is displaced inwardly from the side rail itself, and allow some space along the exterior of the bed frame to accommodate a person's toes and allow a person to stand alongside the bed frame without immediately encountering the protective panel.

In another embodiment there is a deck that supports the bedding and which is made up of a plurality of slats that are supported by the side rails.

These and other features and advantages of the present invention will become more readily apparent during the following detailed description taken in conjunction with the drawings herein.

BRIEF DESCRIPTION OF THE DRAWINGS

First Embodiment

Second Embodiment

Figure 9:
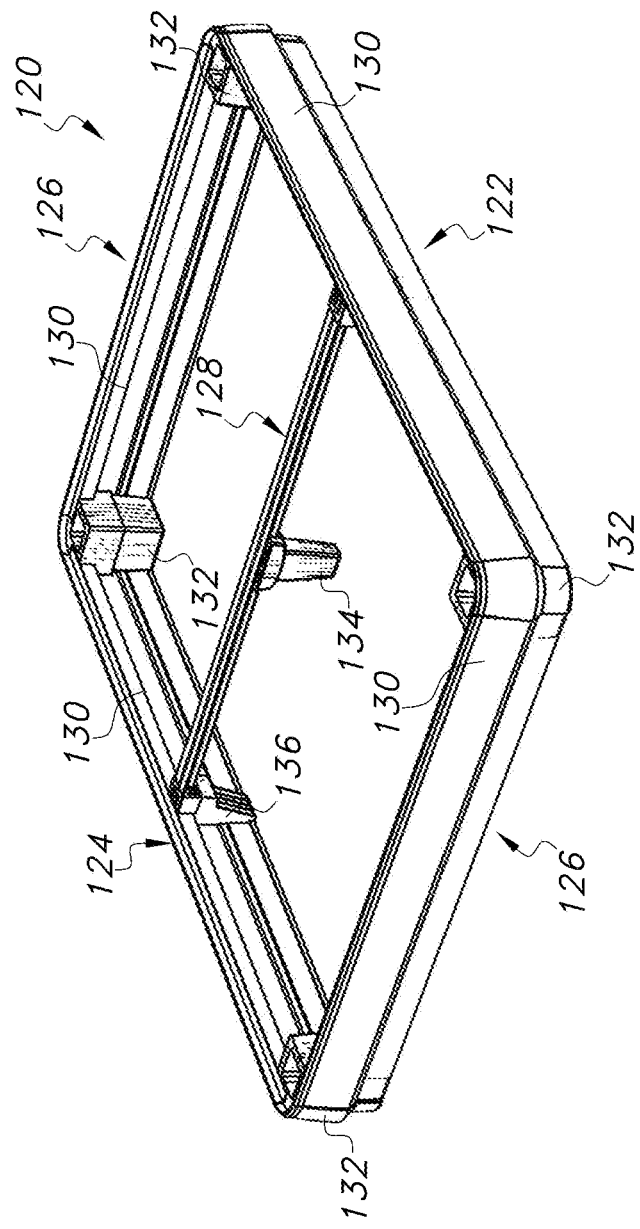
Figure 10:
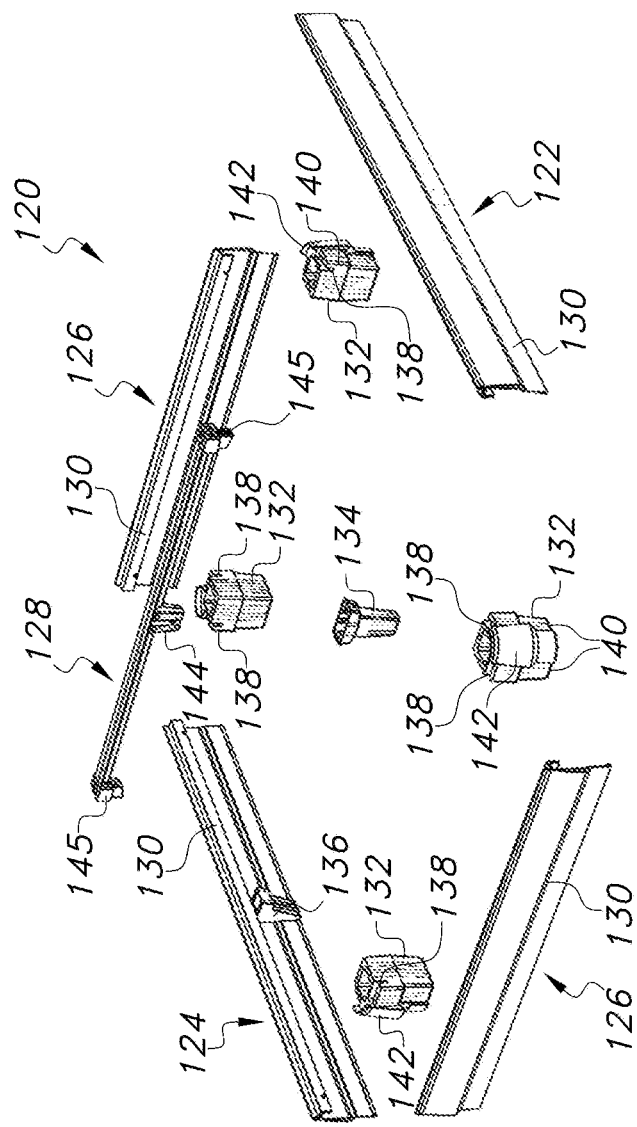
Figure 11:
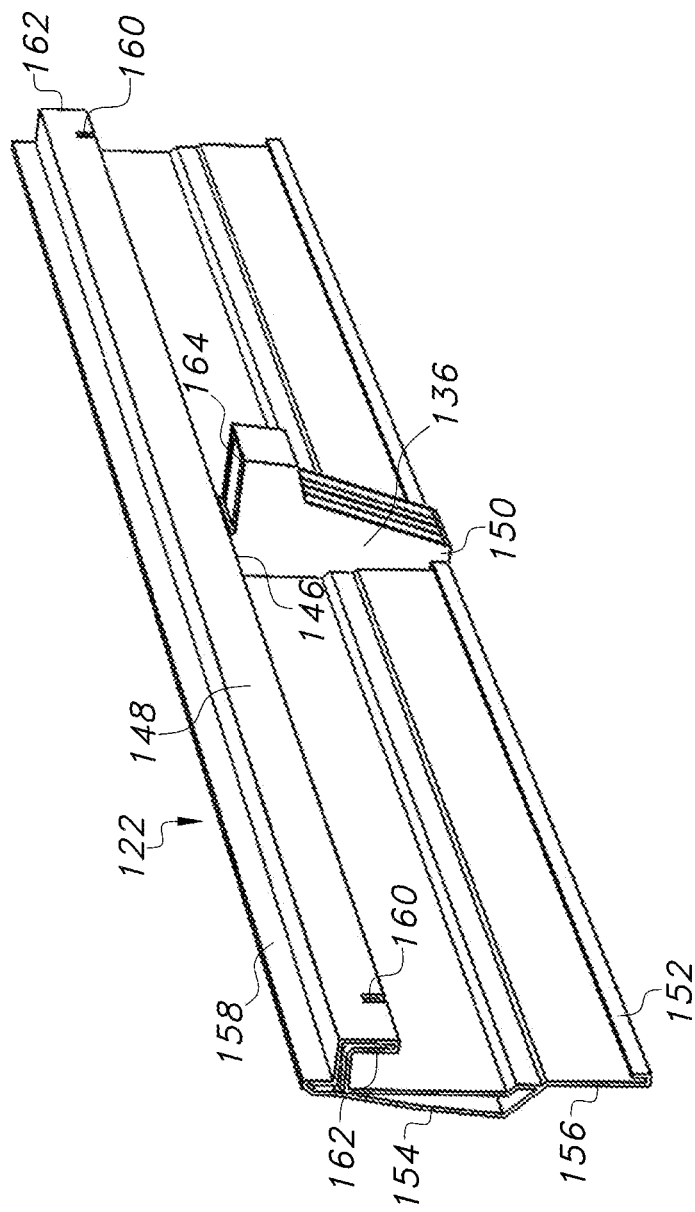
Figure 12:
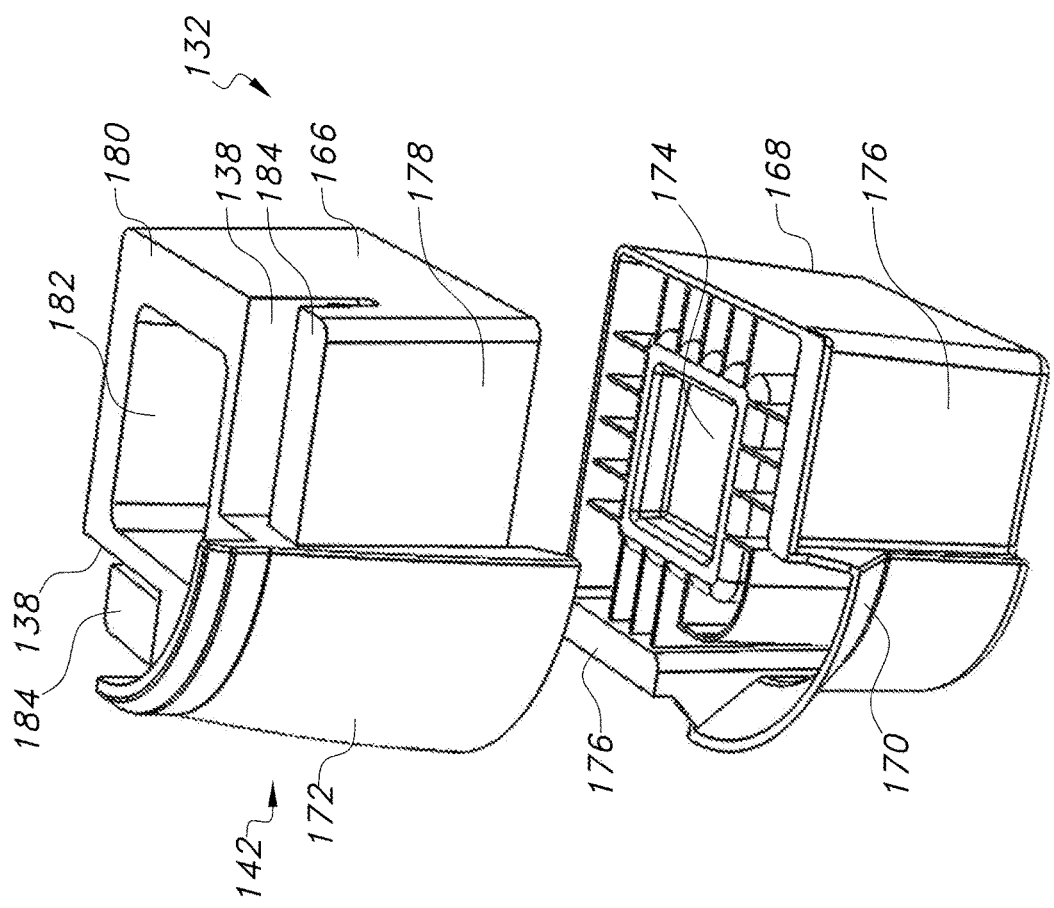
Figure 13:
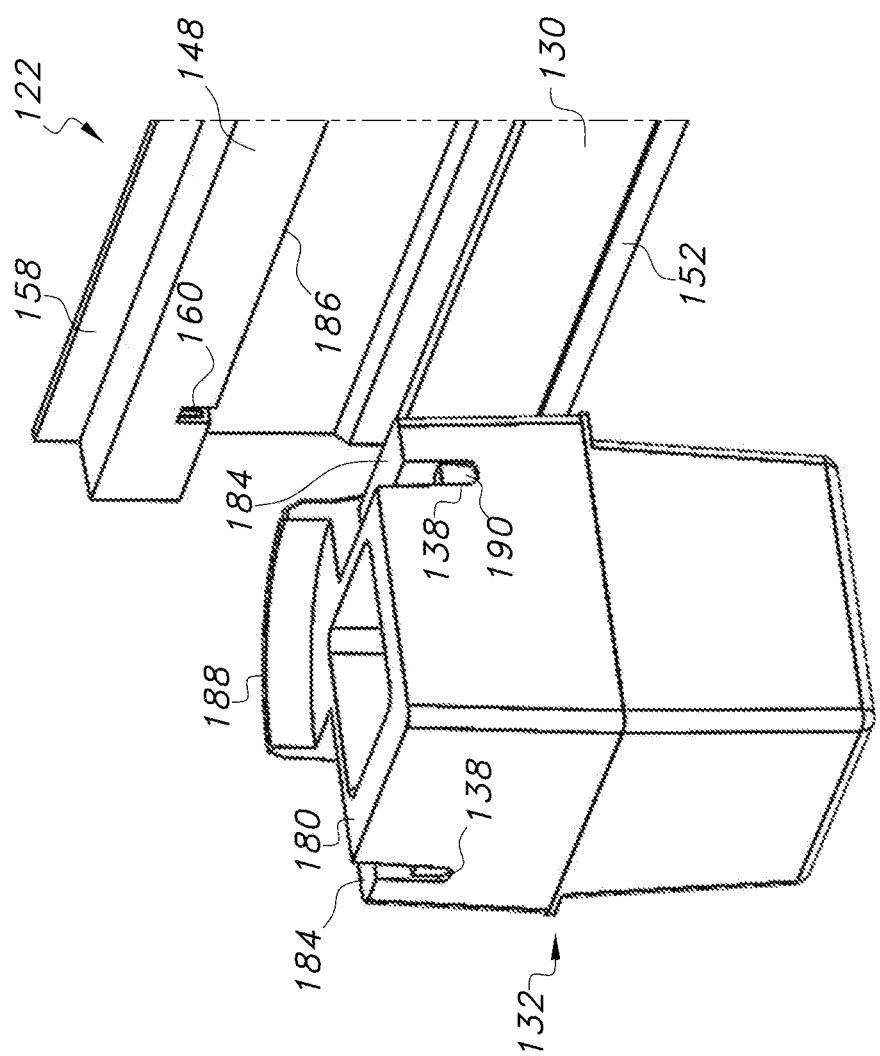
Figure 14:
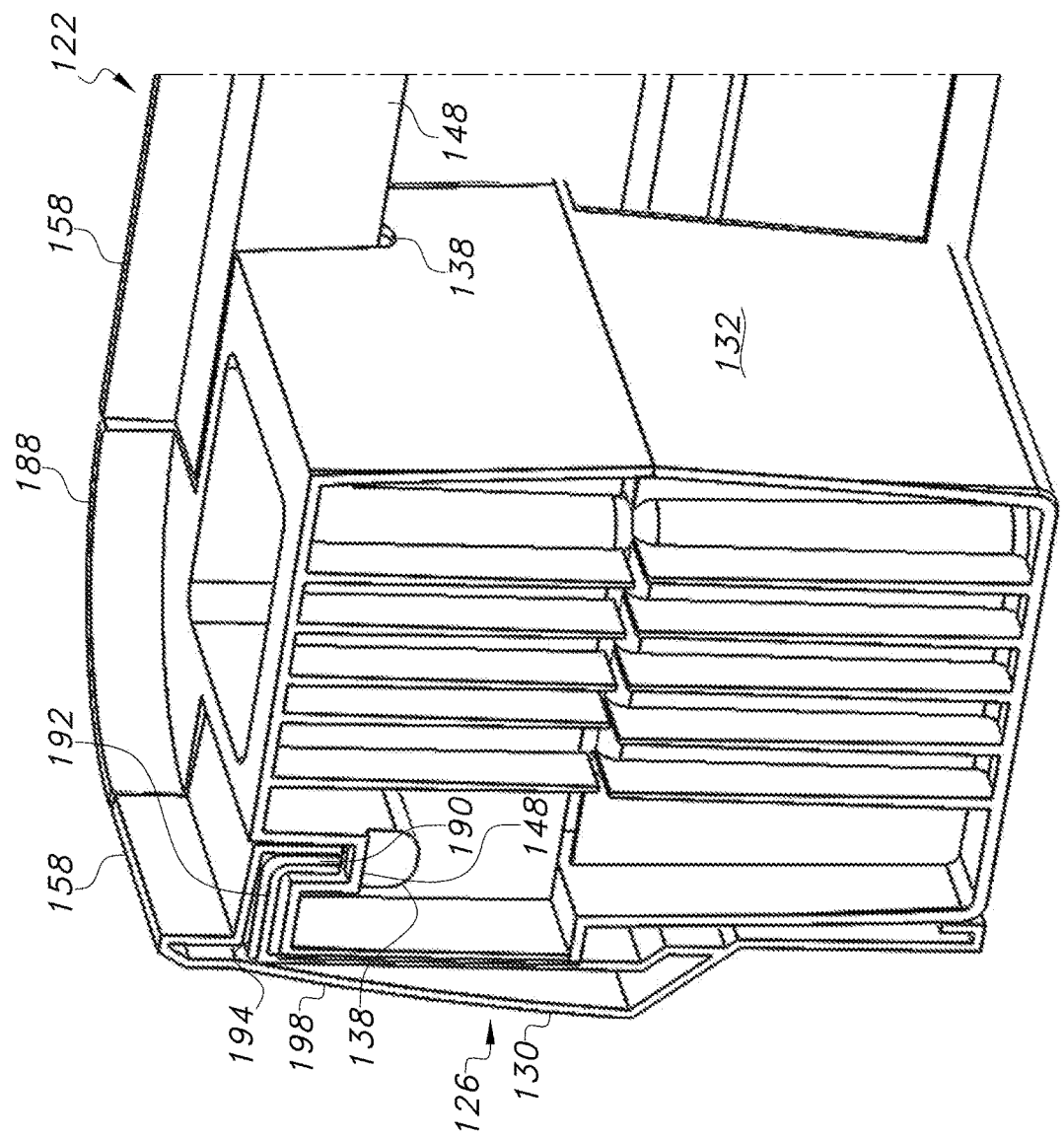
Figure 15:
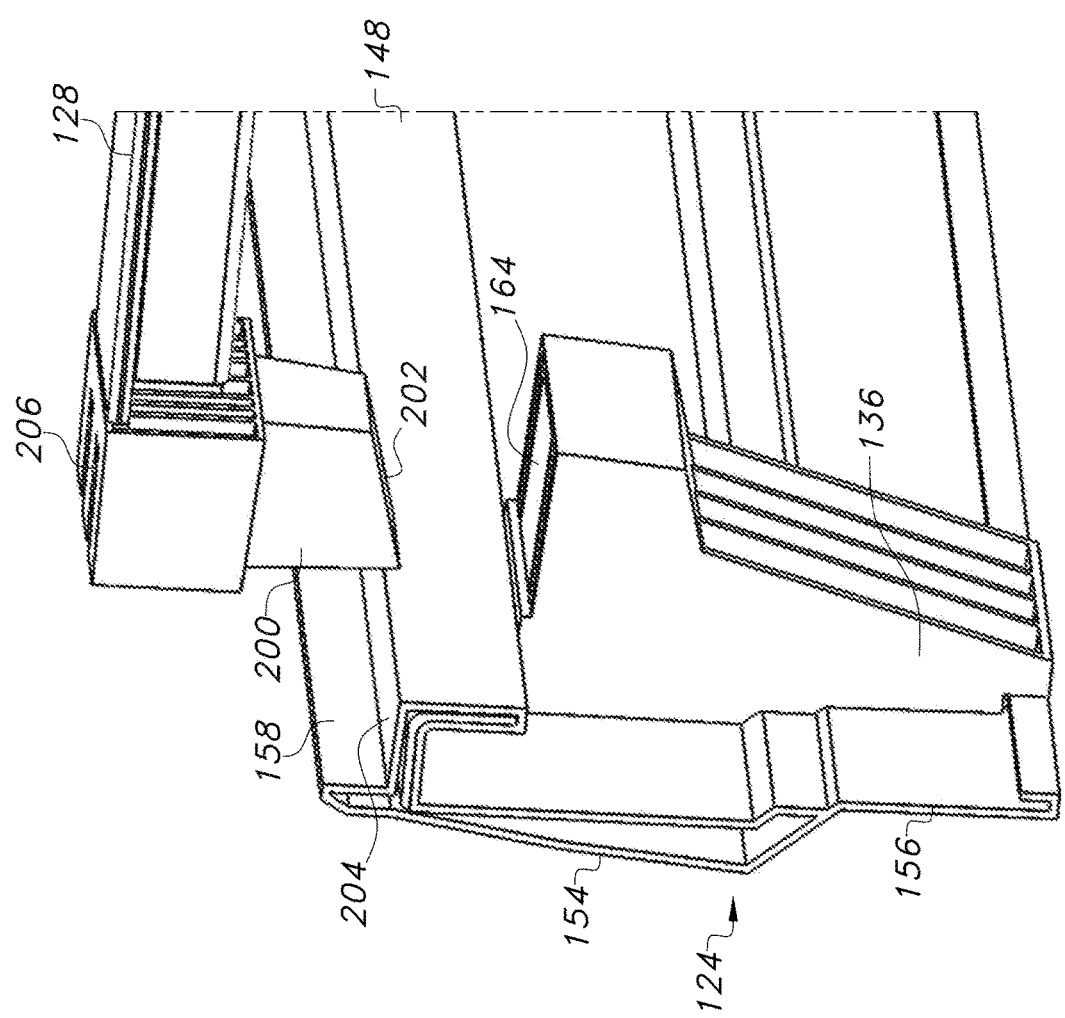

FIG. 9 is a perspective view of a bed frame constructed in accordance with a second embodiment of the present invention;

FIG. 10 is an exploded view illustrating the individual components of the bed frame of FIG. 9 in position to be connected together;

FIG. 11 is a perspective view showing a side rail of the FIG. 9 embodiment;

FIG. 12 is an exploded view of a corner leg of the FIG. 9 embodiment;

FIG. 13 is an exploded view illustrating a side rail and a corner leg of the FIG. 9 embodiment in position to be connected together;

FIG. 14 is a perspective view, partially cutaway, illustrating the connection between a side rail and an end cross rail by means of a corner leg of the FIG. 9 embodiment;

FIG. 15 is an exploded view illustrating a side rail and a center cross rail of the FIG. 9 embodiment in position to be connected together;

Third Embodiment

Figure 16:
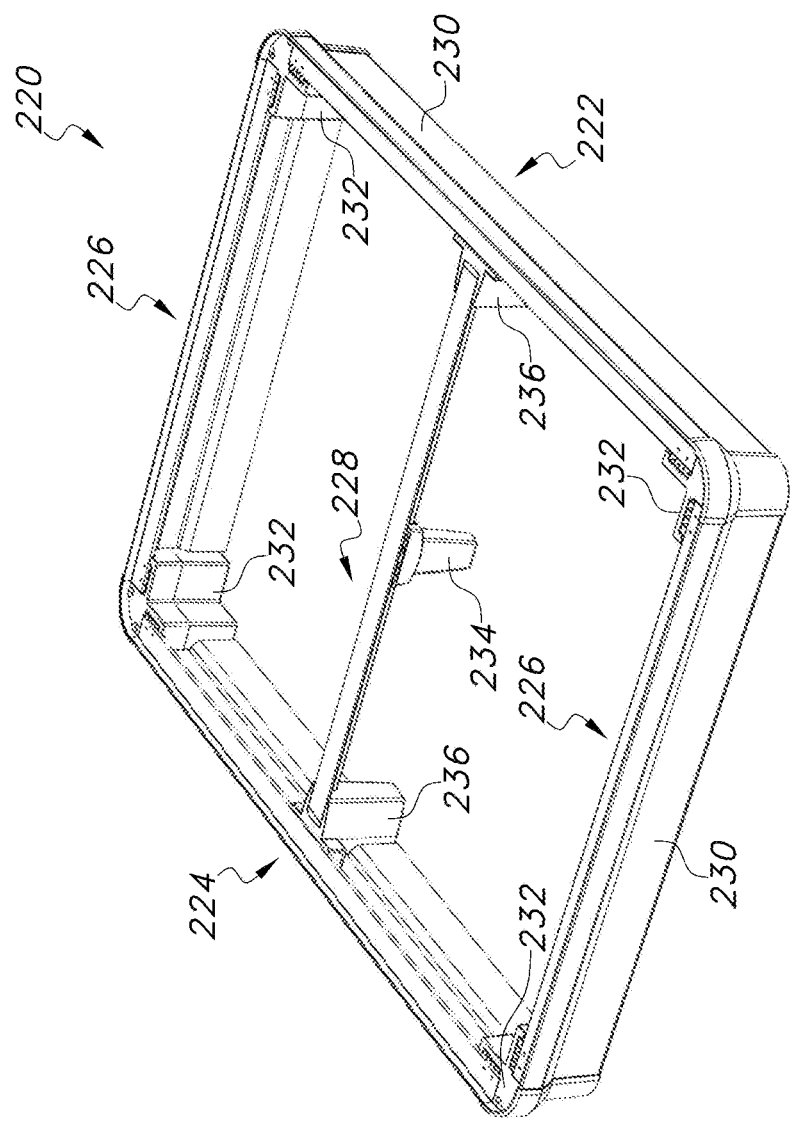
Figure 17:
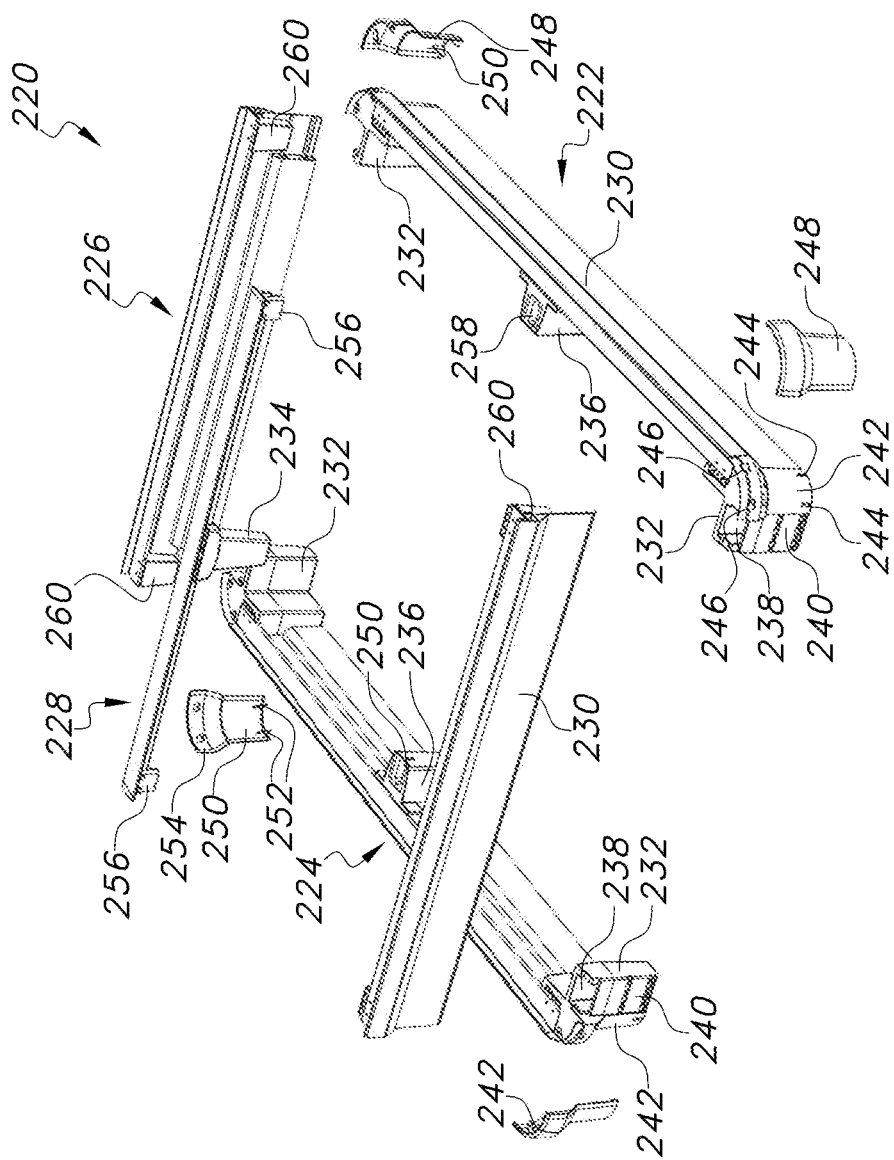
Figure 18:
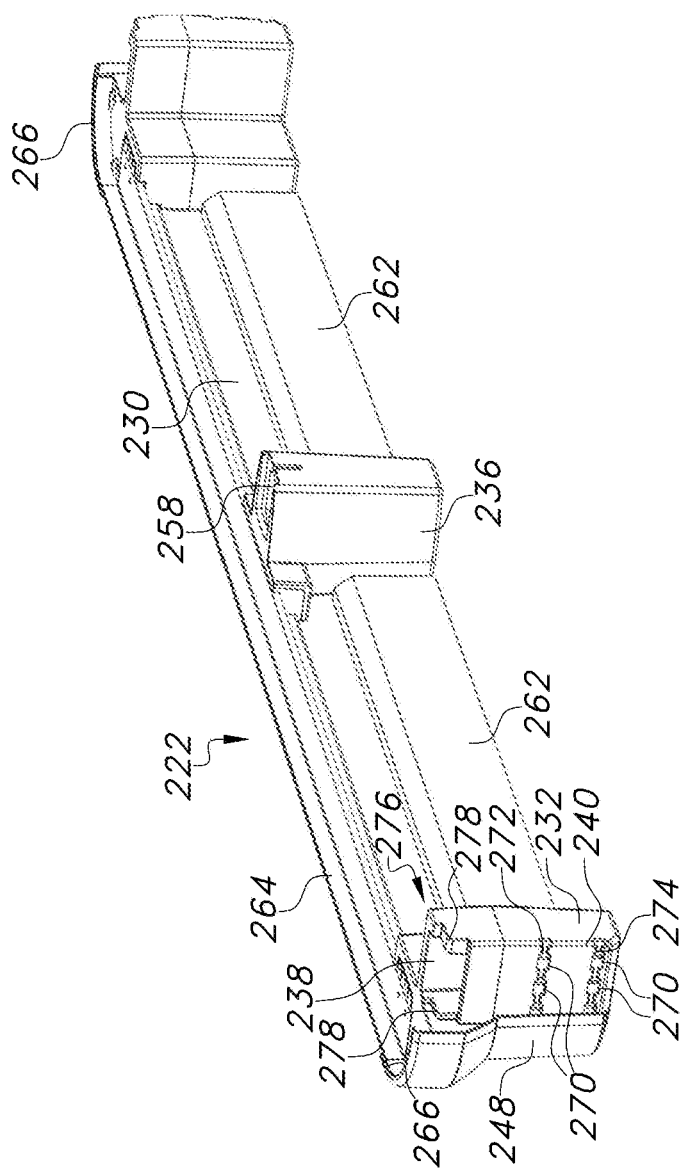
Figure 19:
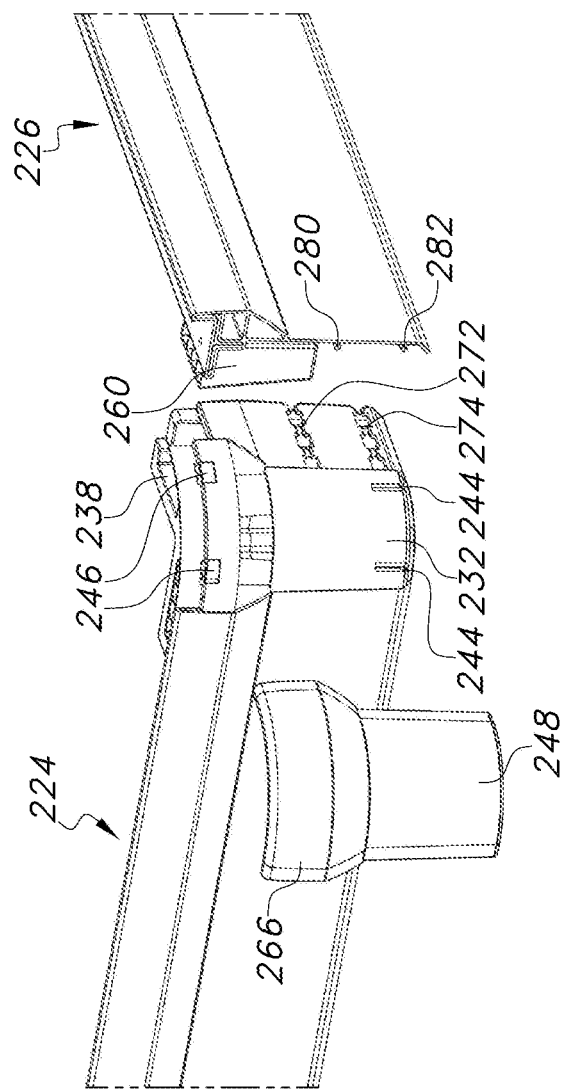
Figure 20:
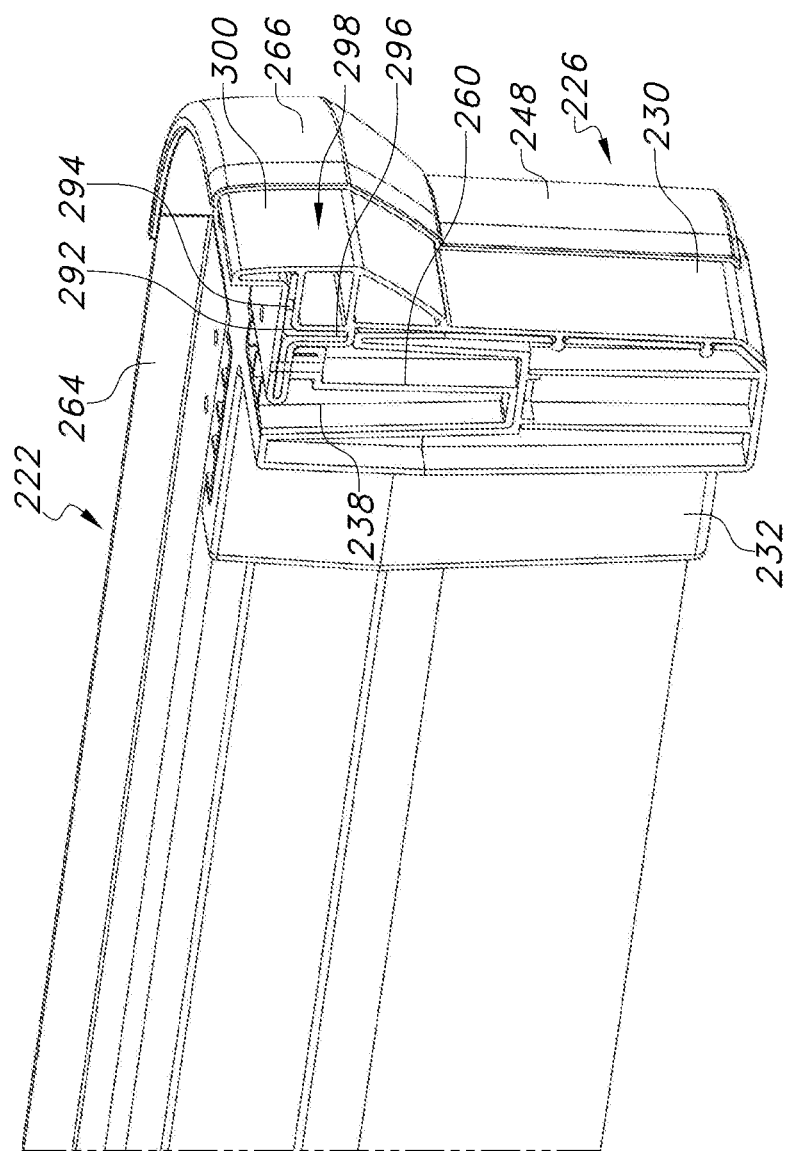
Figure 21:
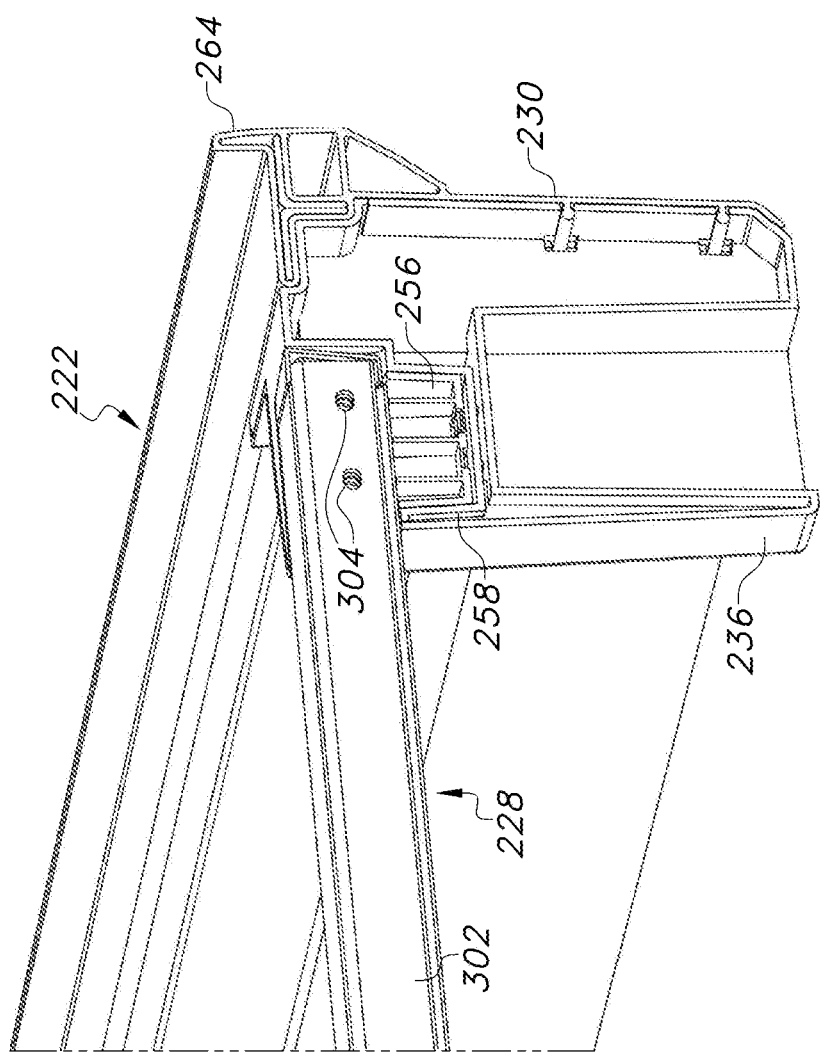
Figure 22:
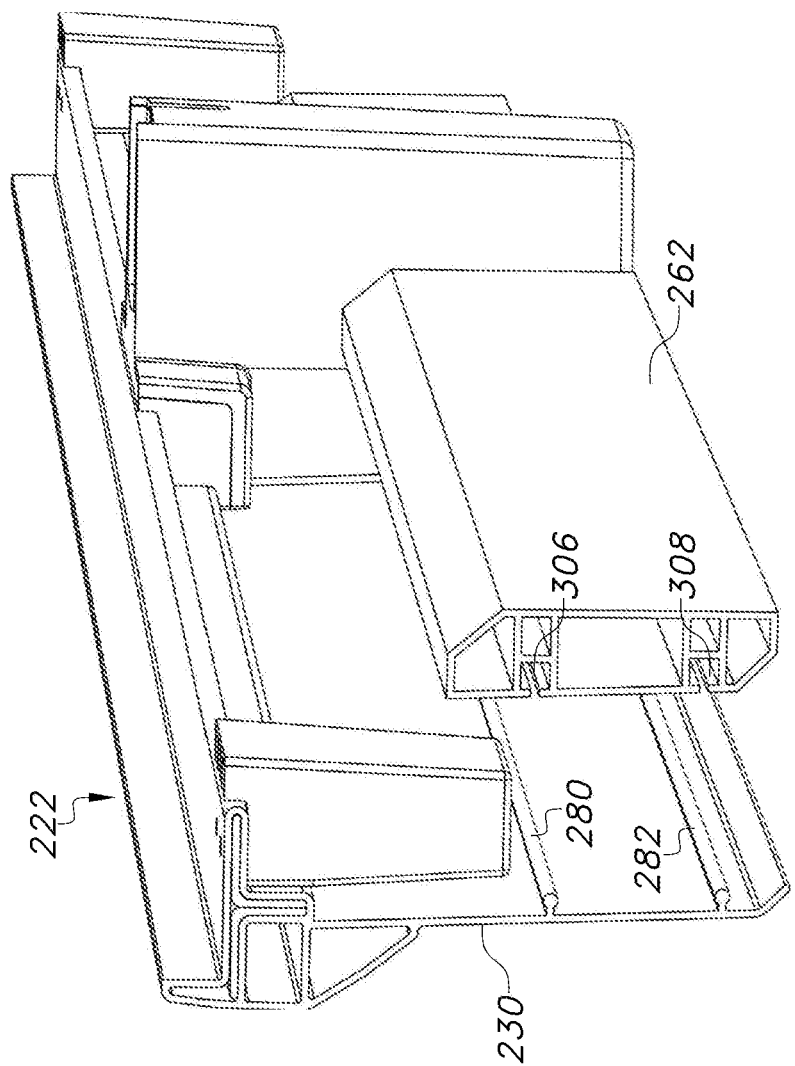

FIG. 16 is a perspective view of a bed frame constructed in accordance with a third embodiment of the present invention;

FIG. 17 is an exploded view illustrating the individual components of the bed frame of FIG. 16 in position to be connected together;

FIG. 18 is a perspective view illustrating a side rail of the FIG. 16 embodiment;

FIG. 19 is an exploded view illustrating a side rail and a corner leg of the FIG. 16 embodiment in position to be connected together;

FIG. 20 is a perspective view, partially cutaway, illustrating the connection between a side rail and an end cross rail of the FIG. 16 embodiment;

FIG. 21 is a perspective view, partially cutaway, showing a connection between a side rail and a center cross rail of the FIG. 16 embodiment;

FIG. 22 is an exploded view of a side rail and an inner extrusion of the side rail of the FIG. 16 embodiment in position to be connected together;

Fourth Embodiment

Figure 23:
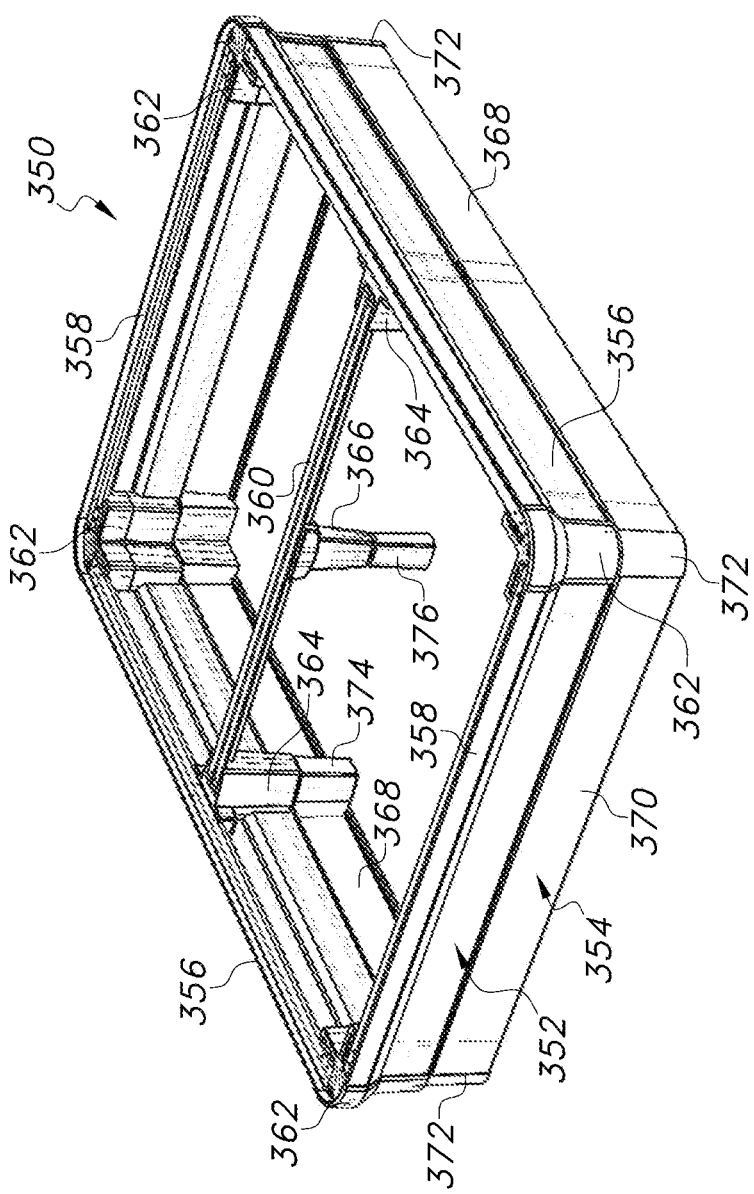
Figure 24:
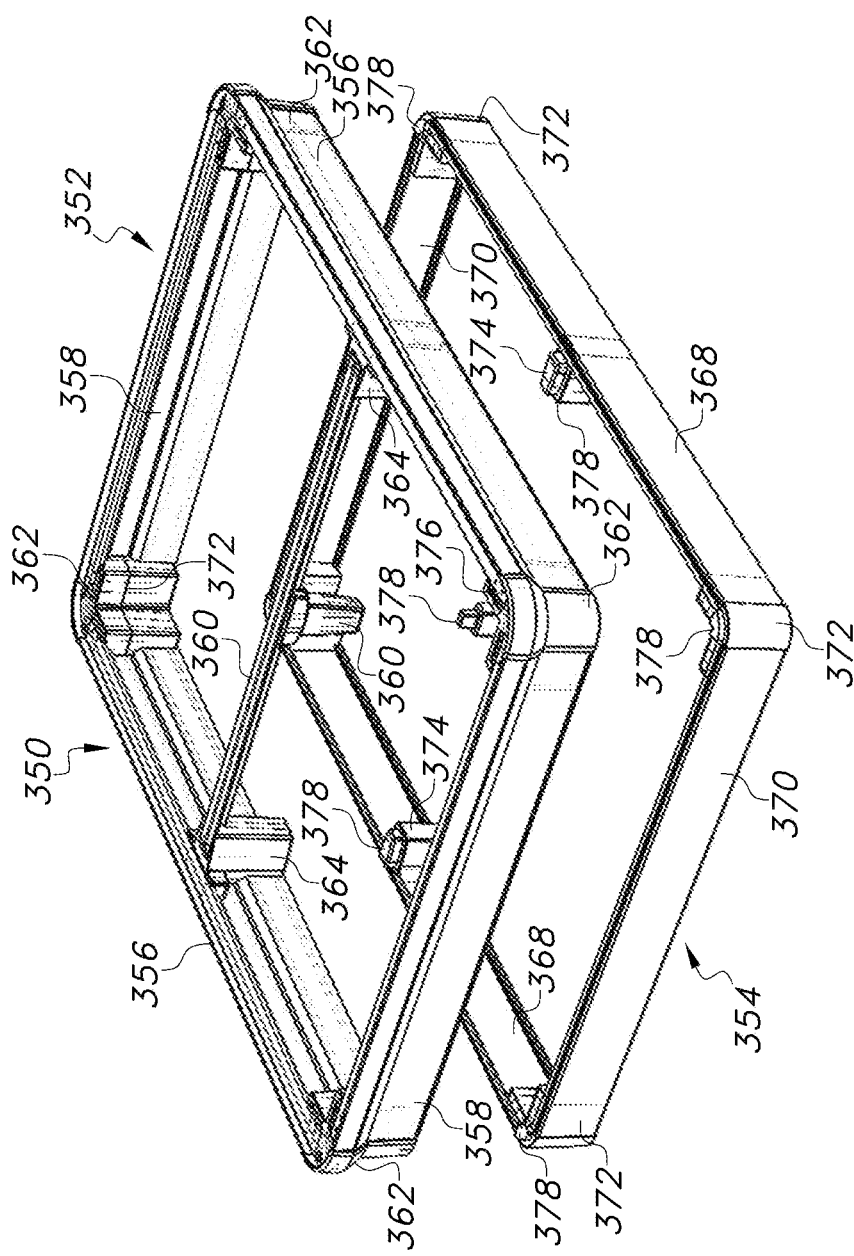
Figure 25:
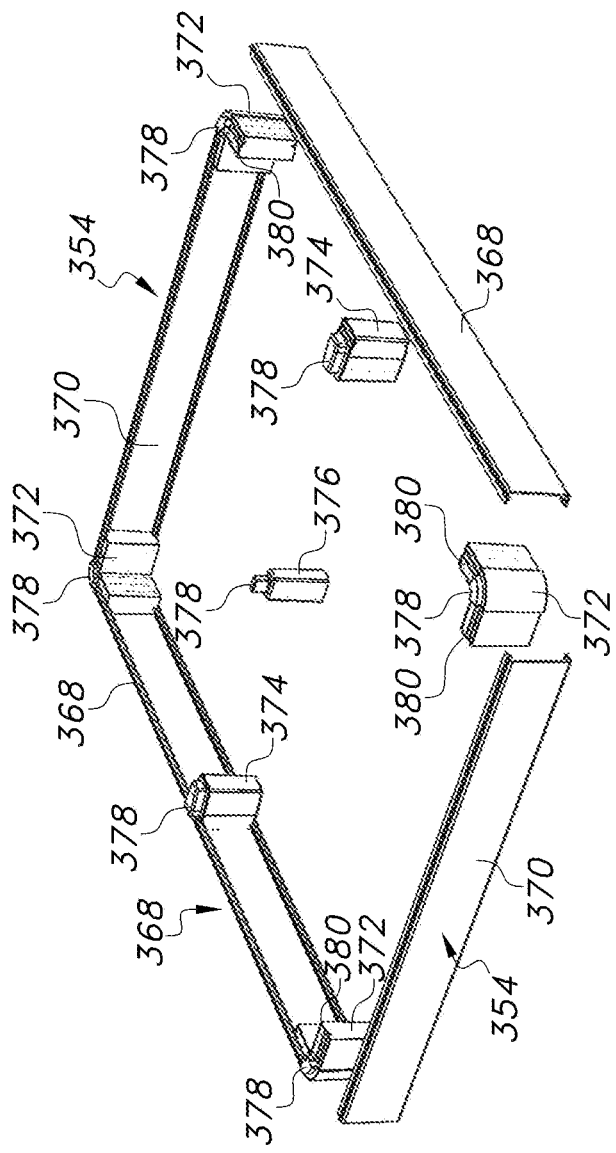
Figure 26:
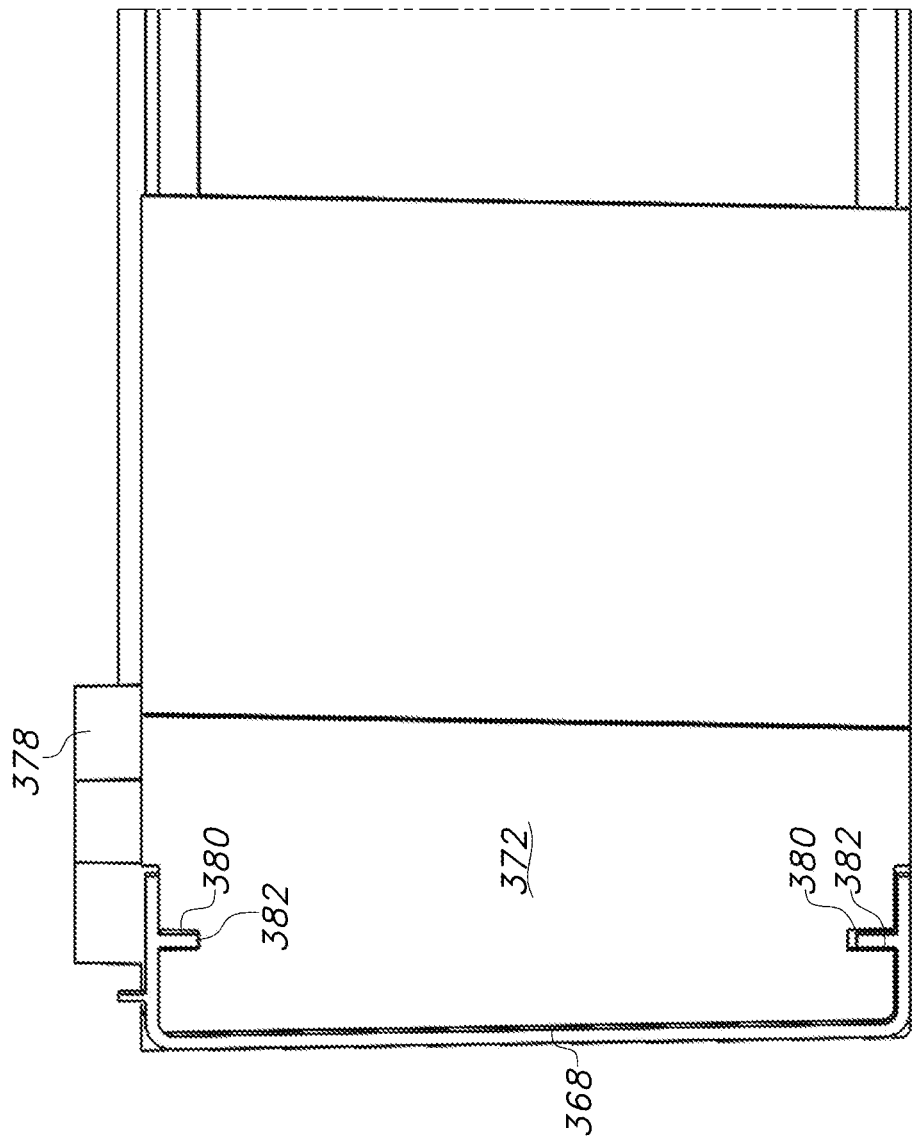
Figure 27:
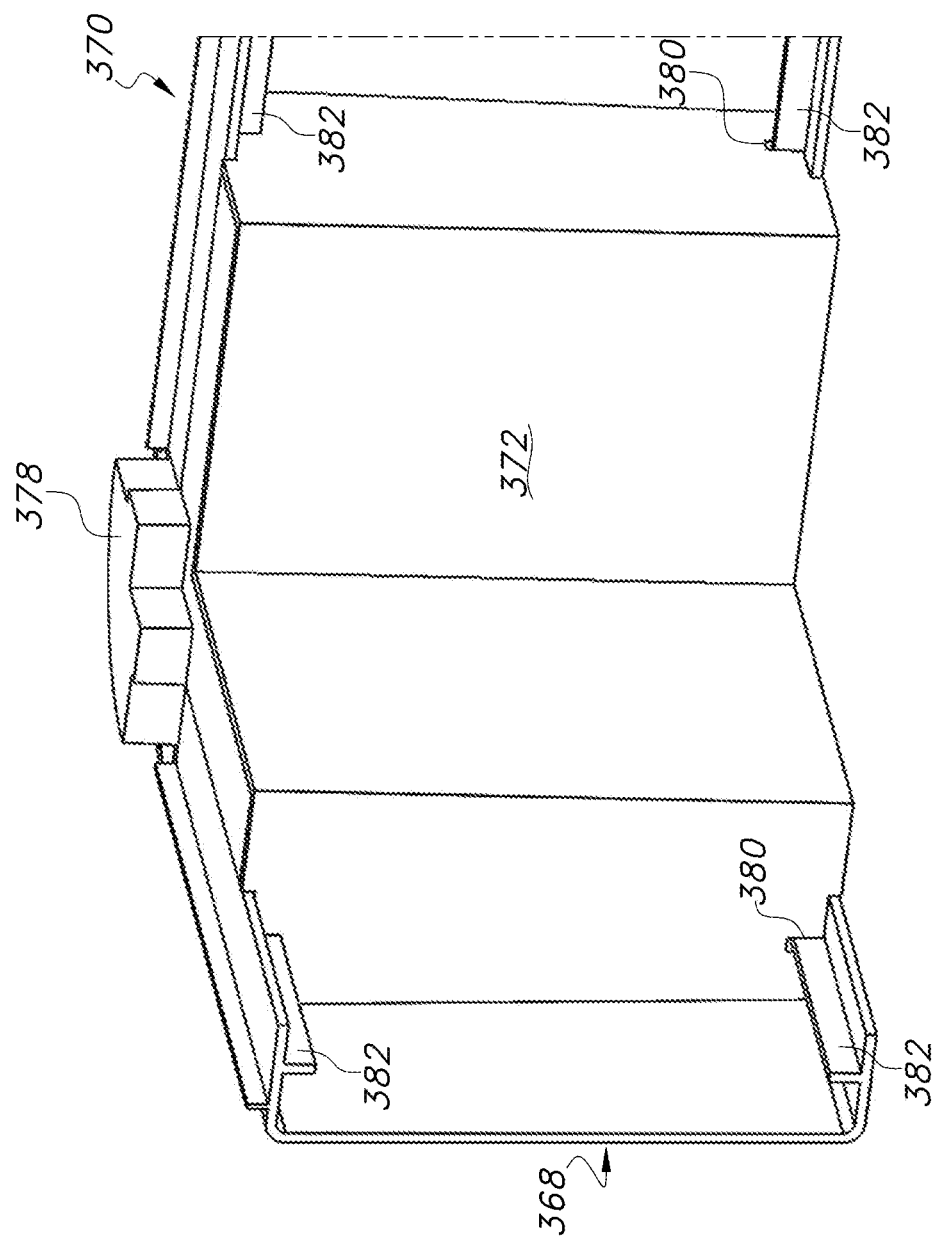

FIG. 23 is a perspective view of a bed frame constructed in accordance with a fourth embodiment of the present invention having an upper bed frame section and a lower bed frame section;

FIG. 24 is an exploded view illustrating the upper bed frame section and the lower bed frame section of the FIG. 23 embodiment in position to be connected together;

FIG. 25 is an exploded view of the lower bed frame section of the FIG. 23 embodiment in position to be connected together;

FIG. 26 is a side cross sectional view illustrating the affixation of a lower side rail to a lower corner member of the FIG. 23 embodiment;

FIG. 27 is a perspective view looking outwardly at a lower corner member affixed to a lower side rail and a lower end cross rail of the FIG. 23 embodiment;

Fifth Embodiment

Figure 28:
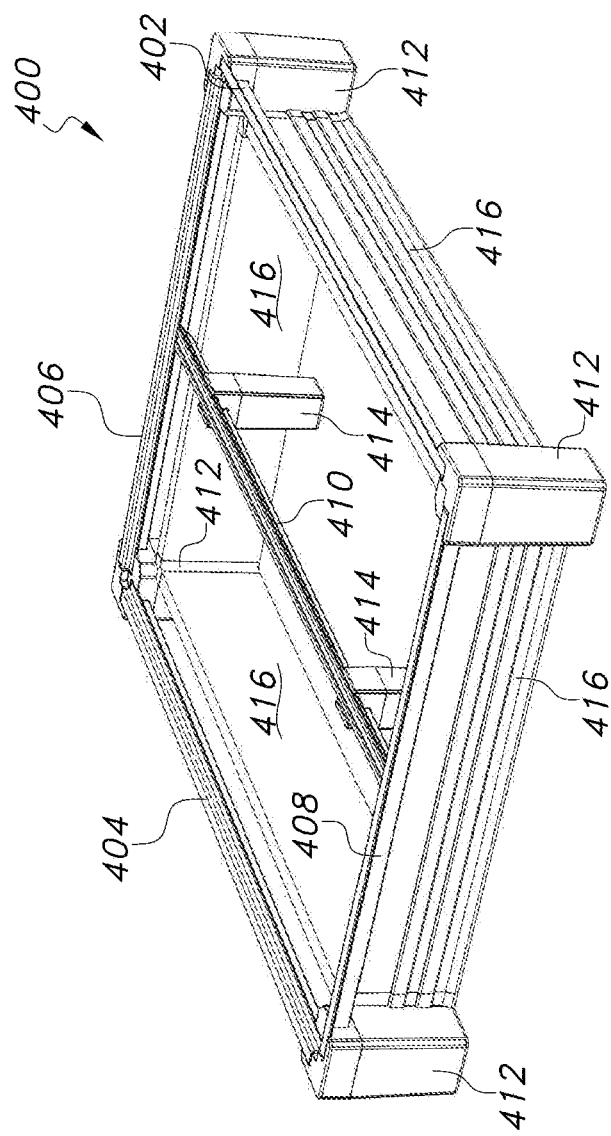
Figure 29:
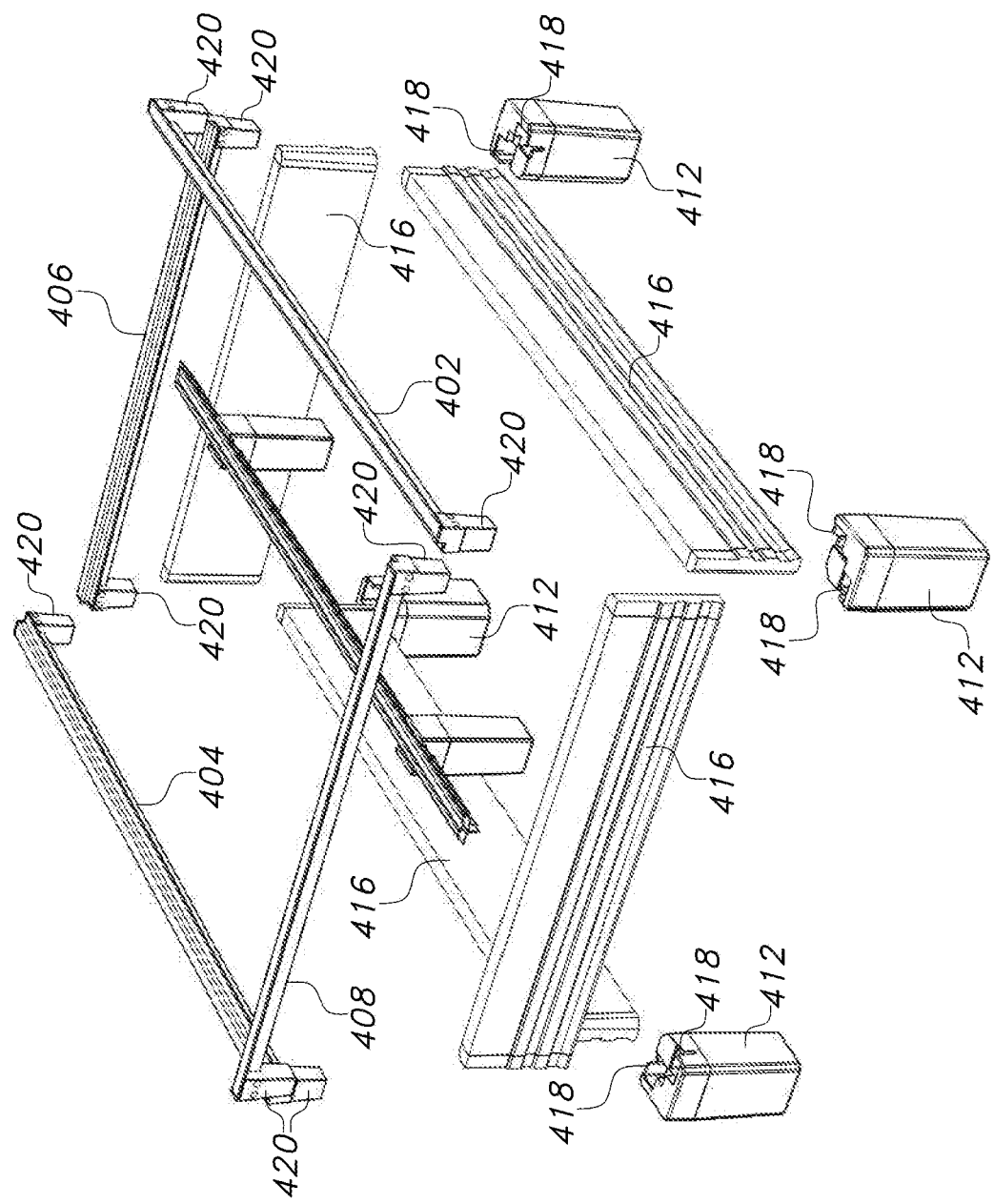
Figure 30:
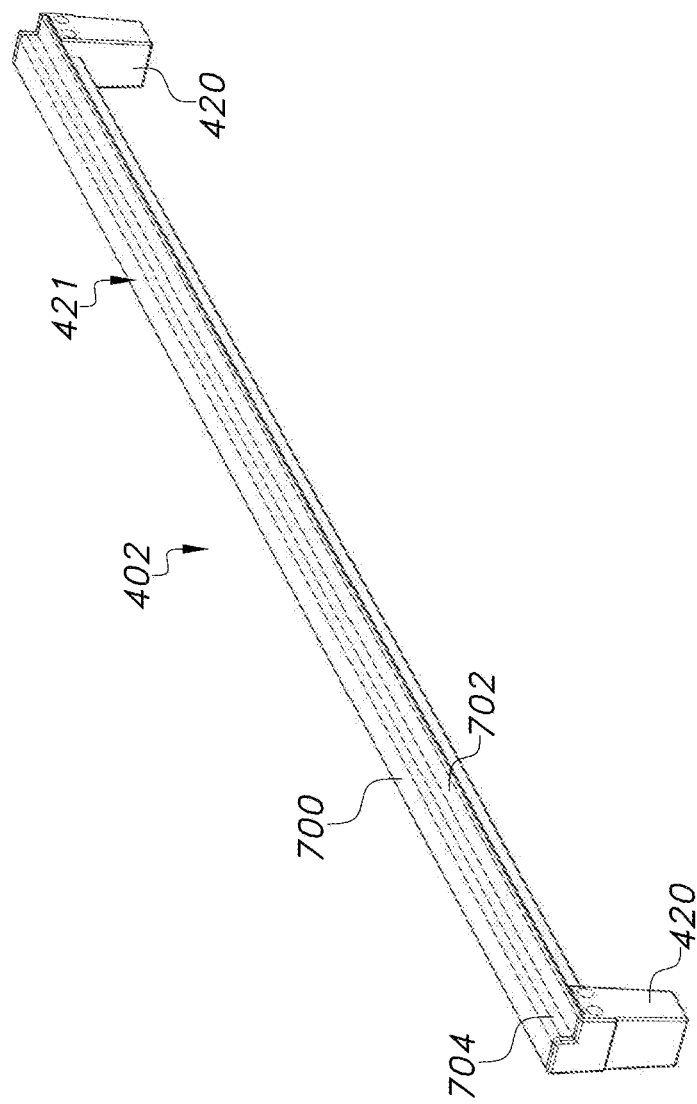
Figure 31:
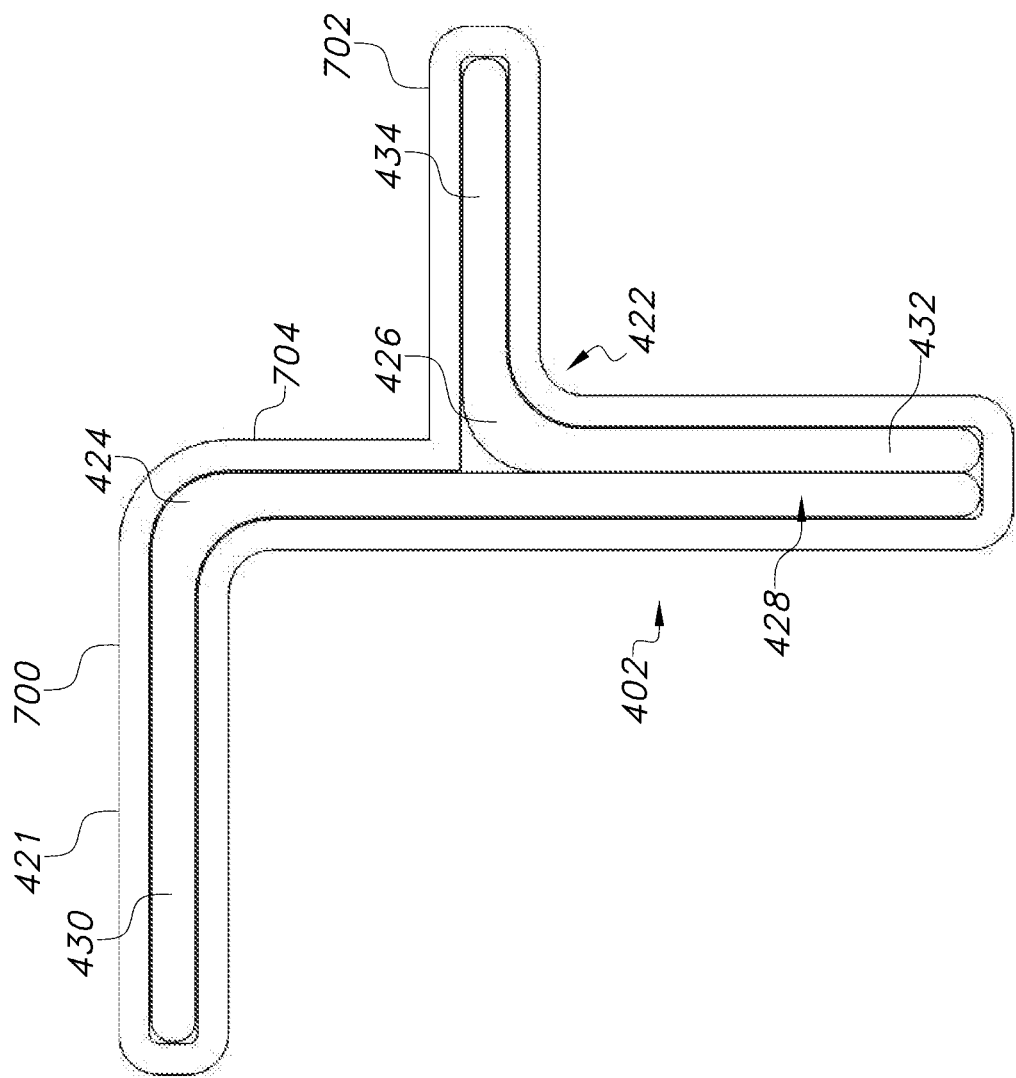
Figure 32:
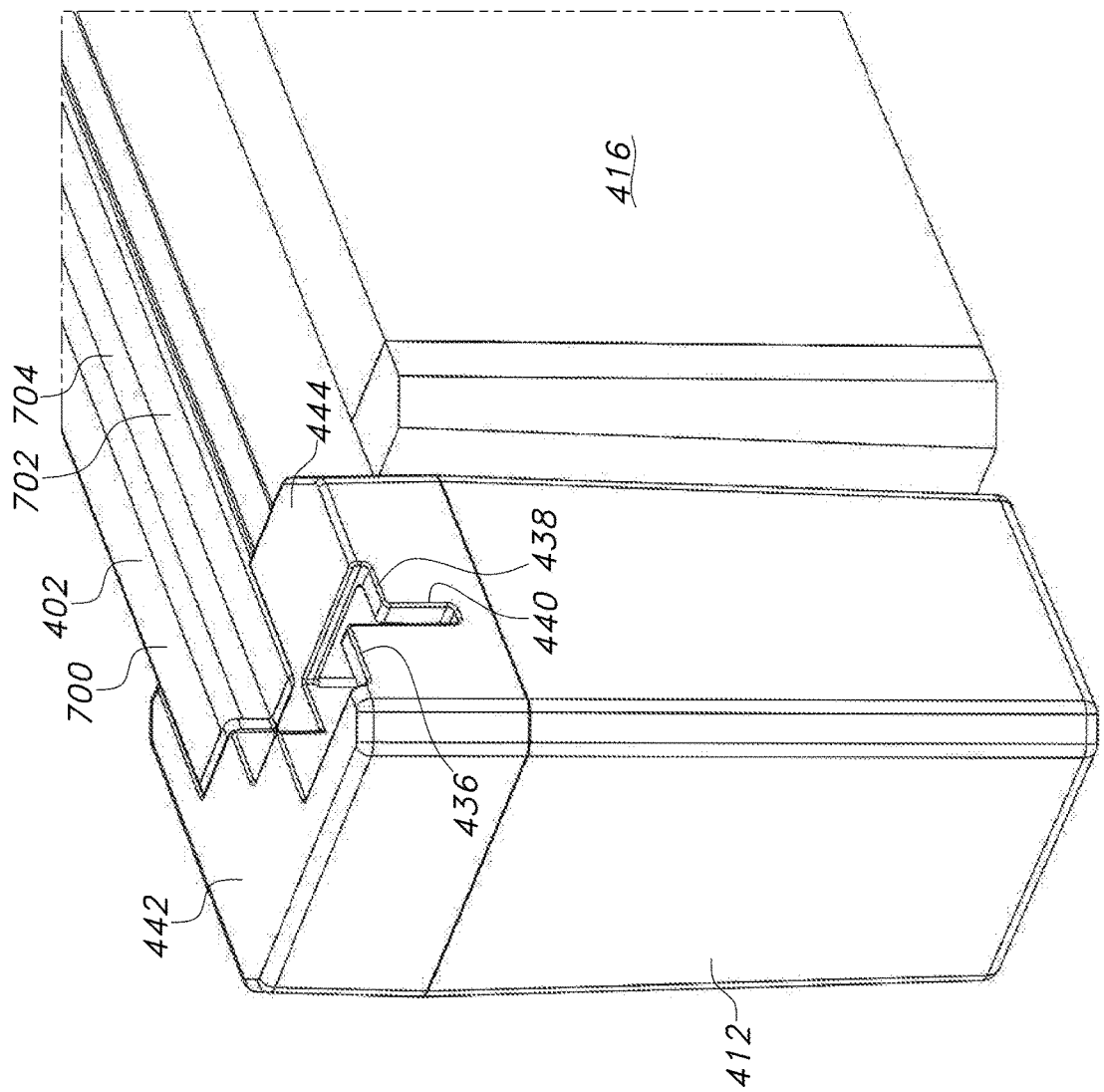
Figure 33:
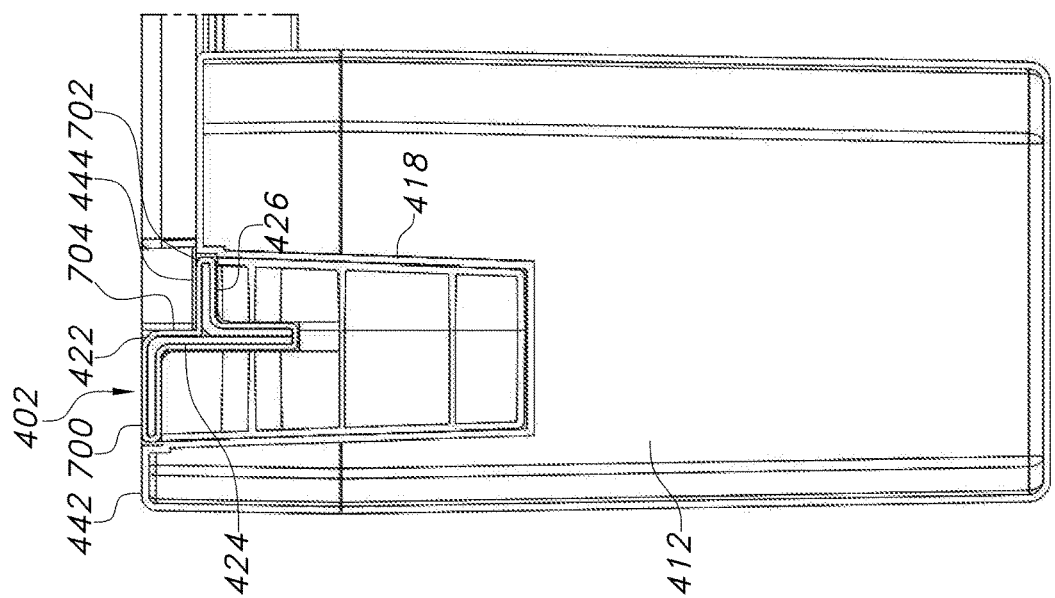
Figure 34:
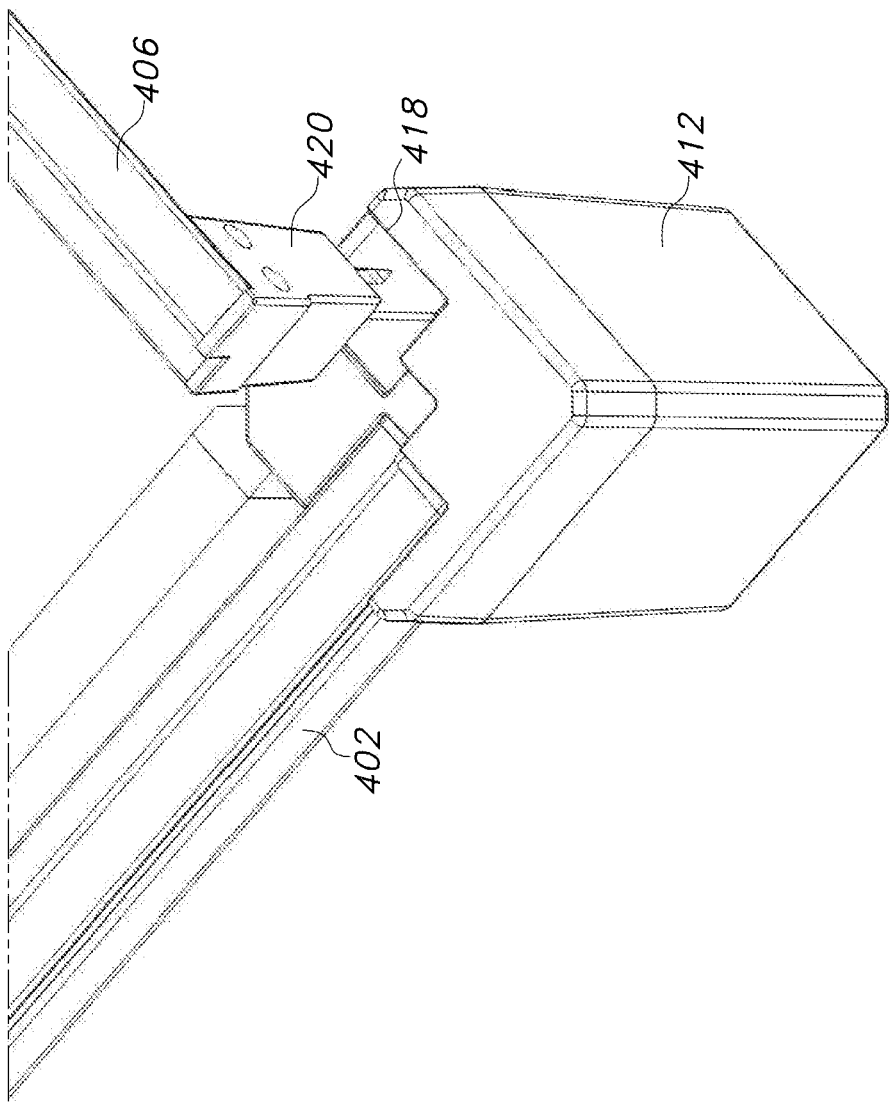
Figure 35:
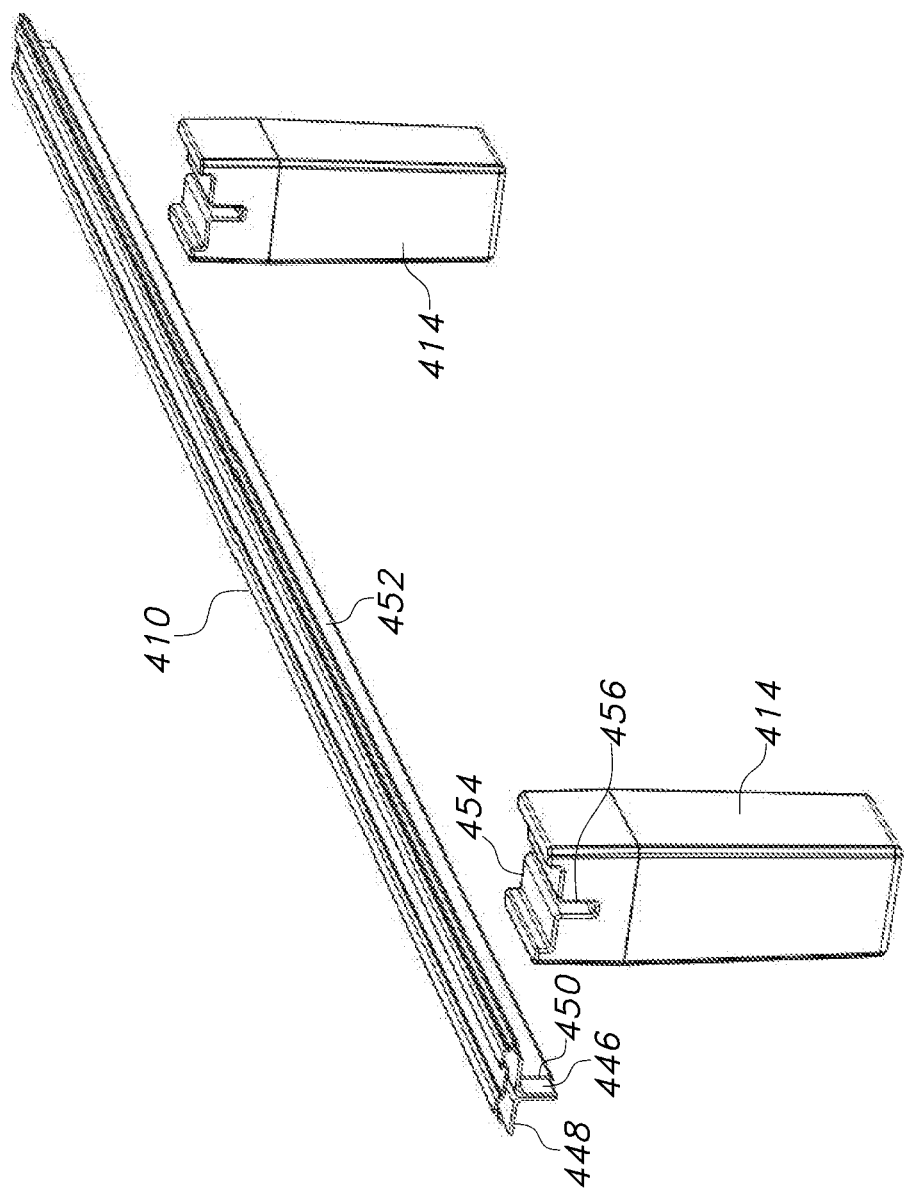
Figure 36:
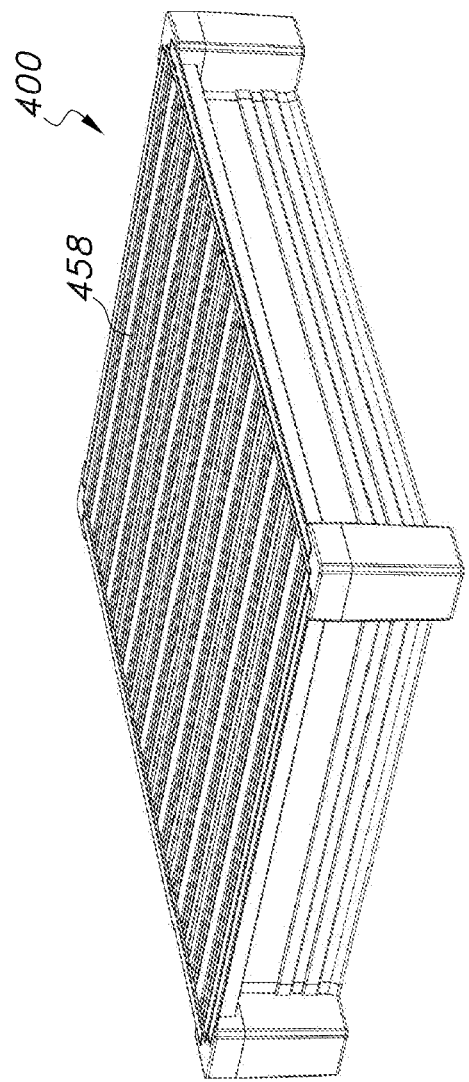
Figure 37:
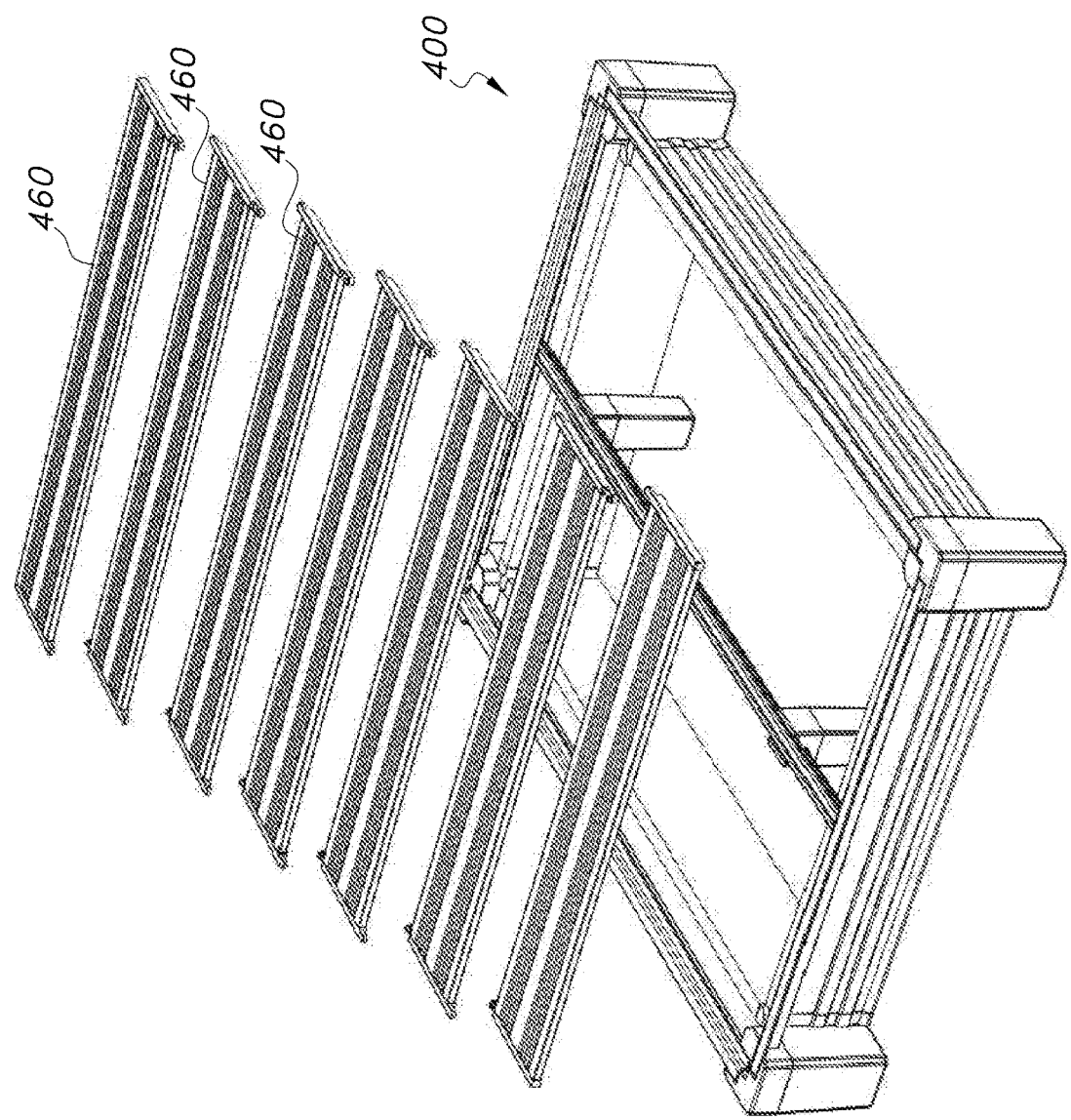
Figure 38:
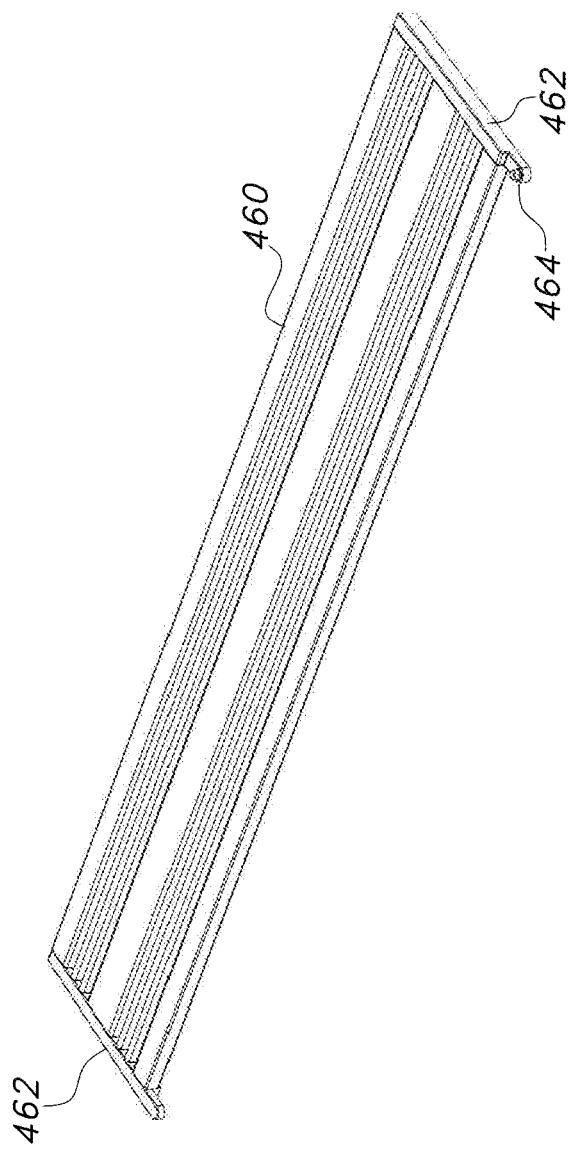
Figure 39:
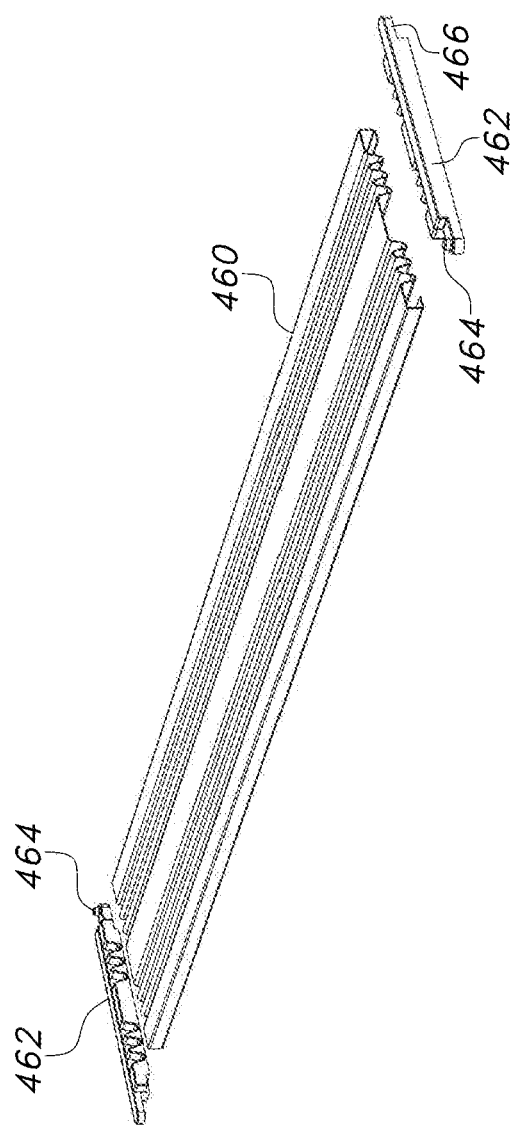

FIG. 28 is a perspective view of a bed frame constructed in accordance with a fifth embodiment of the present invention;

FIG. 29 is an exploded view illustrating the individual components of the bed frame of FIG. 28 in position to be connected together;

FIG. 30 is a perspective view illustrating a side rail or cross rail of the FIG. 28 embodiment;

FIG. 31 is a cross sectional view of the side or cross rail of FIG. 30;

FIG. 32 is a perspective view illustrating the connection between a side rail and a corner member of the FIG. 28 embodiment;

FIG. 33 is as cross sectional view of the connection between a side rail and a corner member;

FIG. 34 is a FIG. 32 is a perspective view illustrating the connection between a side rail, a cross rail and a corner member of the FIG. 28 embodiment;

FIG. 35 is an exploded view illustrating the connection of center rail legs to the center rail of the FIG. 28 embodiment;

FIG. 36 is a perspective view of the bed frame of the FIG. 28 embodiment with a deck forming a top surface of the bed frame;

FIG. 37 is an exploded view illustrating the deck component of the bed frame of the FIG. 28 embodiment in position to be connected thereto;

FIG. 38 is a perspective view of an individual slat panel that makes up the deck or FIG. 35; and FIG. 39 is an exploded view of an individual slat panel illustrating end caps in position to be attached thereto.

Sixth Embodiment

Figure 40:
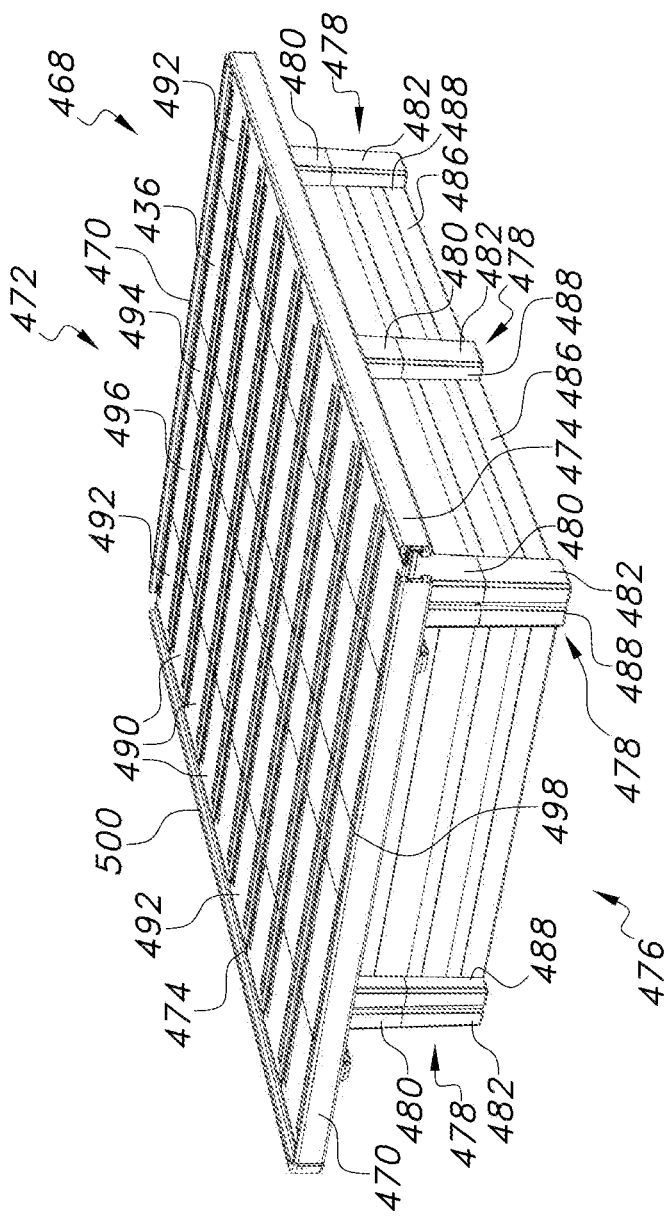
Figure 41:
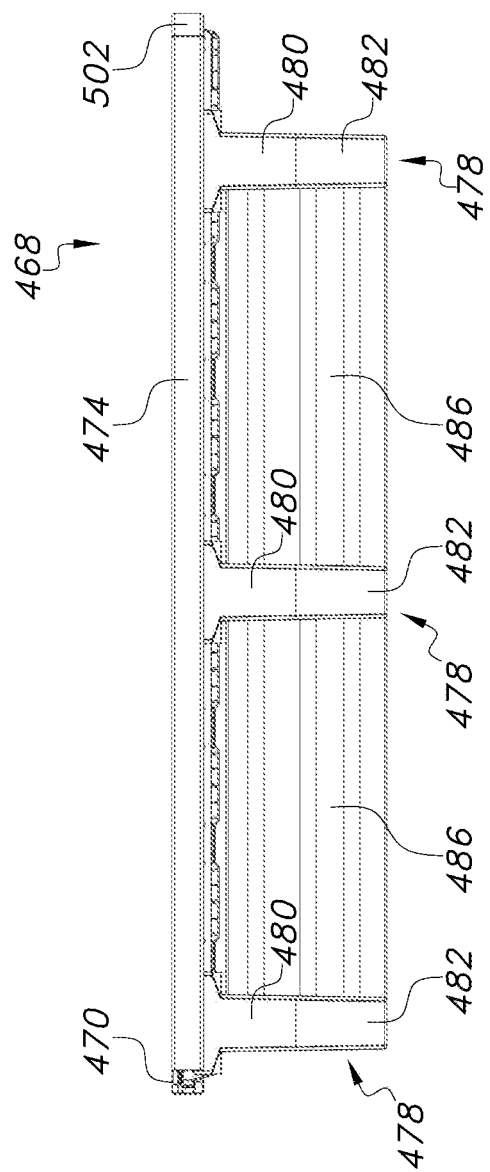

FIG. 40 is a perspective view of the platform bed frame of the present invention at the tall height with privacy panels installed thereon, FIG. 41 is a side view of the platform bed frame of FIG. 40 showing the privacy panels.

Figure 42:
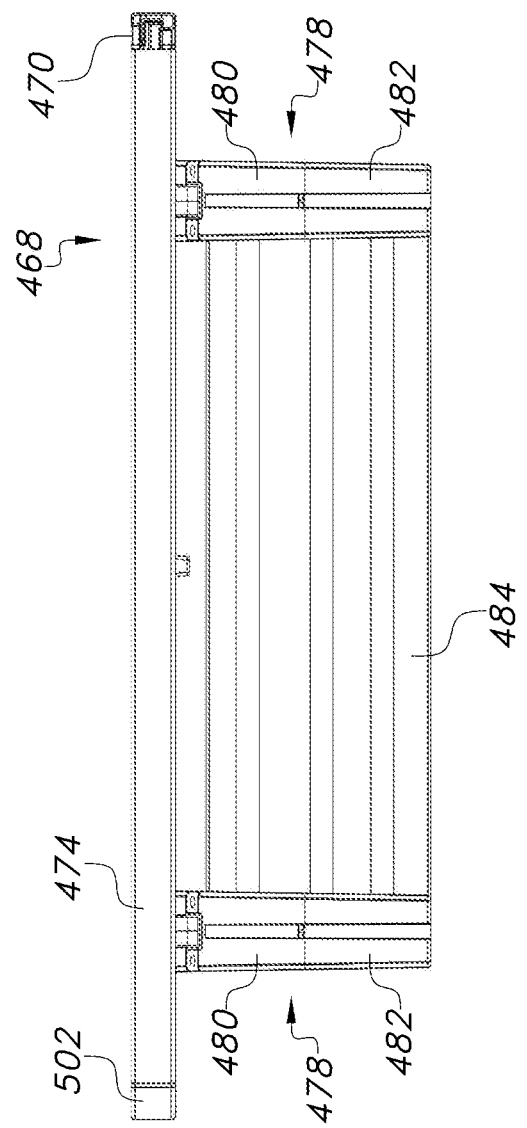
Figure 43:
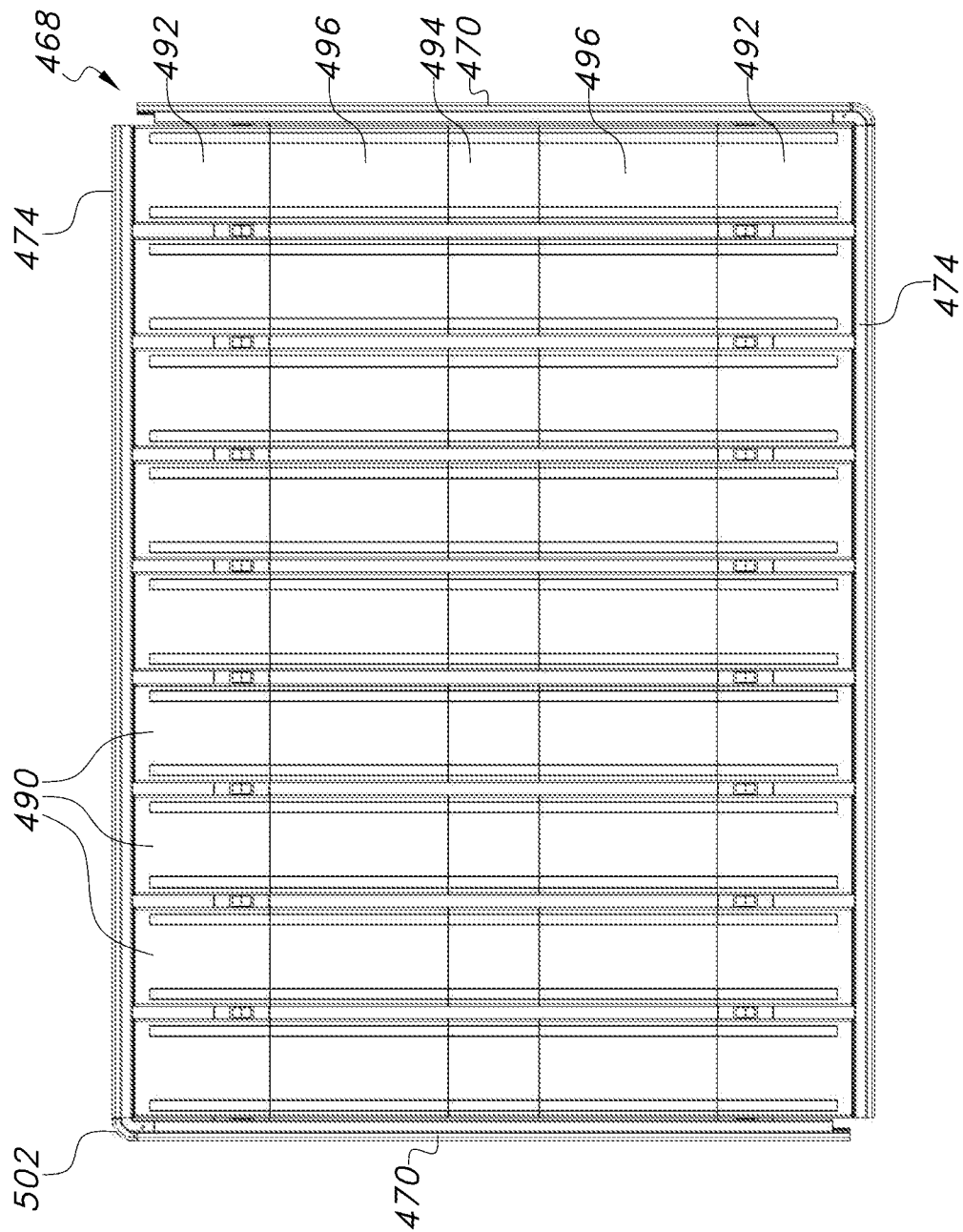
Figure 44:
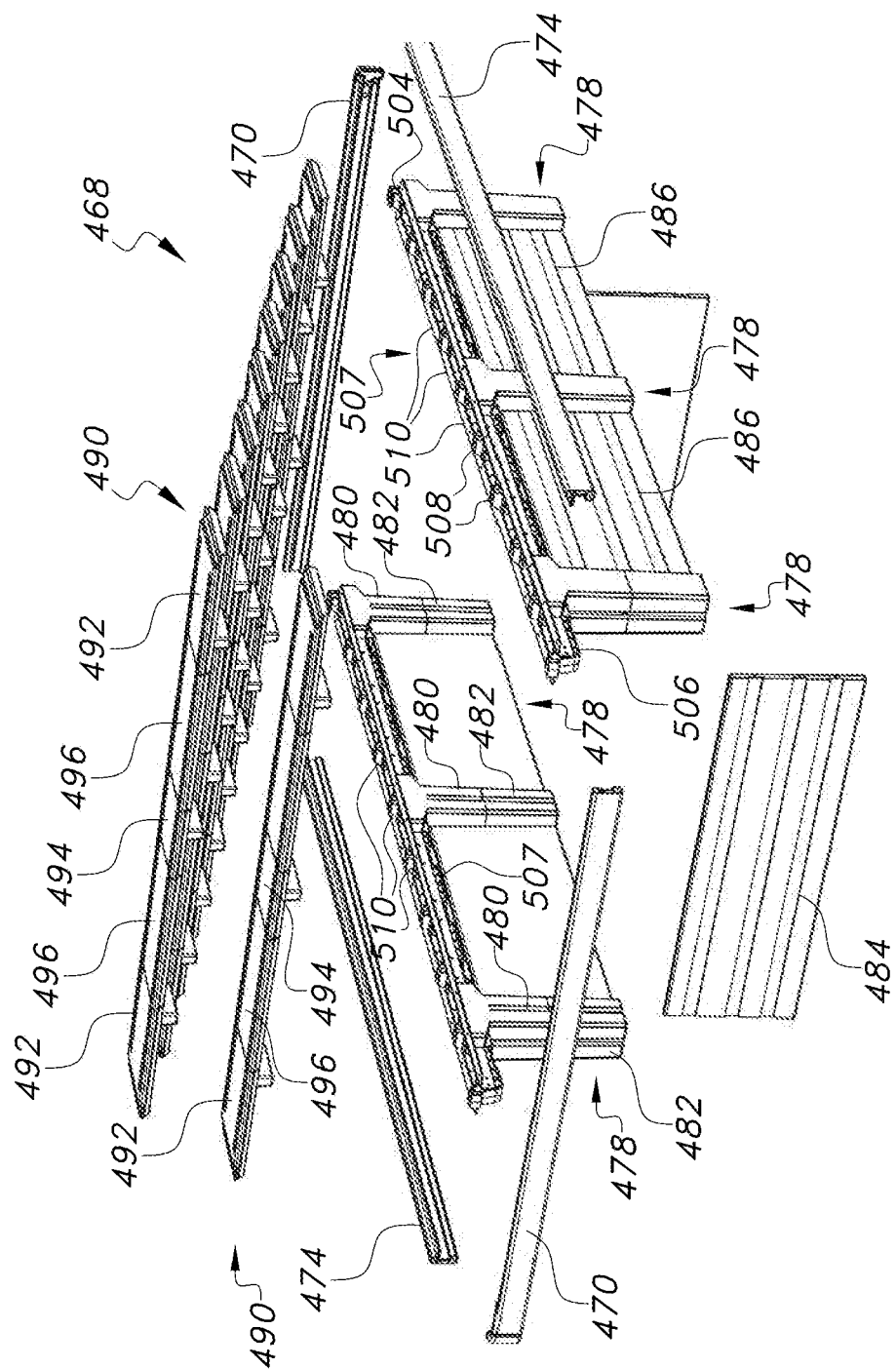
Figure 45:
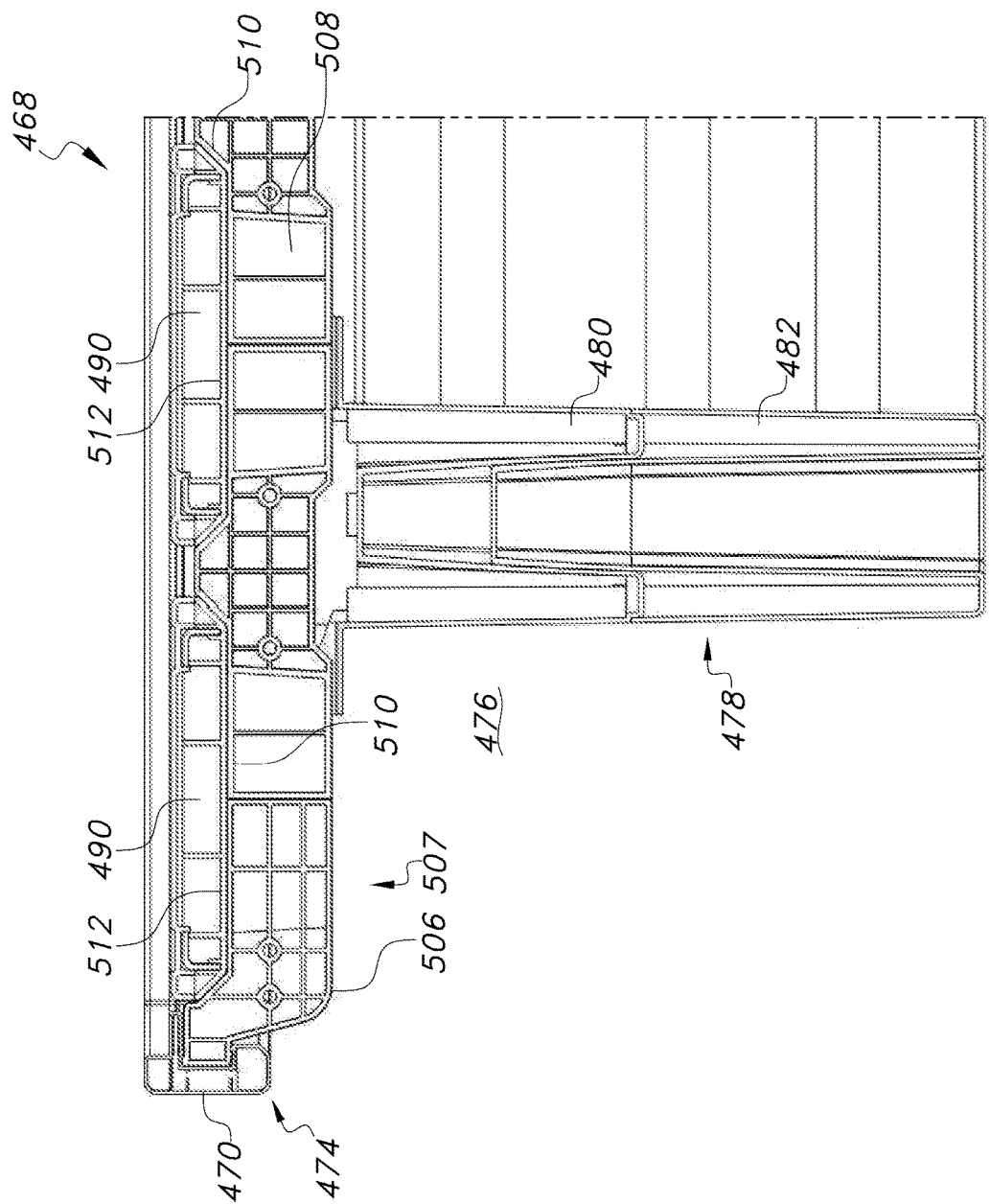
Figure 46:
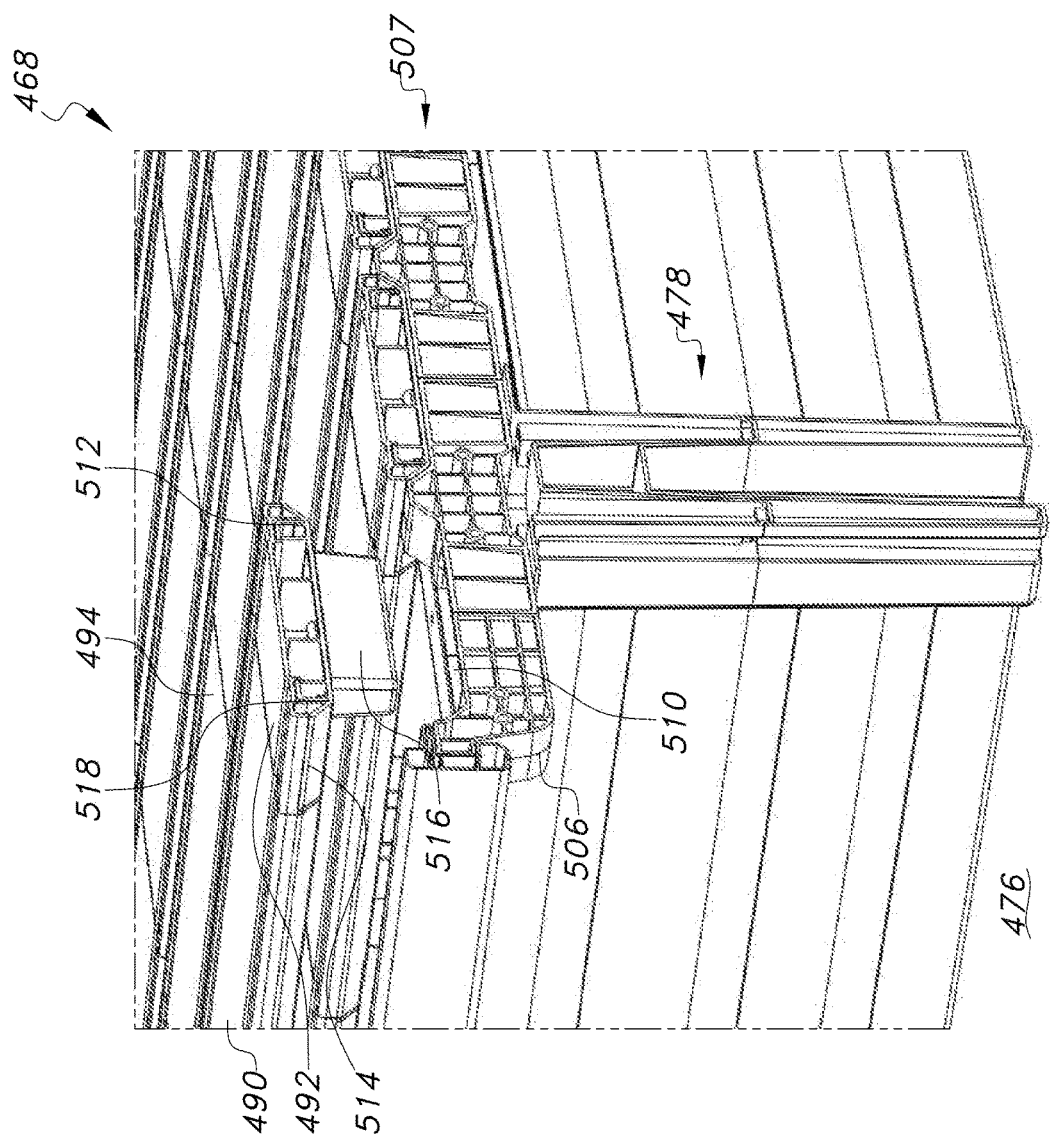
Figure 47:
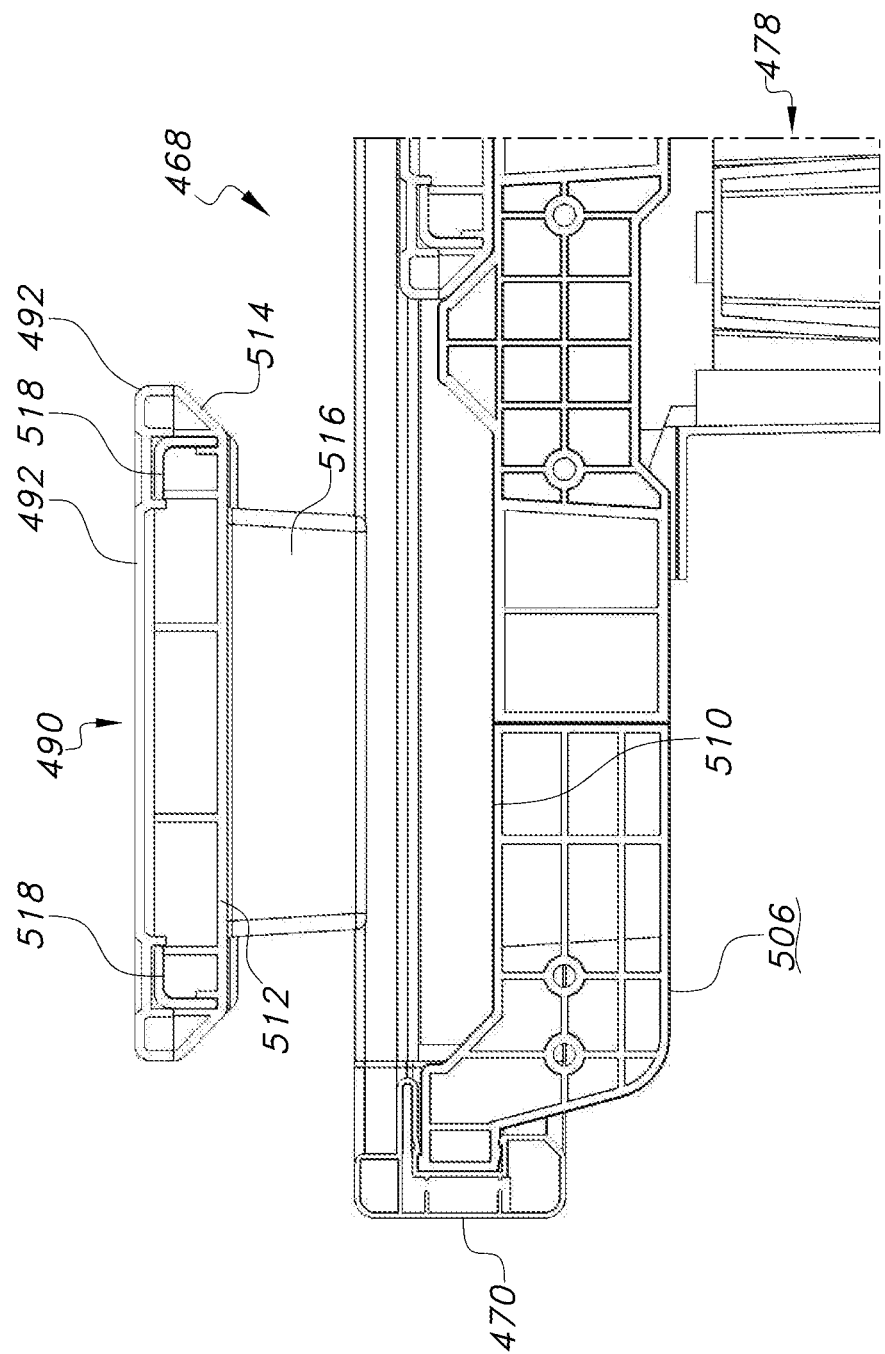
Figure 48:
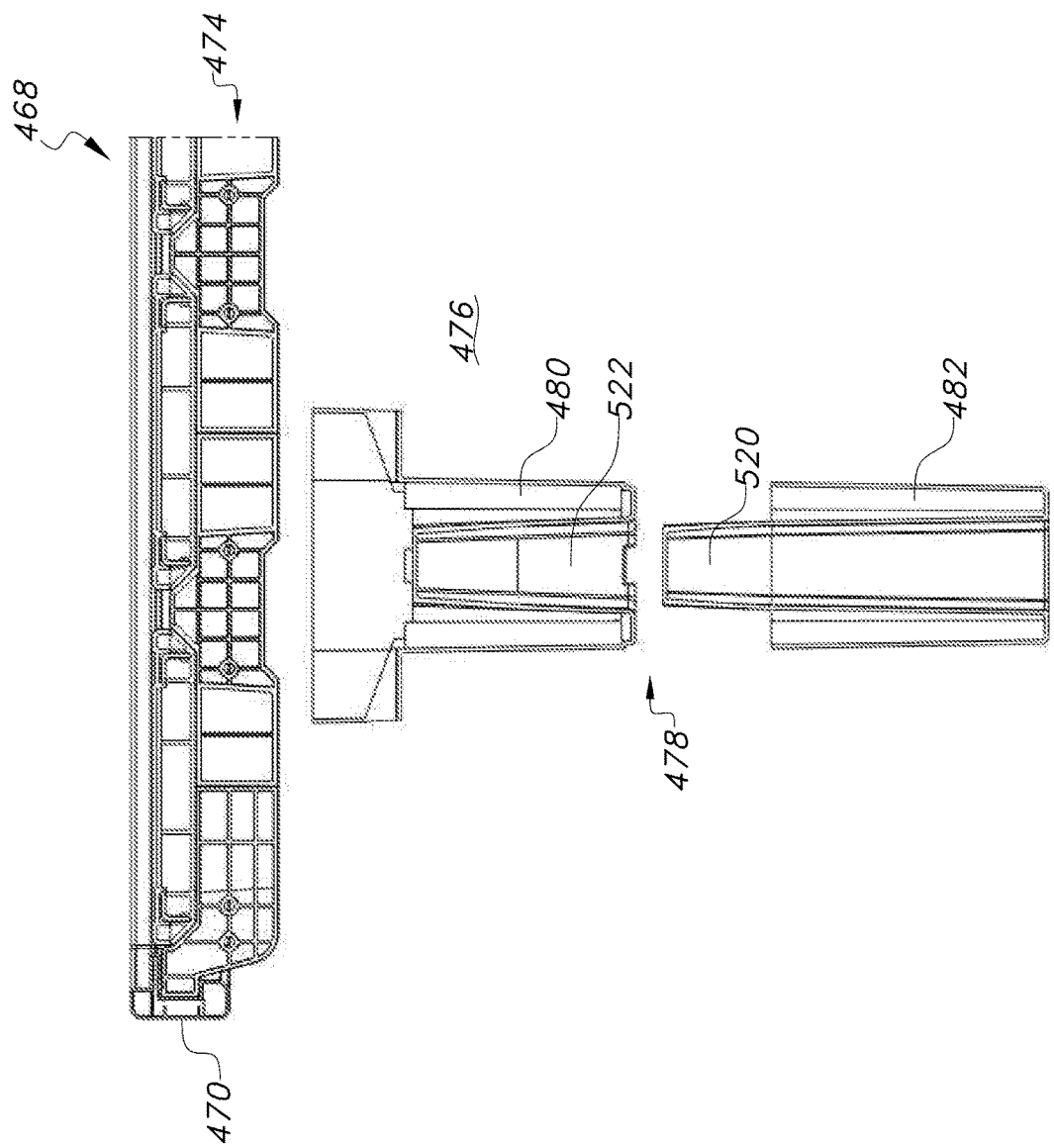
Figure 49:
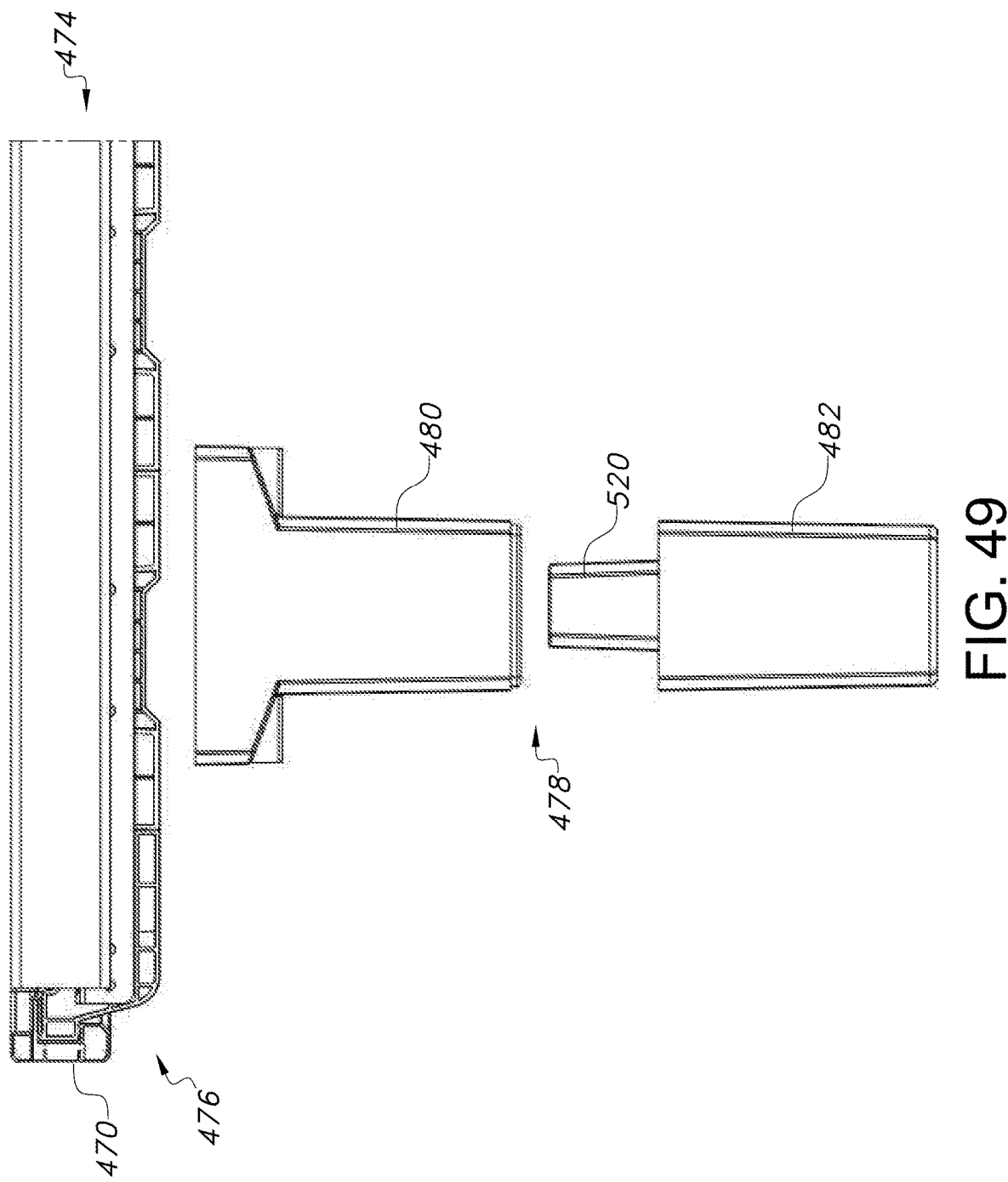
Figure 50:
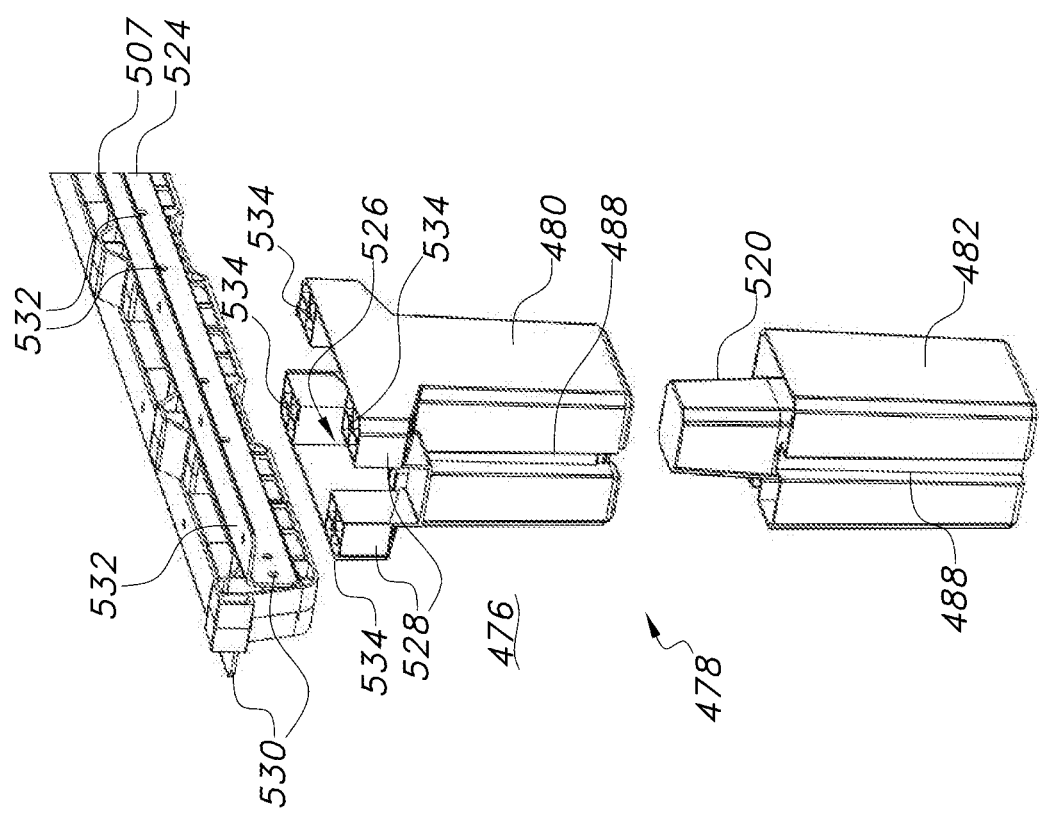
Figure 51:
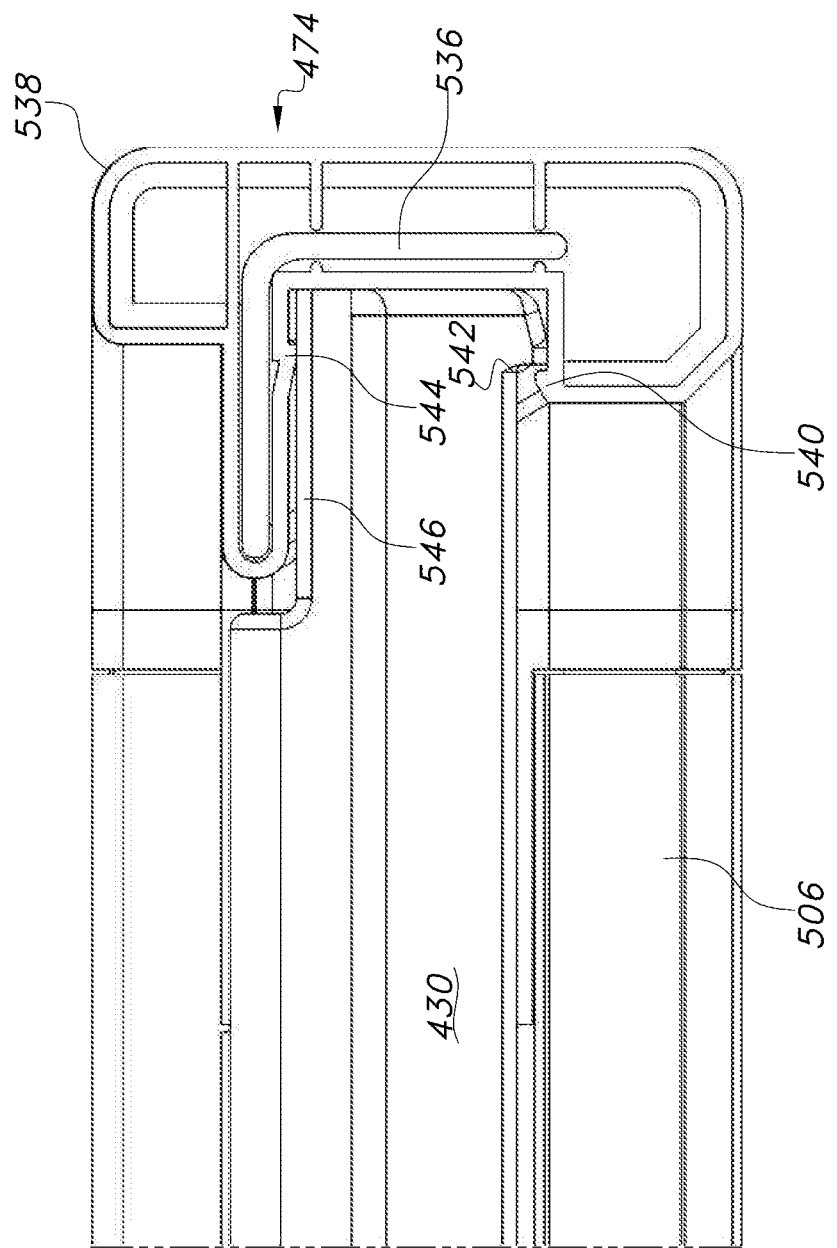
Figure 52:
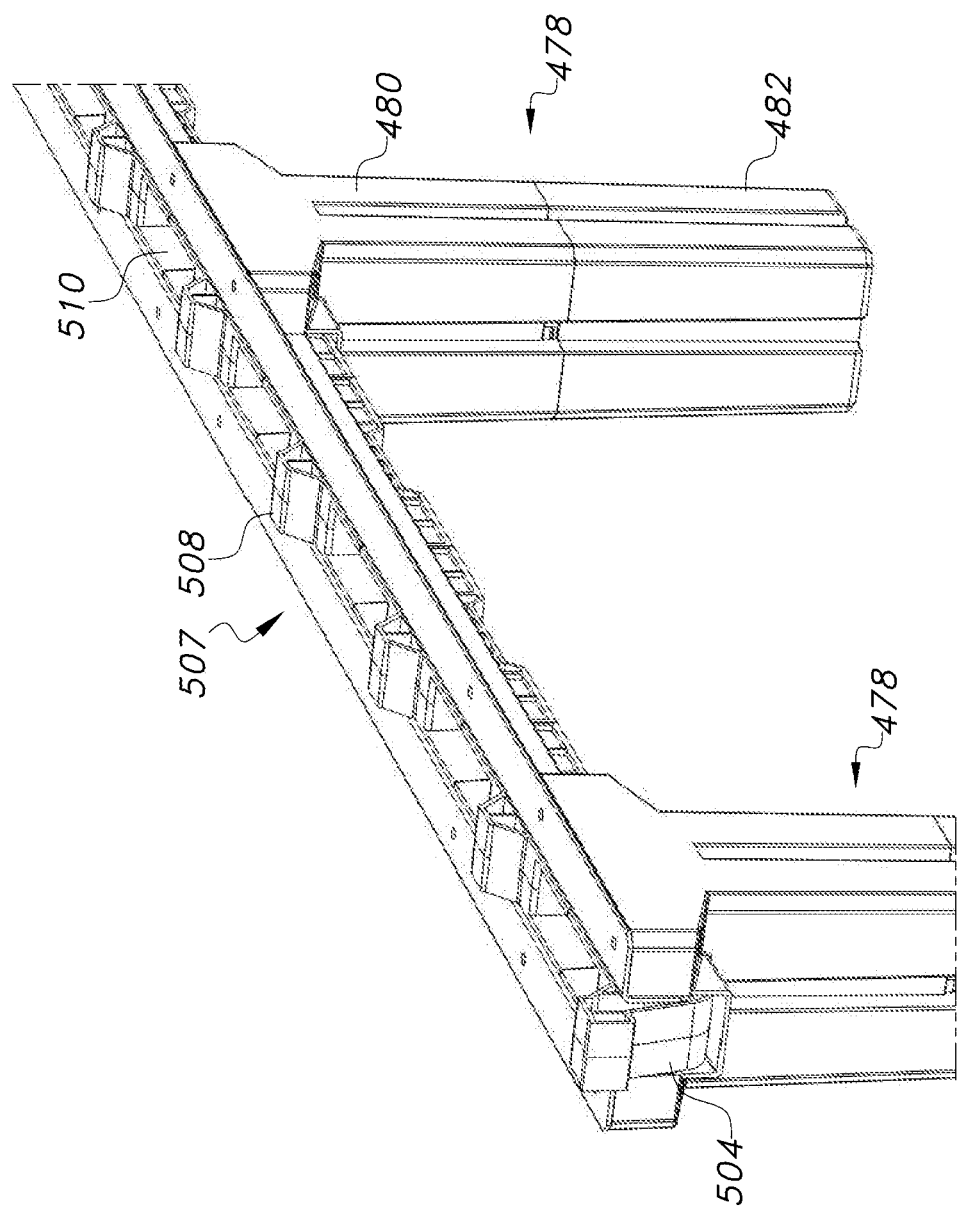
Figure 53:
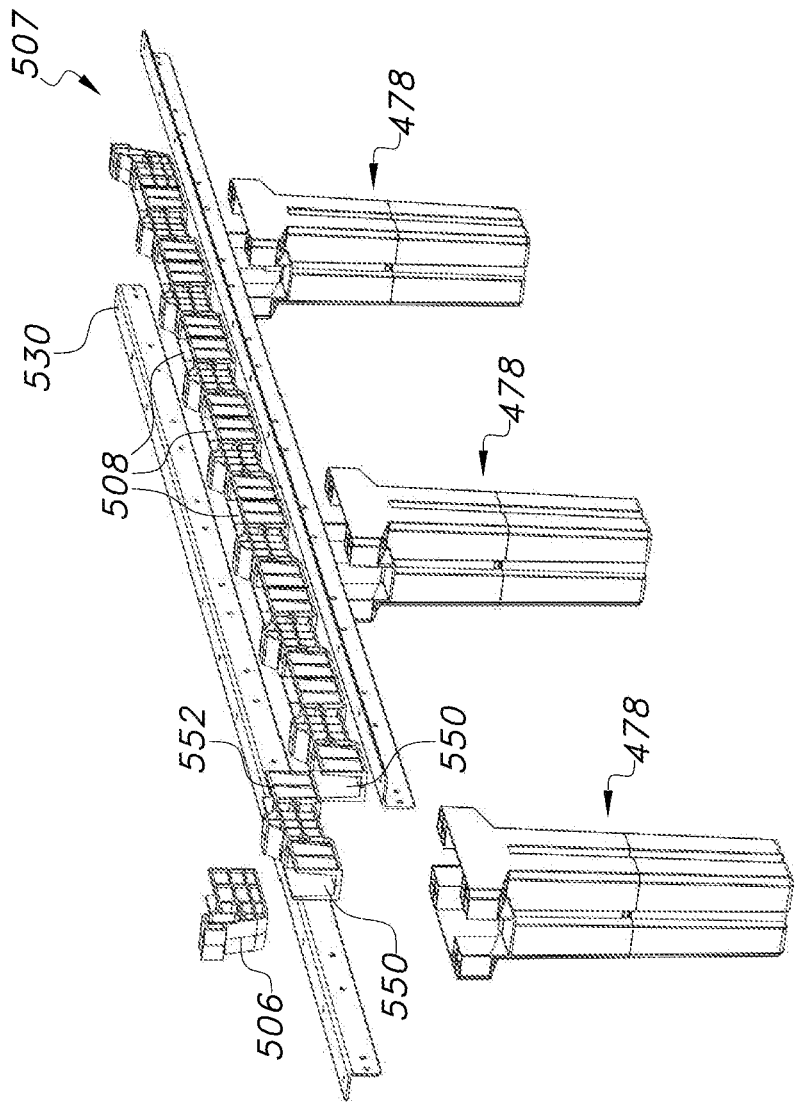
Figure 54:
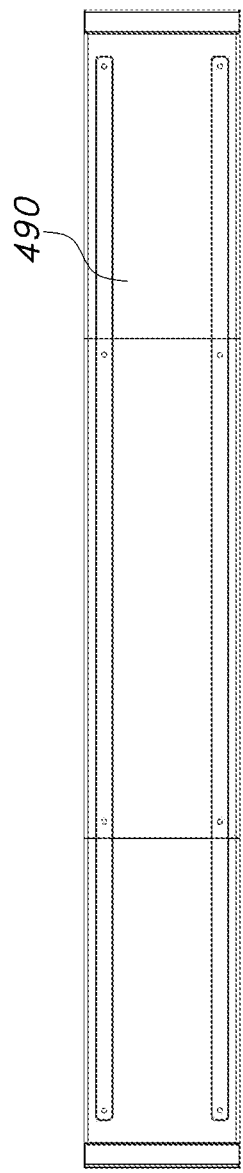
Figure 55:
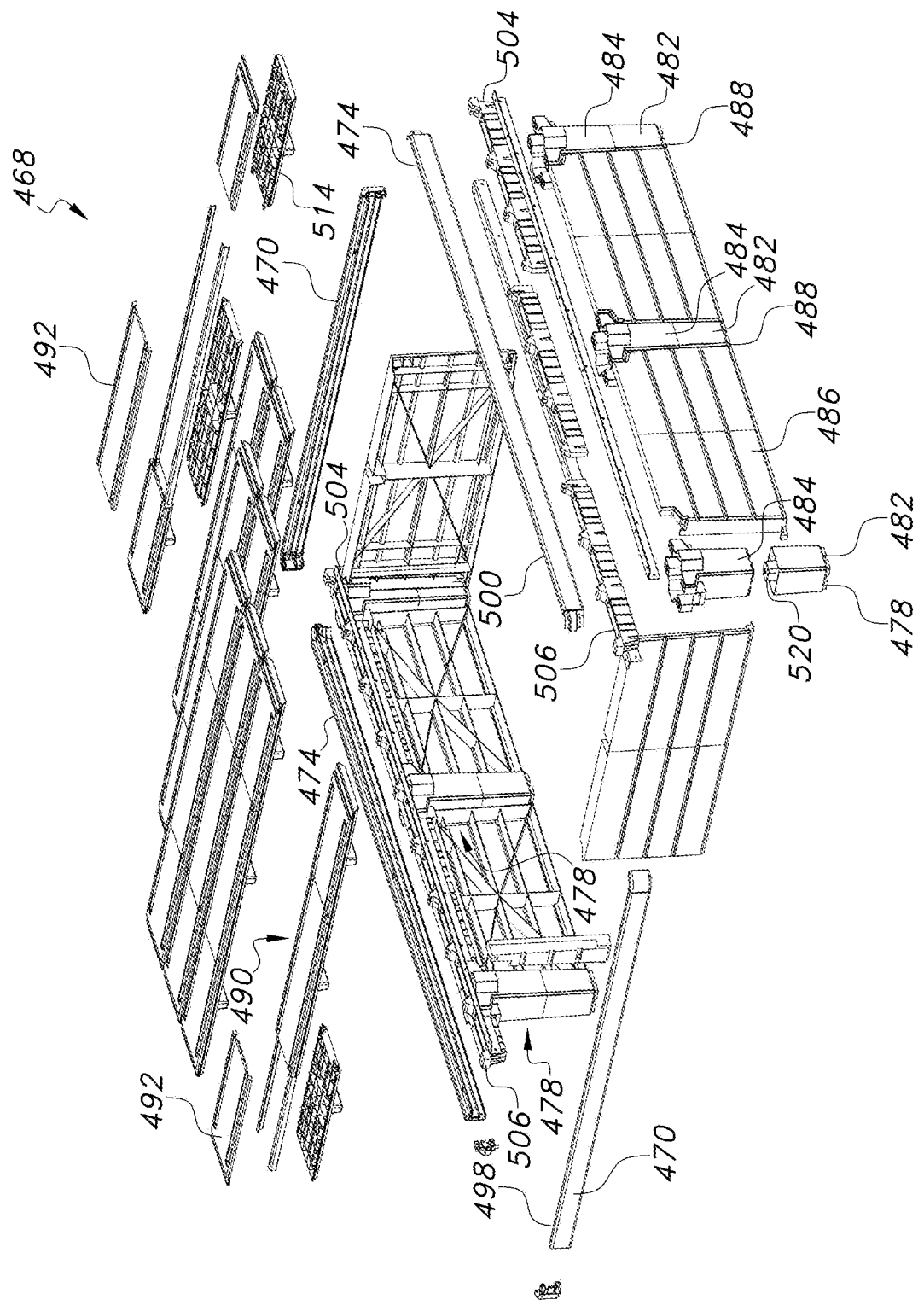

FIG. 42 is an end view of the platform bed frame of FIG. 40,

FIG. 43 is a top view of the platform bed frame showing the surface and the slats that support the mattress, FIG. 44 is an exploded view illustrating the main components of the platform bed frame of FIG. 40, FIG. 45 is a cross sectional side view of a leg located at the foot end of the platform bed frame, FIG. 46 is a perspective view, partly in cross section, showing a leg at the foot end of the platform bed frame with a slat in position to be installed, FIG. 47 is a side cross sectional view showing the foot support end of the platform bed frame with a slat in position to be installed, FIG. 48 is a cross section view of the leg at the foot end of the platform bed frame showing the separate components making up a leg, FIG. 49 is a side view of the leg at the foot end of the platform bed frame showing the separate components making up a leg, FIG. 50 is an exploded view of the leg at the foot end of the platform bed frame and shows the joining of a leg to a slat rail, FIG. 51 is a cross section of the side rail showing the engagement thereof with the foot support end of the platform bed frame, FIG. 52 is a perspective view of the head support end with the side panels removed, FIG. 53 is an exploded view of the slat support rail 76 and illustrating the nesting of the support rail blocks in the construction of the assembled slat rail with the side panels removed, FIG. 54 is a top view of a slat, and FIG. 55 is an exploded view of the entire platform bed frame illustrating the assembly thereof.

DETAILED DESCRIPTION OF THE INVENTION

Figure 1:
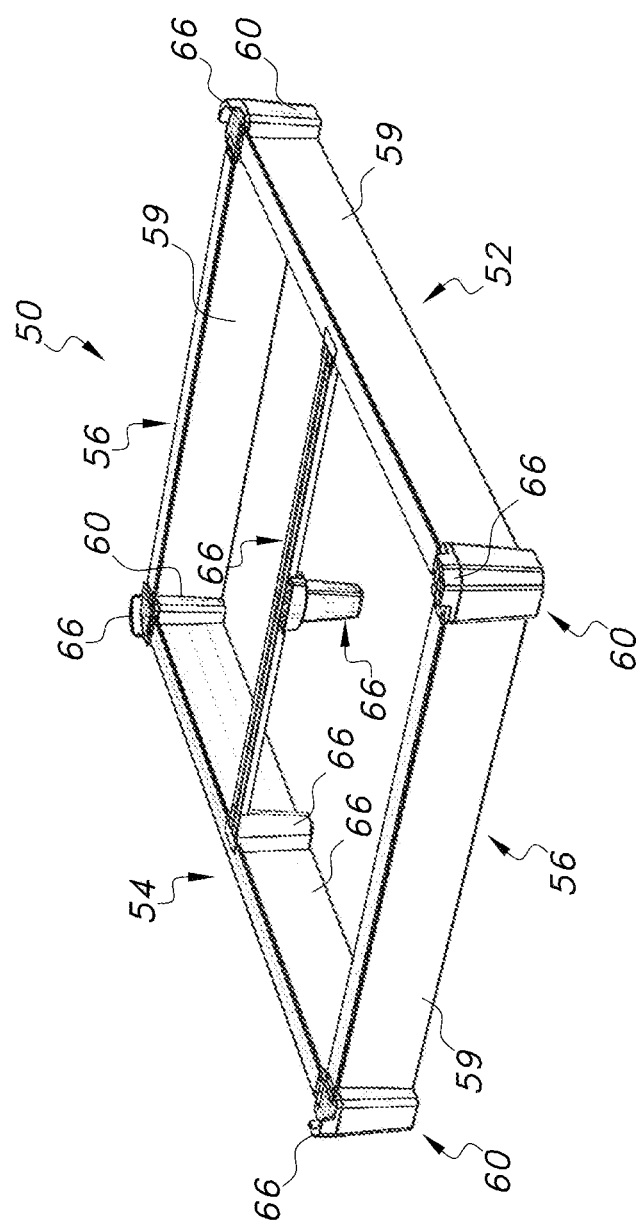
FIG. 1 is a perspective view of a bed frame constructed in accordance with a first embodiment of the present invention and illustrating extruded panels that extend from the upper surface of the bed frame to the floor and that surround the periphery of the bed frame.

Turning first to FIG. 1 there is shown, a perspective view of the first embodiment of a bed frame 50 constructed in accordance with the present invention. As can be seen, the bed frame 50 is assembled and ready for a foundation and mattress and is comprised of two side rails 52, 54 that are attached to three cross rails, that is, two end cross rails 56 and center cross rail 58. The side rails 52, 54 as well as the two end cross rails 56 are, as will be explained, comprised of extruded plastic panels 59 that extend from the top of the bed frame 50 to the floor to block access to the space underneath the bed frame 50 and prevent items from being placed or inadvertently moved to a position underneath the completed bed.

There are four corner legs 60 that are comprised of molded plastic and all of the corner legs 60 are identical. In addition, there is a molded plastic center cross rail leg 62 that provides support for the center cross rail 58 and molded plastic end center cross rail legs 64 (only one of which is seen in FIG. 1) that secure the center cross rail 58 to the side rails 52, 54. The extruded plastic panels 59 are generally flat and are recessed inwardly from the outer perimeter of the bed frame 50. There are also curved flanges 66 formed in each of the corner legs 60 in order to retain the bedding in the desired position.

Figure 2:
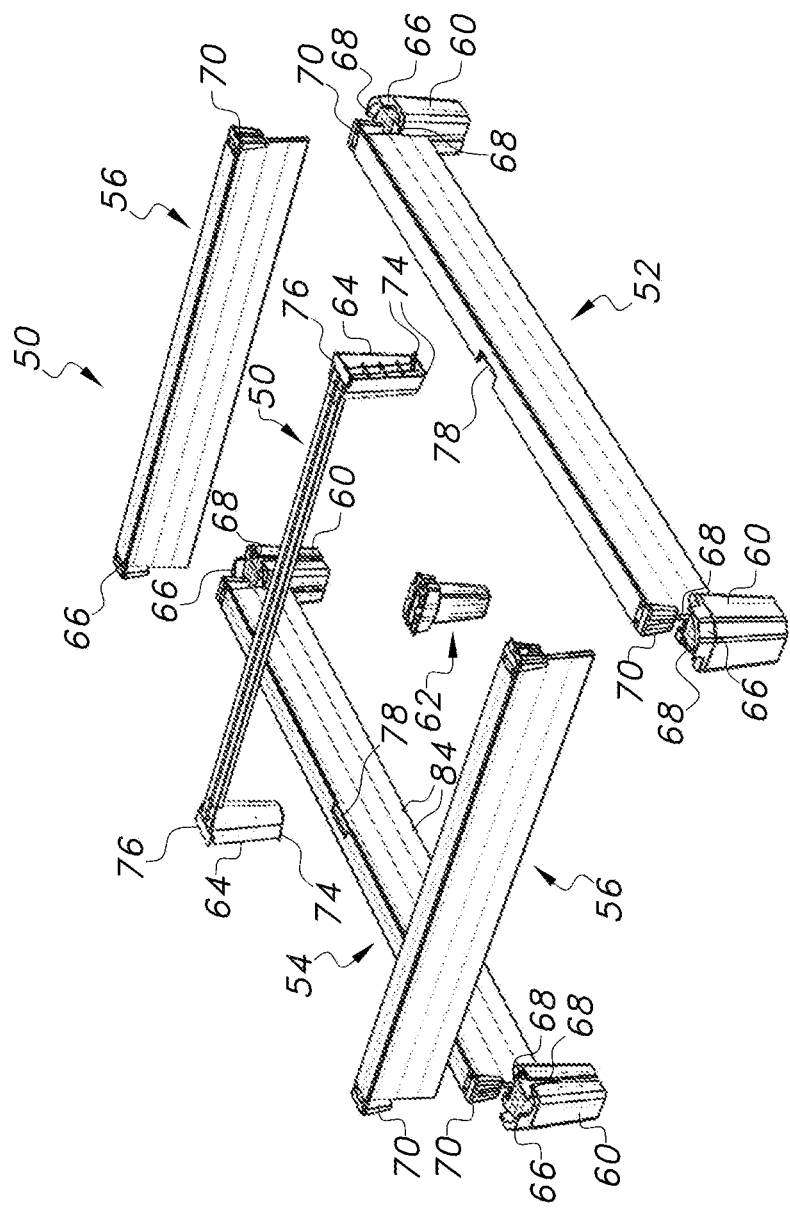
FIG. 2 is an exploded view illustrating the individual components of the bed frame of FIG. 1 in position to be connected together.

Turning then to FIG. 2, taken along with FIG. 1, there can be seen an exploded view illustrating the assembly of the bed frame 50 of this embodiment in position to be connected together. As such, each of the corner legs 60 has two receivers 68, spaced about 90 degrees apart for receiving wedges 70 that are affixed to both ends of the end cross rails 56 and the side rails 52, 54.

As to the center cross rail 58, there is a large wedge 72 that extends downwardly from the center cross rail 58 at about the center thereof and which fits into the cross rail leg 62 to provide the support to the center cross rail 58.

End center cross rail legs 64 are attached to the side rails 52, 54 by a snap-fit by means of small buttons 74 formed along the bottom of the end cross rail legs 64 as well as upper flanges 76 at the top of the ends of the end cross rail legs 64. In the assembly of the bed frame 50, the buttons 74 snap into openings 84 in the side rails 52, 54 and the upper flanges 76 interfit into recesses 78 formed at the tops of the side rails 52, 54.

Thus, the entire bed frame 50 can be easily assembled without the need for tools. The side rails 52, 54 simply drop into the corner legs 60 by the function of the wedges 70 being inserted into the receivers 68. In a similar manner, the end cross rails 56 are dropped into place by the insertion of the wedges 70 into the receivers 68 in the corner legs 60. After that assembly takes place, cross rail leg 62 is affixed to the wedge 72 and the center cross rail 58 is snapped into position affixed to the side rails 52, 54 to finalize the assembly without the use of tools.

Figure 3:
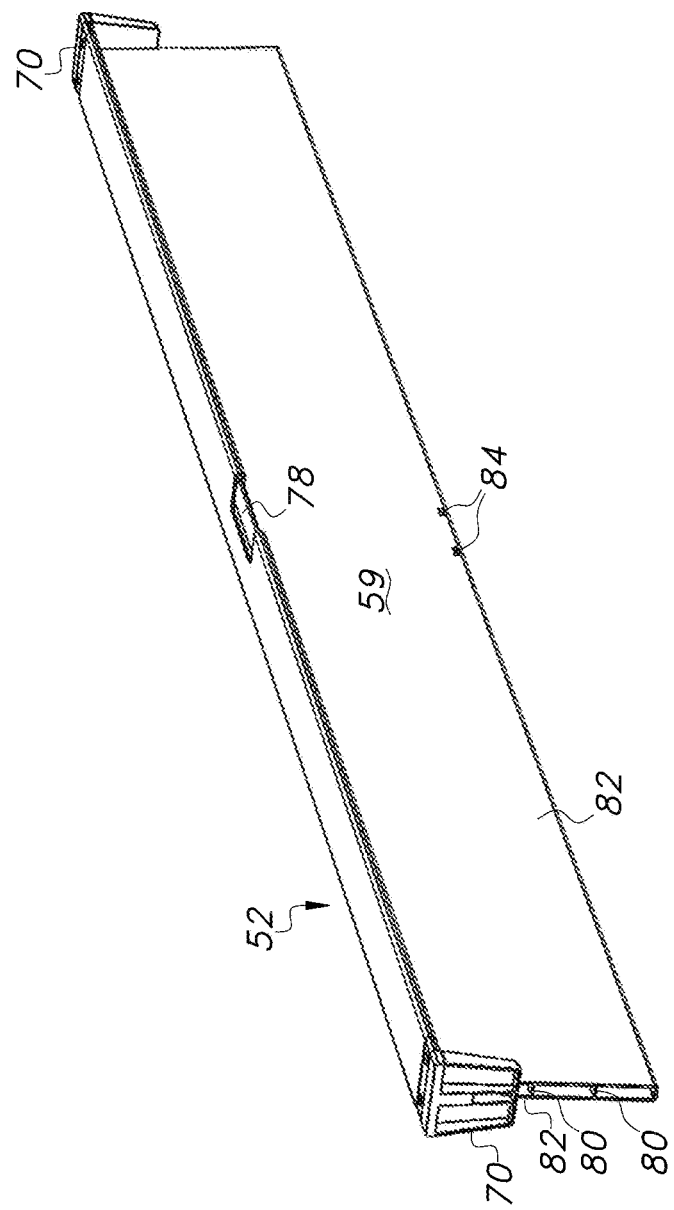
FIG. 3 is a perspective view of a side rail of the FIG. 1 embodiment and illustrating an extruded panel of the present invention.

Turning next to FIG. 3, taken along with FIGS. 1 and 2, there is a perspective view of the side rail 52, it being understood that both side rails 52 and 54 are identical. In FIG. 3, there is shown the plastic panel 59 that extends to the floor of the hotel or other room. The plastic panel 59 includes internal webs 80 that strengthen and separate the lateral sides 82 of the plastic panel 59. The wedges 70 extend outwardly at each end of the side rail 52. As explained, the center cross rail 58 is attached to the side rail 52 by means of the upper flange 76 resting in the recess 78 and the buttons 74 snapping into the openings 84 formed in the plastic panel 59.

Figure 4:
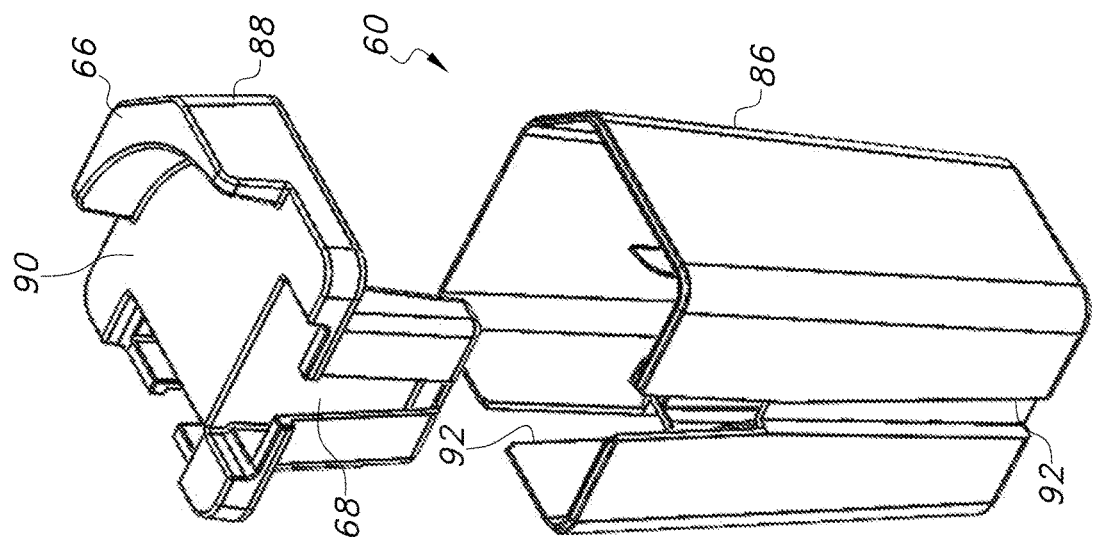
FIG. 4 is an exploded view showing a corner leg of the FIG. 1 embodiment.

Turning next to FIG. 4, there is an exploded view illustrating the components of corner leg 60 in position to be connected. The corner leg 60 is preferably comprised of two parts, that is, a lower body 86 and an upper body 88 that are affixed together with the upper body 88 interfitting inside the lower body 86. As can be seen, two receivers 68 are formed in the upper body 88, preferably about 90 degrees apart. The curved flange 66 extends upwardly from an upper surface 90 of the upper body 88. In the lower body 86, there is an elongated slot 92 that has a generally vertical axis and extends at least substantially along the entire vertical height of the lower body 86 and, as will be seen, is used to secure the plastic panels 59 (FIG. 3) to the corner legs 60. As described, all of the corner legs 60 are identical.

Figure 5:
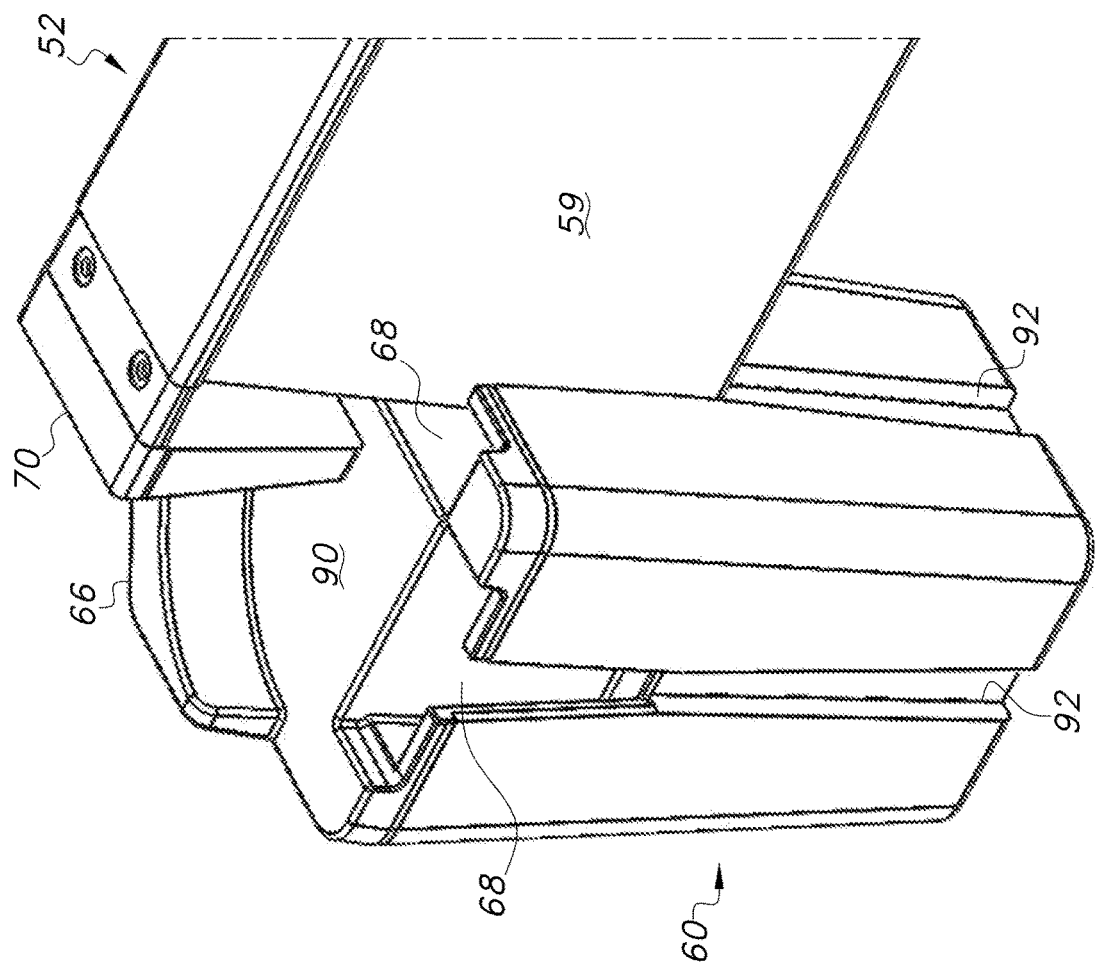
FIG. 5 is an exploded view illustrating a corner leg and a side rail of the FIG. 1 embodiment in position to be connected together.

In FIG. 5, there is an exploded view illustrating a side rail 52 and a corner leg 60 of the FIG. 1 embodiment in position to be connected together. Again, the connection shown in FIG. 5 is typical of the connections between the corner legs 60 and both side rails 52, 54 and both end cross rails 56. Accordingly, the side rail 52 is in position for being affixed to the corner leg 60, that is, the wedge 70 is being inserted into the receiver 68 where the plastic panel 59 is fitted into the elongated slot 92. Upon completion of the affixation, the side rail 52 is fully affixed to the corner leg 60 and the plastic panel 59 rests within the elongated slot 92 to produce a finished junction that is esthetically pleasing.

Figure 6:
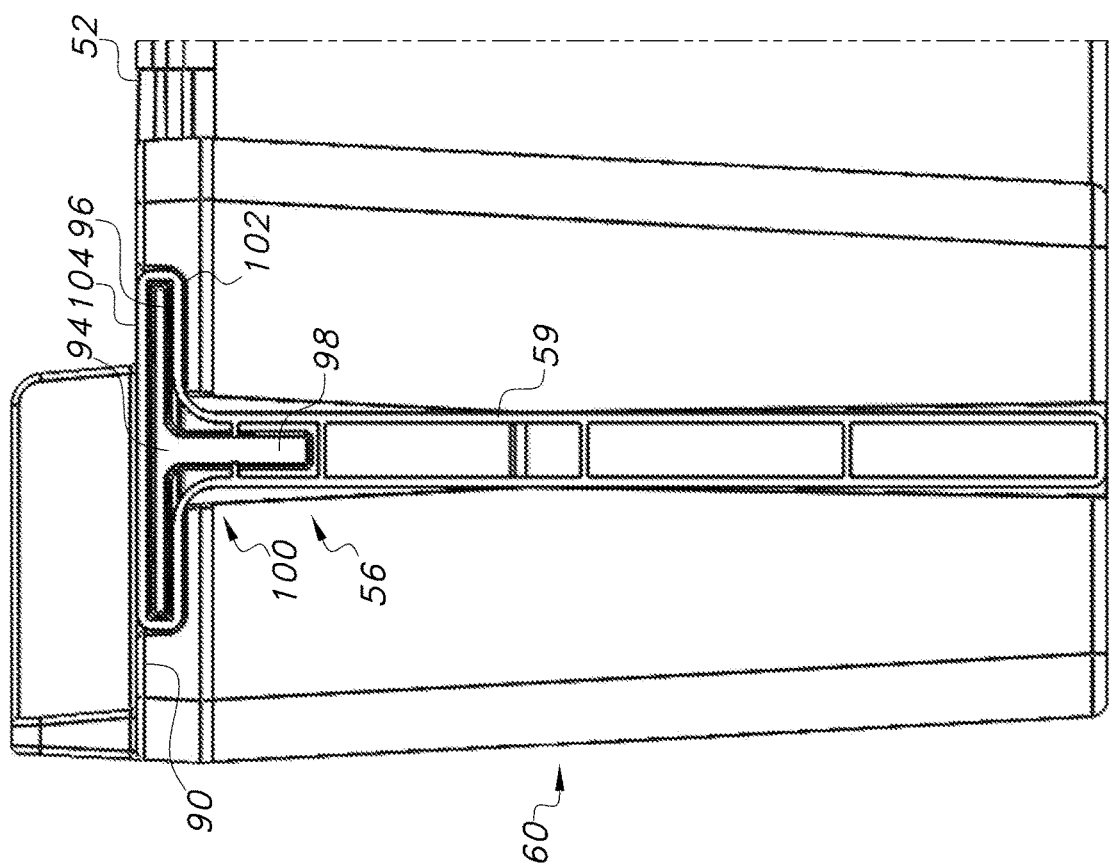
FIG. 6 is a cross-sectional view illustrating the construction of a cross rail of the FIG. 1 embodiment.

Turning now to FIG. 6, there is a cross sectional view illustrating the construction of side rail 52, as well as end cross rail 56. As can be seen, the extruded plastic panel 59 has a T-shaped metal member 94 at its upper portion and the T-shaped metal member 94 may be a unitary T-shaped member or may be made up to two L-shaped angle irons affixed together. In any event, the T-shaped member 94 includes a horizontal flange 96 and a vertical flange 98 extending downwardly therefrom.

The T-shaped metal member 94 reinforces the rigidity of the plastic panel 59 as well as supports the weight of the bedding and occupant(s). In addition, since the T-shaped member 94 is fully encased within the plastic panel 59 and all connections are hidden, the bed frame 50 has a clean furniture look that does not need to be hidden from view.

The upper portion 100 of the plastic panel 59 is formed so as to surround the T-shaped member 94 and provide a finished appearance as well as enhance safety due to the absence of sharp metal edges or corners. As also can be seen, there is a recess 102 in the corner leg 60 so that the upper portion 100 of the plastic panel 59 including the T-shaped metal member 94 can be inserted into the corner leg 60.

In that manner, the upper surface 104 of the plastic panel 59 is co-planar with the upper surface 90 of the corner leg 60 to provide a smooth, even surface for support of the bedding. Two recesses 102 are, of course, provided in each of the corner legs 60 at about 90 degrees apart with respect to each other for receiving a side rail 52, 54 or an end cross rail 56 (FIG. 1).

Figure 7:
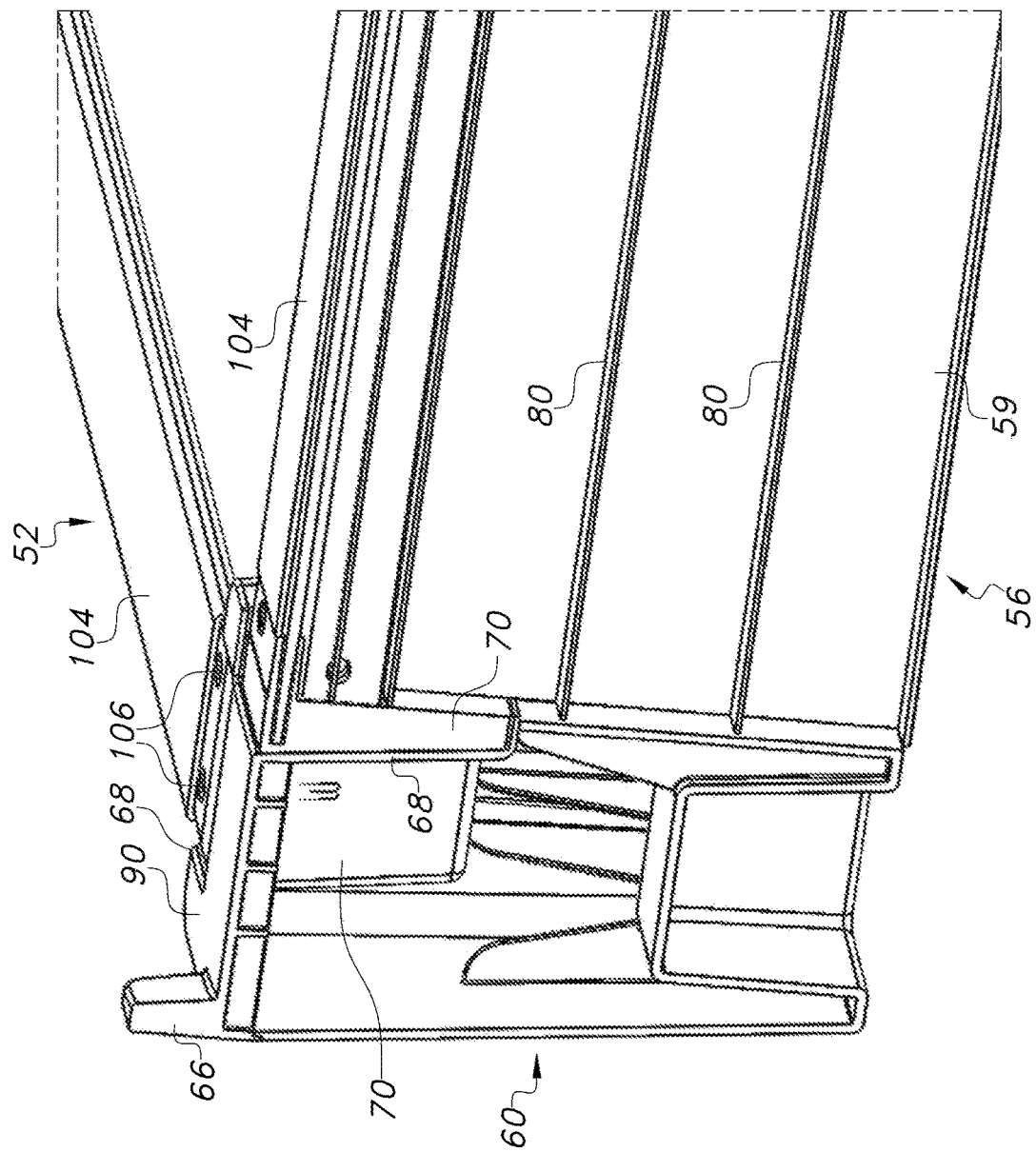
FIG. 7 is a perspective view, partially cut away, and illustrating a corner leg with a cross rail and side rail connected thereto of the FIG. 1 embodiment.

Turning then to FIG. 7, there is a perspective view, partially cutaway, illustrating connections between a side rail 52, a corner leg 60 and an end cross rail 56 and which is typical of connections with any of the corner legs 60. In this Fig, the wedges 70 of the side rail 52 and the end cross rail 56 can be seen to be inserted into the receivers 68 of corner leg 60. The wedges 70 may be affixed to the ends of the side rail 52 and to the ends of the end cross rail 56 by means such as rivets 106. It also can be seen that upper surfaces 104 of the plastic panels 59 are, when assembled, in the same horizontal plane as the upper surface 90 of the corner leg 60 for uniform support of the bedding.

Figure 8:
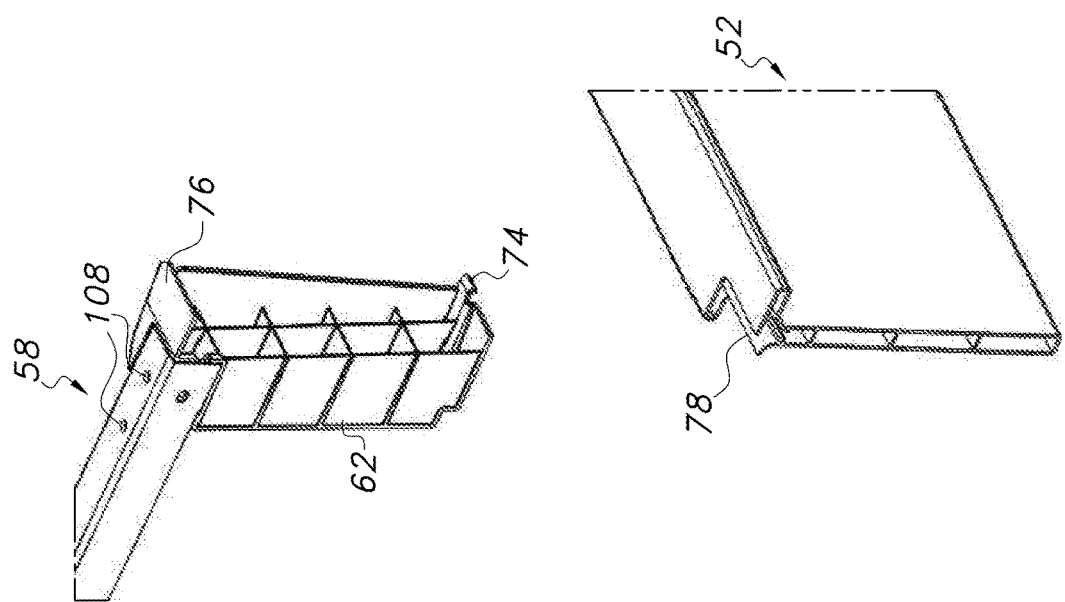
FIG. 8 is an exploded view, partially cutaway, illustrating the a center cross rail and a side rail of the FIG. 1 embodiment in position to be connected together.

In FIG. 8 there is an exploded view, partially cutaway, illustrating the center cross rail 58 and a side rail 52 of the FIG. 1 embodiment in position to be connected together; Accordingly, in FIG. 8, it can be seen that the center cross rail leg 62 is affixed to the end of the center cross rail 58 by means such as rivets that pass through holes 108. The upper flange 76 extends outwardly and interfits into the recess 78 in the side rail 52. The button 74 (only one of which is shown in FIG. 8) extends outwardly from the center cross rail leg 62 in order to snap into corresponding openings 84 (FIG. 2) in the side rail 52.

In the assembly of the bed frame 50, taking FIGS. 1-8, the side rails 52 and 54 are easily assembled by inserting the wedges 70 at each end thereof into the receivers 68 formed in the corner legs 60. The same is true of the end cross rails 56. Finally, the center cross rail is attached to the side rails 52, 54 such that the entire bed frame 50 is readily assembled without the need for any tools or particular expertise and can be easily accomplished by most purchasers.

Turning then to FIG. 9, there is shown a perspective view of a bed frame 120 that is constructed in accordance with a second embodiment of the present invention. As with the first embodiment, the bed frame 120 is assembled and ready for a foundation and mattress. The bed frame 120 is comprised of two side rails 122, 124 that are attached to three cross rails, that is, end cross rails 126 and center cross rail 128. The side rails 122, 124 as well as the end cross rails 126 are, as will be explained, comprised of extruded plastic panels 130 that extend from the top of the bed frame 120 to the floor to block access to the space underneath the bed frame 120 and prevent items from being placed or inadvertently moved to a position underneath the completed bed.

There are four corner legs 132 that are comprised of molded plastic and all of the corner legs 132 are identical. In addition, there is a molded plastic center cross rail leg 134 that provides support for the center cross rail 128 and molded plastic end center cross rail legs 136 (only one of which is seen in FIG. 1) that secure the center cross rail 128 to the side rails 122, 124. The extruded plastic panels 130 are generally flat and are recessed inwardly from the outer perimeter of the bed frame 120 toward the internal area of the bed frame 120 in the downward direction.

Turning then to FIG. 10, taken along with FIG. 9, there can be seen an exploded view illustrating the assembly of the bed frame 120 of this embodiment. As such, each of the corner legs 132 has two upper slots 138 cut downwardly in the corner legs 132 and also corresponding indented areas 140 aligned with the upper slots 138. A curved outer surface 142 is located intermediate of the indented areas 140 and its purpose will be later explained.

The upper slots 138 and indented areas 140 are oriented about 90 degrees apart with the curved outer surface 142 located therebetween. Some of the indented areas 140 and upper slots 138 cannot be seen in FIG. 10.

As to the center cross rail 128, there is a large wedge 144 that extends downwardly from the center cross rail 128 at about the center thereof and which fits into the center cross rail leg 134 to provide the support to the center cross rail leg 128. A pair of tapered wedges 145 also extends downwardly from the ends of the center cross rail 128.

Turning now to FIG. 11, taken along with FIGS. 9 and 10, there is a perspective view of the side rail 122, it being seen that both side rails 122, 124 are identical. Accordingly, there can be seen the end cross rail leg 136 that is affixed to the side rail 122. The end cross rail leg 136 can be affixed to the side rail 122 by means of positioning an upper portion 146 of the end cross rail leg 136 underneath an upper channel 148 formed along the length of the side rail 122 and then snapping the bottom 150 of the end cross rail leg 136 into a lower channel 152 of the side rail 122.

Further, the side rail 122 is preferably extruded plastic and has an outer upper surface 154 and a lower outer surface 156 where, as explained, the lower outer surface 156 is inset inwardly toward the center of the bed frame 120 so that a person can stand close to the bed frame 120 facing the bed frame and not stub a toe on the side rails 122, 124 or the end cross rails 126. The side rail 122 also has an upstanding flange 158 along its length that retains the bedding in its desired position when the bed frame is completely assembled.

As a further feature of the side rail 122, there are notches 160 cut into the lower edge of the upper channel 148 spaced inwardly of the ends 162 of the upper channel 158 that, as can be seen, extends along the entire length of side rail 122. Finally, there is a receiver 164 formed in the upper surface of the end cross rail leg 136 for a purpose that will later be explained.

Turning then to FIG. 12, there is shown an exploded view of one of the corner legs 132, again, noting that all four corner legs 132 are identical. The corner leg 132 is comprised of an upper body 166 and a lower body 168 and those two components, that is, the upper body 166 and the lower body 168 can be snap-fitted together or affixed together by means of other securing devices, such as rivets.

As previously shown (FIGS. 9 and 10) the curved outer surface 142 can be seen to be made up of a lower curved surface 170 and an upper curved surface 172 formed, respectively, in the lower body 168 and the upper body 166. The curved lower and upper surfaces 170, 172 meet along a continuous line so that the overall curved outer surface 142 is smooth and continuous. An opening 174 is formed in the lower body 168 to reduce weight and facilitate the molding thereof.

As with the curved outer surface 142 of FIGS. 9 and 10, the indented surface 140 is also comprised of a lower indented surface 176 and an upper indented surface 178, as described generally at 90 degrees apart. The upper slots 138 can be seen to be formed in the upper body 166. The upper body has an upper surface 180 with an opening 182 therethrough and a lower upper surface 184 formed in the upper body 166 exterior of the upper surface 180 and the slot 138.

In FIG. 13, there is an exploded view illustrating a side rail 122 and a corner leg 132 of the FIG. 9 embodiment in position to be connected together. As such, the side rail 122 is in a position to be lowered onto the corner leg 132 to carry out that connection. As the side rail 212 is so lowered, the lower edge 186 of the upper channel 148 enters and then seats in the upper slot 138 of corner leg 132. When so seated, the upper curved flange 188 of the corner leg 132 abuts against the upstanding flange 158 of the side rail 122 to create a smooth continual surface therebetween as do the other outer surfaces of the corner leg 132 and the plastic panel 130 of the side rail 122, also create a smooth appearance to the junction between the side rail 122 and the corner leg 132.

The notch 160 of the upper channel 148 also then enters into the slot 138 and is interlocked with a raised rib 190 located at the bottom of the slot 138 so that the side rail 122 cannot slide out of the corner leg 132. It also can be seen that the attachment of an end cross rail 126 (FIG. 9) can be carried out in the same manner to a corner leg 132.

Turning then to FIG. 14, there is a perspective view, cutaway, showing a connection between a side rail 122, and an end cross rail 126 to a corner leg 132. As can be seen, the extruded plastic panel 130 has an L-shaped metal member 192 such as an angle iron, that is provided in its upper portion. The L-shaped metal member 192 includes a horizontal flange 194 and a vertical flange 196 extending downwardly therefrom.

The L-shaped metal member 192 reinforces the rigidity of the plastic panel 130 as well as supports the weight of the bedding and occupant(s). In addition, since the L-shaped member 192 is fully encased within the plastic panel 130 and all connections are hidden, the bed frame 120 has a clean furniture look that does not need to be hidden from view.

The upper portion 198 of the plastic panel 130 is formed so as to surround the L-shaped metal member 192 and provides a finished appearance as well as enhances safety due to the absence of sharp metal edges or corners. As also can be seen, the upper channels 148 are inserted into and seat within the upper slot 138 to connect the side rail 122 and end cross rail 126 to the corner leg 132. As also can be seen, the upstanding flanges 158 of both the side rail 122 and end cross rail 126 are contiguous with the curved upper curved flange 188 of the corner leg 132 and create a smooth transition therebetween.

Turning then to FIG. 15, taken along with FIG. 9, there is an exploded view illustrating side rail 124 and a center cross rail 128 of the FIG. 9 embodiment in position to be connected together. As can be seen, the tapered wedge 145 is affixed to the end of the center cross rail 128 by means of rivets. In the completed bed frame 120, a tapered wedge 145 is affixed to both ends of the center cross rail 128, however only one is shown for explaining the connection.

The tapered wedge 145 has a lower surface 202 that is tapered upwardly toward the inner area of the bed frame 120 and facilitates the insertion of the tapered wedge 145 into the receiver 164 of the end cross rail leg 136. It also can be seen that upper surface 204 of the upper channel 148 becomes co-planar with the upper surface 206 of the center cross rail 28 when the center cross rail 128 is seated against the end cross rail leg 136.

Turning then to FIG. 16, there is shown a perspective view of a bed frame 220 that is constructed in accordance with a third embodiment of the present invention. As with the first two embodiments, the bed frame 220 is assembled and ready for a foundation and mattress without the need for tools. The bed frame 220 is comprised of two side rails 222, 224 that are attached to three cross rails, that is, end cross rails 226 and center cross rail 228. The side rails 222, 224 as well as the end cross rails 226 are, as will be explained, comprised of extruded plastic panels 230 that extend from the top of the bed frame 220 to the floor to block access to underneath the bed frame 220 and prevent items from being placed or inadvertently moved to a position underneath the completed bed.

There are four corner legs 232 that are comprised of molded plastic and all of the corner legs 232 are identical. The corner legs 232 are affixed to the outer ends of the side rails 222, 224 at the factory by means such as rivets and are therefore already affixed to the side rails 222, 224 when delivered to the customer. In addition there is a molded plastic center cross rail leg 234 that provides support for the center cross rail 228 and molded plastic end center cross rail legs 236 that secure the center cross rail 228 to the side rails 222, 224.

The end center cross rail legs 236 are also affixed to the side rails 222, 224 at the factory by means such as rivets and a therefore are already affixed to those side rails 222, 224 when delivered to the customer. The extruded plastic panels 230 are generally flat and are recessed inwardly from the outer perimeter of the bed frame 220 toward the internal area of the bed frame 220 in the downward direction.

Turning then to FIG. 17, taken along with FIG. 16, there can be seen an exploded view illustrating the assembly of the bed frame 220 of this embodiment. As such, each of the corner legs 232 has an upper opening 238 cut downwardly in the corner legs 232 and also corresponding indented areas 240 (not shown on all corner legs 232). The corner legs 232 have curved outer surfaces 242 with small slits 244 formed along the bottom thereof and small openings 246 formed along the upper surface thereof.

A set of four curved covers 248 are provided that are adapted to be attached to the curved outer surfaces 242 of the corner legs 232 in order to produce a good appearance of the overall bed frame 220 and cover the seams between the side rails 222 and 224 to the corner legs 232. The curved covers 248 each has an inside surface 250 that is adapted to face and conform, generally to the curved outer surfaces 242 of the corner legs 232. The curved covers 248 have a system for attaching the curved outer covers 248 to the curved outer surfaces 242 and, as shown, that system, may include the use of a pair of vertically aligned elongated flanges 252 and a pair of buttons 254 that can be inserted into the small slits 244 and small openings 246, respectively, to basically snap the curved covers 248 onto the corner legs 232.

As further shown in FIG. 17, there are small wedges 256 affixed to the opposed ends of the center cross rail 228 and which are adapted to be inserted into similarly shaped openings 258 in the end center cross rail legs 236 order to assemble the center cross rail 228 to the side rails 222, 224 in constructing the bed frame 220. In a similar manner, there are also wedges 260 that interfit into the openings 238 in the corner legs 232 for assembling the end cross rails 236 to the corner legs 232 in constructing the bed frame 220. The small wedges 256 and wedges 260 can be affixed to the ends, respectively of the center cross rail 228 and end cross rails 226 by means of rivets or other suitable fastening devices.

Turning now to FIG. 18, taken along with FIGS. 16 and 17, there is a perspective view of the side rail 222 of the third embodiment, it being seen that both side rails 222, 224 (FIG. 17) are identical. Accordingly, there can be seen the end center cross rail leg 236 that is affixed to the side rail 222 and can be affixed thereto in the same manner as with the prior embodiments. There is also a pair of inner extrusions 262 that are affixed to the plastic panel 230 and which adds strength and rigidity to that plastic panel 230. The assembly of the inner extrusions 262 to the other components to the bed frame 220 will be later explained.

The plastic panel 230 itself has an upper flange 264 for retaining the foundation and bedding. The upper flange 264 mates with a curved upper flange 266 on the curved covers 248 to provide a smooth continuous surface.

There is also a series of holes 270 formed in the indented area 240 of the corner legs 232 and the series of holes 270 are part of a horizontal upper slit 272. A horizontal lower slit 274 is present for assembly of the plastic panels 230 to the corner legs 232 in the assembly of the bed frame 220. The presence of the holes 270 along the upper and lower slits 272, 274 create a certain flexibility of the upper and lower slits 272, 274 for a purpose that will be later explained.

In addition, there is formed in the corner legs 232, a platform 276 created by two upper surfaces 278 of the corner legs 232. Again, the purpose of the platform 276 will be later explained. As also noted, there are openings 238 in the corner legs 232 and which will be referenced when explaining the attachment of the end cross rails 226 to the corner legs 232.

Turning then to FIG. 19, taken along with FIGS. 16-18, there is an exploded view illustrating side rail 224 and end cross rail 226 of corner leg of the FIG. 16 embodiment in position to be connected together though the use of corner leg 232. Accordingly, as can be seen, the wedge 260 affixed to the end cross rail 226 is adapted to enter in to the opening 238 in the corner leg 232 in order to affix the end cross rail 226 thereto. As that occurs, upper and lower beaded ribs 280, 282, respectively, formed along the length of the end cross rail 226 can be snapped into the upper and lower slits 272, 274 formed in the corner leg 232.

Thus, in connecting the end cross rail 226 to the side rail 224, it is a simple matter to insert the wedge 260 downwardly into the opening 238 and then snap the upper and lower beaded ribs 280, 282 into the upper and lower slits 272, 274 so that the connection can be made with the need for any tools. As noted, that same method of connection is used to connect both ends of both end cross rails 226.

After that connection is made, the curved cover 248 is also simply snapped onto the corner leg 232 by inserting the flanges 252 into the small slits 244 and then snapping the buttons 254 into the small openings 246 and, again the attaching does not require any tools or special skills of the person carrying out the assembly.

Turning then to FIG. 20, there is a perspective view, cutaway, showing a connection between a side rail 222, and an end cross rail 226 to a corner leg 232. As can be seen, the extruded plastic panel 230 has a T-shaped metal member 292, such as a pair of angle irons joined together or a unitary T-shaped member, that is provided in its upper portion and the T-shaped metal member 192 includes a horizontal flange 294 and a vertical flange 296 extending downwardly therefrom.

The T-shaped metal member 292 reinforces the rigidity of the plastic panel 230 as well as supports the weight of the bedding and occupant(s). In addition, since the T-shaped member 292 is fully encased within the plastic panel 230 and all connections are hidden, the bed frame 220 has a clean furniture look that does not need to be hidden from view.

The upper portion 298 of the plastic panel 230 is formed so as to surround the T-shaped metal member 292 and provides a finished appearance as well as enhances safety due to the absence of sharp metal edges or corners. As also can be seen, the wedge 260 is inserted into and seats within the opening 238 in the corner leg 232 to connect the side rail 222 and end cross rail 226 to the corner leg 232. Accordingly, the upstanding flange 264 of the side rail 222 and the upstanding flange 300 or the end cross rail 226 are contiguous with the curved upper flange 266 of the curved cover 248.

Turning then to FIG. 21, there is shown a perspective view, cutaway, showing a connection between a side rail 222 and the center cross rail 228. As can be seen, the end center cross rail leg 236 extends outwardly from the side rail 222 and has opening 258 formed therein. Small wedge 256 fits into the opening 258 so as to affix the center cross rail 228 to the side rail 222. That connection is a simple drop-in connection and requires no tools to complete that connection. The small wedge 256 is comprised of a molded plastic material and can be affixed to the metal cross member 302 by means such as rivets that can pass through holes 304.

Next, in FIG. 22, there can be seen an exploded view of side rail 222 and inner extrusion 262 of the side rail of the FIG. 16 embodiment in position to be connected together. As such the inner extrusions have elongated upper and lower slots 306, 308, respectively, which snap onto the upper and lower beaded ribs 280, 282 so that the inner extrusion 262 can be simply and easily snapped on to the plastic panel 230 in assembling the bed frame 220 (FIG. 1). Again, as previously explained, the presence of the inner extrusion 262 that is snapped to the plastic panel 230 serves to add strength and rigidity to that plastic panel 230 and can be easily snapped onto the plastic panel 230 without the need for tools.

Turning now to FIGS. 23 and 24, there is a perspective view and an exploded view of a platform style bed frame 350 that is configured for use without a foundation that is constructed in accordance with a fourth embodiment of the present invention. In this embodiment, the overall bed frame 350 is made up of an upper bed frame section 352 and a lower bed frame section 354 that elevates the upper bed frame section 352 to a higher level, thereby allowing the mattress to be at the proper height without a foundation.

As can be seen, the upper bed frame section 352 includes upper side rails 356, upper end cross rails 358, all of which may be plastic extrusions, and an upper center cross rail 360. Upper corner members 362 are provided at each of the corners of the upper bed frame section 352. In addition, upper side rail center members 364 are affixed to the upper side rails 356 at or about the center of each of the upper side rails 356. An upper center cross rail member 366 is also present and extends downwardly from the upper center cross rail 360 at or about the center thereof.

Again, the components of the upper bed frame section 352 may be assembled without the need for tools by utilizing the wedge and receiver type of connections show and described with respect to the prior embodiments of this application.

Taking then the lower bed frame section 354, there can be seen lower side rails 368 and lower end cross rails 370 that also may be comprised of plastic extrusions. Lower corner members 372 are provided at each of the corners of the lower bed frame section 354. In addition, lower side rail center members 374 (only one is shown) are affixed to the lower side rails 368 at or about the center of each of the lower side rails 368. In addition there is a lower center leg 376 that is adapted to be positioned contacting the floor and located directly underneath the upper center cross rail member 366.

In FIG. 24, there can also be seen bosses 378 that extend upwardly from the lower corner members 372, the lower side rail center members 374 and the lower center leg 376. Those bosses 378 interfit into recesses (not shown) in the lower surface of the upper corner members 362, the upper side rail center member 364 and the upper center cross rail member 366, respectively, and are sized to receive the bosses 378 to interfit the upper bed frame section 352 to the lower bed frame section 354 and prevent sliding between the two sections.

Turning to FIG. 25, there is an exploded view illustrating the assembly of the lower bed frame section 354. As can be seen, the lower side rails 368 and the lower end cross rails 370 can be affixed to the lower corner members 372 by sliding into slots 380 formed on the upper and lower surfaces of the lower corner members 372. As such, the entire assembly of the lower bed frame section 354 can be assembled without the need for tools.

In FIG. 26, there can be seen a cross sectional view looking at a lower corner member 372 and showing the interfitting of a flange 382 of a lower side rail 368 within the slots 380 of the lower corner member 372. The lower end cross rails 370 (FIG. 25) are affixed to the lower corner members 372 in the same manner.

Turning, then to FIG. 27, there is shown a perspective view looking at a lower corner member 372 from inside of the bed frame 350 (FIG. 23). In this Fig, the interfitting is illustrated between the flanges 382 of the lower side rail 368 and the lower end cross rail 370 into the slots 380 of the lower corner members 372.

Turning now to FIGS. 28 and 29, there is a perspective view and an exploded view of a bed frame 400 that is constructed in accordance with a fifth embodiment of the present invention. As with the first four embodiments, the bed frame 400 is assembled and ready for a foundation and mattress without the need for tools. The bed frame 400 is comprised of two side rails 402, 404 that are attached to two cross rails 406, 408. In addition, in this embodiment, there is a center rail 410.

The bed frame 400 includes four corner legs 412 that are comprised of molded plastic and all of the corner legs 412 are identical. As can be seen, the side rails 402 404 and the cross rails 406, 408 are all affixed to the corner legs by a method not requiring tools and which will be later explained. In addition there is a center rail 410 that is positioned parallel to the side rails 402, 402 and thus is oriented head to foot with respect to an occupant of the completed bed. There are molded plastic center rail legs 414 that provide support for the center rail 410.

As also can be seen in FIGS. 28 and 29, there are extruded plastic panels 416 that extend from the top of the bed frame 400 to at least substantially to the floor and, preferably, actually to the floor to block access to the space underneath the bed frame 400 and prevent items from being placed or inadvertently moved to a position underneath the completed bed. As will be seen, unlike the prior embodiments, the extruded panels 416 of this exemplary embodiment are displaced inwardly with respect to the side rails 402, 404 or cross rails 406, 408 and are not connected or a part of the side rails 402, 404 or cross rails 406, 408.

In the exploded view of FIG. 29, the actual assembly of the bed frame 400 can be seen. As such, each of the corner legs 412 has a pair of upper openings 418 cut downwardly in the corner legs 412 and spaced about 90 degrees apart.

As further shown in FIG. 29, there are wedges 420 affixed to the opposed ends of the side rails 402, 404 and cross rails 406, 408 which are adapted to be inserted into the openings 418 order to assemble the cross rails 402, 404 and the cross rails 406, 408 to the corner legs 412 in constructing the bed frame 400.

In a similar manner, the extruded panels 416 are also affixed to the corner legs 412 but displaced inwardly with respect to the side rails 402, 404 and cross rails 406,408 so the there is space underneath the side rails 402, 404 and cross rails 406, 408 to accommodate room for the feet of a person standing next to the completed bed. The exact manner of affixing the extruded panels 416 to the corner legs 412 may be by conventional means, such as providing a slot in the corner legs 412 and sliding the extruded panels 416 into that slot.

Turning now to FIG. 30, taken along with FIGS. 28 and 29, there is a perspective view of the side rail 402 of the fifth embodiment, it being seen that both side rails 402, 404 as well as the cross rails 406, 408 are identical except for length. Accordingly, there can be seen the side rail 402 and the wedges 420 at opposite ends thereon. The side rail 402 can have a plastic coating or extrusion 421 covering a metal angle iron (not shown in FIG. 30) so as to form an upper surface 700 and a lower supporting surface 702 of the side rail 402, separated by a vertical wall 704.

In FIG. 31, taken along with FIG. 30, there is a cross sectional view of the side rail 402 of FIG. 30. In the view, the metal angle iron 422 is seen and forms the basic structure of the side rail 402 and is covered by the plastic coating 421. The metal angle iron 422 is constructed as a combination of two L-shaped metal angle irons, that is, a first angle iron 424 and a second angle iron 426 affixed together. As can be see in FIG. 31, the first angle iron has a vertical flange 428 and a horizontal flange 430 extending outwardly while the second angle iron 426 has a vertical 432 and a horizontal flange 424 extending outwardly in the opposite direction as the horizontal flange 430.

The respective vertical flanges 428 and 432 are affixed together such as by welding. The second angle iron 426 is smaller than the first angle iron 424 creating an offset T-shape of the metal angle iron 422. As such, the horizontal flange 430 is longer than the horizontal flange 434 and the position of the horizontal flange 434 is approximately midway along the length of the vertical flange 428. As such, the horizontal flange 340 forms and supports the upper surface 700 while the smaller, horizontal flange 434 forms and supports the lower supporting surface 702 with the vertical wall 704 therebetween.

Turning then to FIG. 32, taken along with FIG. 31, there is a perspective view illustrating a connection between a side rail 402 and a corner leg 412. As can be seen there are indentations in the corner leg 412 that are stepped down to receive the various flanges of the side rail 402. As such, there is a slight indentation 436 that receives the horizontal flange 430, a step down lower indentation 438 that receives the horizontal flange 434 and a vertical slot that receives the vertical flanges 428 and 432 so that the upper surface 700 of the side rail 402 is in the same plane as the upper surface 442 of the corner leg 412 and the lower supporting surface 702 of the side rail 402 is in the same plane as the lower supporting surface 444 of the corner leg 412.

Next, in FIG. 33. there is a cross sectional view of the connection of a side rail 402 with a corner leg 412 and illustrating the metal angle iron 422 and its position within the various indentations 436, 438 and the slot 440 of the corner leg 412.

Turning to FIG. 34, there is an exploded view illustrating side rail 402 connected to a corner leg 412 and cross rail 406 in position to be connected to the corner leg 412.

Turning then to FIG. 35, there is an exploded view illustrating the center rail 410 in position to be connected to the center rail legs 414. As can be seen, the center rail 410 is comprised of a T-shaped metal member 446 having a horizontal flange 448 and a vertical flange 450 with a plastic coating 452 covering the same and the center rail legs 414 have a horizontal indentation 454 and a vertical slot 456 to receive the horizontal flange 448 and the vertical flange 450, respectively, to affix the center rail 410 with the center rail legs 412.

Turing then to FIG. 36, there is a perspective view of the bed frame 400 with a deck 458 in its assembled form and in position to support a mattress. The overall height of the deck 458 is sufficient to be used with only a mattress and not a box spring or other foundation. Basically, the deck 458 takes the place of the foundation in supporting the entire surface of the mattress.

Returning briefly to FIG. 32, taken along with FIG. 30-36, the perimeter of the deck 458 sits atop of the supporting surface 444 of the corner legs 412 as well as the lower supporting surfaces 702 of the side rails 402, 402 and cross rails 406, 408 so that the deck 458 is fully supported as well as constrained for lateral movement by the vertical surface 704 of the side rails 402 and cross rails 404.

In FIG. 37, taken along with FIG. 36, there is an exploded view illustrating the bed frame 400 and showing the individual slats 460 that are in position to be assembled together to make up a deck 458.

In FIG. 38, taken along with FIGS. 36 and 37, there is a perspective view of an individual slat 460. The slats 460 are designed to be interlocked together to make a completed deck 458 and the interlocking system may include end flanges 462 having a pin 464 that interfits into an appropriate opening in an end flange 462 of and adjacent slat 460.

In FIG. 39, there is an exploded view showing end flanges 462 in position to be assembled in constructing a slat 460 with a pin 464 and opening 466 to carry out the interlocking of adjacent slats 460.

Turning then to FIG. 40 there is shown, a perspective view of the platform bed frame 468 constructed in accordance with the sixth embodiment of the present invention. As can be seen, the platform bed frame 468 is assembled and ready for a mattress and is comprised of end rails 470 and side rails 474. The platform bed frame 468 will be referred to as having a head end 472 and a foot end 476 simply for reference in describing the various components.

The end rails 470 and side rails 474 are constructed of steel and will be explained later. As also can be seen, the end rails 470 and side rails 474 are supported by legs 478 and, in the exemplary embodiment, the legs 478 are constructed in two sections, that is, there is an upper leg 480 and a lower leg 482 and, as will be seen, the upper and lower legs 480, 482 are removably affixed to each other such that the lower leg 482 can be separated from the upper leg 480 by the user if desired. The platform bed frame 468 employs six legs 478, with three legs 478 provided along each lateral side of the platform bed frame 468, however, only 4 are shown in FIG. 40.

As also can be seen in FIG. 40, there are end panels 484, preferably comprised of extruded plastic, located at both the head end 472 and foot end 476 of the platform bed frame 468 (only one of which is shown in FIG. 40) and plastic side panels 486, only two of which are shown in FIG. 40), it being seen that similar panels are positioned as a mirror image of the end and side panels 484, 486 illustrated in FIG. 40. As will become clear, the end and side panels 484, 486 are optional and can be removed by the user if desired, however, when present, the panels prevent objects from going into the space underneath the platform bed frame 468 and avoid the need for personnel to remove those objects.

The end and side panels 484, 486 can readily be installed and removed by sliding into slots 488 provided on the legs 478. In the exemplary embodiment, the end and side panels 484, 486, as shown, are single panels, however, it can be seen that each of the end and side panels 484, 486 may be comprised of two panels, i.e. an upper and lower panel making up each of the end and side panels 484, 486.

Further, in FIG. 40, there are a plurality of slats 490 that form the supporting deck surface for the mattress. In the exemplary embodiment, there are nine slats 490, however, there can be a greater or lesser number of slats 490 used in constructing the platform bed frame 468 of the present invention. To complete the supporting deck surface for the mattress, the slats 490 include caps that are located at the upper surface of each slat 490 and, as shown, there are two end caps 492, one middle cap 494 and two intermediate caps 496 on each slat 490. The end caps 492 and middle cap 494 can preferably be injection molded plastic resin and the intermediate caps 496 also plastic resin but created in the extrusion manufacturing process.

Accordingly, the upper supporting surface of the platform bed frame 468 supports a mattress and each of the end rails 470 and side rails 474 have an upper edge 498, 500, respectively, that is elevated above that supporting surface so as to retain the mattress properly positioned on the supporting surface so that it cannot slide from the proper position on the platform bed frame 468. The upper edges 498, 500 combine to form a continuous edge that stabilizes a mattress sitting atop of the platform bed frame 468.

Turning then to FIG. 41, there is a side view of the platform bed frame 468 of the present invention. As can be seen in FIG. 41, the side rail 474 is supported by the legs 478 and the underside area of the platform bed frame 468 is contained by the side panels 486 intermediate those legs 478. As also shown, there is a corner member 502 that provides a smooth transition between the end rails 470 and the side rails 474 that will be later explained. Only one corner member 502 is shown, however, there is a corner member 502 located at each of the four corners of the platform bed frame 468.

In FIG. 42, there is an end view of the platform bed frame 468 of the present invention. Again, there can be seen in FIG. 42, the end rail 474 is supported by the legs 478 and the underside area of the platform bed frame 468 is closed in by the end panel 484 intermediate those legs 478. As also shown, the corner member 502 is located between the end rail 470 and the side rail 474. As with FIG. 41, only one corner member 502 is shown.

Turning to FIG. 43, there is a top view of the present platform bed frame 468 and showing the individual slats 490 extending or spanning between the side rails 474. As can be seen, the slats 490 actually extend beyond or outwardly with respect to the supporting legs 478, leaving an overhang that can be used for ornamental purposes.

Turning next to FIG. 44, there is an exploded view of the platform bed frame 468 of the present invention. There can also be seen a head support end 504 and a foot support end 506 that are affixed at the opposed ends of a slat supporting side rail 507. The slat supporting side rail 507 is comprises of certain components to be explained, such as a plurality of support rail blocks 508 that are included in the slat supporting side rail 507, each forming a cavity 510 therein for receipt of the slats 490 in a manner to be described.

Taking next, FIG. 45, there is a cross sectional side view of a leg 478 located at the foot end 476 of the platform bed frame 468. In this Fig, it can be seen that the foot 478 supports the slat supporting side rail 507 as well as the slats 490 seated into the cavities 510 of the support rail blocks 508 of the slot supporting side rail 507.

As can be seen, and will be later detailed, the slats 490 have a lower surface 512 that is shaped to seat in the complementary shaped block cavities 510 to secure the slats 490 in a stable position on the slot supporting side rail 507 of the platform bed frame 468. In addition, the foot support end 506 is affixed to the slot supporting side rail 507 and supports the end rail 470.

FIG. 46 is a perspective view, partly in cross section, showing a leg 478 at the foot end 476 of the platform bed frame 468 with a slat 490 in position to be assembled thereto. As noted, the slat 490 is in position to be lowered onto the cavity 510 of the foot support end 506. A slat end base 514 is affixed to the slat 490 such that the end of the slat 490 is comprised of the end cap 492 and the end base 514 includes a wedge 516 depending downwardly that interfits into the cavity 510 formed in the foot support end 506 to install the slat 490 into the platform bed frame 468.

A pair of angle irons 518 are used to strengthen the slats 490 and the slat end bases 514 are clam shelled to the angle irons 518 and are affixed to the angle irons 518 by means of rivets passing through slotted holes in the angle irons 518. The affixation is carried out by the manufacturer. The middle cap 494 is snapped into place and oriented by means of molded in pins (not shown) that correspond with stamped holes in the angle irons 518.

FIG. 47 is a side cross sectional view showing the foot support end 506 of the platform bed frame 468 with a slat 490 in position to be installed therein. In FIG. 47, there can be seen the foot support end 506 having a cavity 510 formed therein with the end rail 470 affixed to the distal end of the foot support end 506. The end of the slat 490 can also be seen and wherein the end cap 492 and the end base 514 of the slat 490 are extrusions that surround the pair of steel angle irons 518 to provide strength to the slats 490. As such, the wedge 516 extends downwardly from the end base 514 and the lower surface 512 of the end base 514 of the slat 490 is shaped to conform to internal shape of the cavity 510.

Turning then to FIG. 48, there is a cross sectional view of the leg 478 at the foot end 476 of the platform bed frame 468 showing the separate components making up a leg 478. Accordingly, as can be seen, the leg 478 is comprised of the upper leg 480 and lower leg 482 that is removable affixed to the upper leg 480. Thus, the lower leg 482 has a projection 520 extending upwardly therefrom and which interfits into a recess 522 formed in the upper leg 480. The upper and lower legs 480, 482 may be thereby affixed together by a force fit and yet separated by the user as desired in case the user wants to lower the platform bed frame 468 by removing the lower legs 482 and letting the platform bed frame 468 be supported on the floor solely by the upper legs 480. In this way, the bed height is at the standard sleep surface with only a mattress. If the lower legs 482 are removed, the sleep surface is lower. In such case, smaller side and end panels can be installed between the legs 478.

Accordingly, the platform bed can be oriented in a high or platform elevation or a low, regular elevation depending on whether both an upper and lower leg are used or just an upper leg is used and which then sits on the floor to put the platform bed frame 468 into its regular or lower elevation. In such case, the number of slats 490 can be reduced, that is, as an example, if the lower bed elevation is chosen, the number of slats 490 may be reduced from 9 to 3 slats.

In FIG. 49, is a side view of the leg 478 at the foot end 476 of the platform bed frame 468 showing the separate components making up a leg 478. Again, there can be seen the joining of an upper leg 480 and a lower leg 482.

Turning to FIG. 50, there is an exploded view of the leg 478 at the foot end 476 of the platform bed frame 468 and showing the joining of a leg 478 to the slat supporting side rail 507. As such, the upper leg 480 has a recess 526 forming opposed upper flanges 528 and the slat supporting side rail 507 interfits into that recess 526. As shown, the slat supporting side rail 507 includes a pair of angle irons 530 and the upper leg 480 can be firmly affixed to the slat supporting side rail 507 by means such as providing holes 532 in the angle irons 530 through which fasteners (not shown) can pass and secured in the holes 534 in the upper surface of the upper flanges 528 of the upper leg 480. That securement can be carried out by the manufacturer.

As can further be seen in FIG. 50, there are slots 488 that are provided in the upper and lower legs 478, 482 to accommodate the side panels 486 (FIG. 40).

Turning then to FIG. 51, there a is a cross sectional view of a side rail 474 and showing the engagement thereof with a slat 490 of the platform bed frame 468. The side rail 474 is comprised of an angle iron 536 that is encased within a extruded plastic housing 538 and both side rails 474 are similarly constructed. Thus, the plastic housing 538 may be extruded to the desired length and the angle iron 536 slipped into that housing 538 in assembling a side rail 470.

In attaching the side rail 470 to the slat 490, a lower tab 540 formed in the extruded plastic housing 538 can be affixed behind a notch 542 in the slat 490 to secure the lower portion of the side rail 474 to the slat 490 and then the upper portion of the side rail 474 can be pivoted upwardly so that a small tooth 544 engages the horizontal upper surface 546 of the slat 490 such that the side rail 474 can be simply manually snapped onto the slat 490 to affix the side rail 474 to the slat 490 without the need for tools.

Turning then to FIG. 52, there is a cross sectional view of a head support end 504 of the platform bed frame 468. As can be seen, the head support end 504 is affixed to the slat support side rail 507 with the legs 478 supporting that slat support side rail 507 so that the head support end 504 is ready to have an end rail 470 (FIG. 51) snapped onto the head support end 504. FIG. 52 also shows the cavities 510 that are formed in the support rail blocks 508 to receive the wedges 516 (FIG. 47) at the ends of slats 490 (FIG. 40).

Turning now to FIG. 53, there is an exploded view of the slat support side rail 507 and illustrating the nesting of the support rail blocks 508 in the construction of the assembled slat supporting side rail 507 with the side panels removed. As can be seen, the support rail blocks 508 all interfit with each other by means of having an open end 550 and a closed end 552 so that the closed end 552 of one support rail block 508 interfits into the open end 550 of an adjacent support rail block 508. The foot support end 506 interfits into the open end 550 of the last support rail block 508. The support rail blocks 508 are also all secured together further by means of the angle irons 530 that sandwich the support blocks 508 therebetween.

In FIG. 54, there is a top view of a slat 490 of the platform bed frame 468 of the present invention.

Finally, in FIG. 55, there is an exploded view of the entire platform bed frame illustrating the assembly thereof. FIG. 16 also, however, includes a filler piece 554 that can be snapped into a slot 488 of the legs 478 in the event panels are not installed between the legs 478 for aesthetic purposes.

While the present invention has been set forth in terms of a specific embodiment or embodiments, it will be understood that the present bed frame herein disclosed may be modified or altered by those skilled in the art to other configurations. Accordingly, the invention is to be broadly construed and limited only by the scope and spirit of the claims appended hereto.

What is claimed is:

1. A bed frame assembly for supporting a mattress or mattress set, the bed frame assembly adapted to be positioned on a floor, the bed frame assembly comprising side rails, at least one cross rail and corner members having openings formed therein, the side rails and at least one cross rail having wedges that drop into the openings to attach the side rails and the at least one cross rail to the corner members to form the bed assembly, panels affixed to the corner members and located inwardly toward the inner area of the bed frame with respect to the side rails and the at least one cross rail, the panels adapted to extend downwardly at least substantially to the floor;

wherein the side rails and the at least one cross rail have an upper surface and a lower supporting surface and a vertical wall therebetween and the corner members have an upper surface and a lower supporting surface and wherein the lower supporting surface of the side and cross rails is in the same horizontal plane as the lower support surface of the corner members.

2. The bed frame assembly of claim 1 wherein the panels are extruded plastic panels.

3. The bed frame assembly of claim 1 wherein the upper surface of the corner members are in the same horizontal plane as the upper surfaces of the side rails and cross rails.

4. The bed frame assembly of claim 1 wherein the corner members have slots formed therein at about 90 degrees apart and the side rails interfit into the slots.

5. The bed frame assembly of claim 1 wherein the side rails and the at least one cross rail have a T-shaped metal insert.

6. The bed frame assembly of claim 1 wherein corner members are pre-attached to the side rails.

7. The bed frame assembly of claim 1 further comprising:
a deck for underlying a mattress, the deck being supported by the side rails and providing an upper surface area to support the mattress set.

8. The bed frame assembly of claim 7 wherein the deck is comprised of individual slats.

9. The bed frame assembly of claim 8 wherein the individual slats are interlocked together.

10. The bed frame assembly of claim 7 wherein the side rails have a plurality of individual receivers having slots formed therein that receive and support the outer ends of the slots.

11. The bed frame assembly of claim 7 wherein the slats have wedges adapted to enter into the plural of individual receivers to affix the slats to the side rails.

12. The bed frame assembly of claim 7 further including legs that connect to and support the side rails.

13. The bed frame assembly of claim 12 wherein the legs each comprise upper and lower legs that are removably affixed together to adjust the height of the bed frame.

14. The bed frame assembly of claim 7 wherein the side rails and end rails combine to form a continuous upper edge that retains a mattress in a fixed position atop of the bed frame assembly.

15. The bed frame assembly of claim 7 wherein the deck extends outwardly from the legs so as to create an unsupported overhang at least along the side rails of the bed frame.

* * * * *